United States Patent
Innes et al.

(10) Patent No.: US 10,841,316 B2
(45) Date of Patent: *Nov. 17, 2020

(54) DYNAMIC ACCESS CONTROL TO NETWORK RESOURCES USING FEDERATED FULL DOMAIN LOGON

(71) Applicant: Citrix Systems, Inc., Fort Lauderdale, FL (US)

(72) Inventors: Andrew Innes, Cambridge (GB); Chris Mayers, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 446 days.

This patent is subject to a terminal disclaimer.

(21) Appl. No.: 15/690,417

(22) Filed: Aug. 30, 2017

(65) Prior Publication Data
US 2018/0007059 A1    Jan. 4, 2018

Related U.S. Application Data

(63) Continuation-in-part of application No. 14/870,447, filed on Sep. 30, 2015, now Pat. No. 10,122,703.
(Continued)

(51) Int. Cl.
*H04L 29/06* (2006.01)
*G06F 21/62* (2013.01)
(Continued)

(52) U.S. Cl.
CPC ............ *H04L 63/104* (2013.01); *G06F 21/33* (2013.01); *G06F 21/34* (2013.01); *G06F 21/62* (2013.01);
(Continued)

(58) Field of Classification Search
CPC ... H04L 63/104; H04L 9/3228; H04L 9/3263; H04L 63/0815; H04L 63/0823;
(Continued)

(56) References Cited

U.S. PATENT DOCUMENTS 6,327,578 B1  12/2001  Linehan
7,526,560 B1  4/2009  Samar
(Continued)

FOREIGN PATENT DOCUMENTS

JP   2003150553 A   5/2003
JP   2007-234039 A  9/2007
(Continued)

OTHER PUBLICATIONS

Mar. 28, 2019—(JP) Decision to Grant a Patent—App 2017-515810.
(Continued)

*Primary Examiner* — Tongoc Tran
(74) *Attorney, Agent, or Firm* — Banner & Witcoff, Ltd.

(57) ABSTRACT

Methods and systems for granting or denying a client device access to one or more resources in a remote computing environment are described herein. During authentication, context information for the client device, such as device type, device location, etc., may be determined. A computing device in the system may receive data indicating the context information, such as data indicating that the user is at a particular location and/or is of a particular device type. One or more labels for a session associated with the user of the client device may be determined based on the data indicating the context information. The computing device may generate an authentication certificate comprising one or more labels. Based on the certificate, one or more access groups for the user of the client device may be determined, and the user of the client device may be granted or denied access to one or more resources according to the access group(s).

20 Claims, 22 Drawing Sheets

Related U.S. Application Data

(60) Provisional application No. 62/381,996, filed on Aug. 31, 2016, provisional application No. 62/057,344, filed on Sep. 30, 2014.

(51) Int. Cl.
| | | |
|---|---|---|
| *H04L 9/32* | (2006.01) | |
| *G06F 21/33* | (2013.01) | |
| *G09C 1/00* | (2006.01) | |
| *G06F 21/34* | (2013.01) | |

(52) U.S. Cl.
CPC ...... *G06F 21/6218* (2013.01); *G06F 21/6245* (2013.01); *G09C 1/00* (2013.01); *H04L 9/3228* (2013.01); *H04L 9/3234* (2013.01); *H04L 9/3263* (2013.01); *H04L 63/0815* (2013.01); *H04L 63/0823* (2013.01); *H04L 63/0853* (2013.01); *H04L 63/101* (2013.01); *H04L 63/107* (2013.01); *G06F 2221/2101* (2013.01); *G06F 2221/2111* (2013.01); *H04L 63/061* (2013.01)

(58) Field of Classification Search
CPC . H04L 63/0853; H04L 63/101; H04L 63/107; G06F 21/33; G06F 21/34; G06F 21/62; G06F 21/6218; G06F 21/6245; G09C 1/00
See application file for complete search history.

(56) References Cited

U.S. PATENT DOCUMENTS

| | | | |
|---|---|---|---|
| 10,021,088 | B2 | 7/2018 | Innes et al. |
| 2002/0143707 | A1 | 10/2002 | Aull |
| 2003/0145205 | A1 | 7/2003 | Sarcanin |
| 2003/0237004 | A1 | 12/2003 | Okamura |
| 2004/0243520 | A1 | 12/2004 | Bishop et al. |
| 2005/0021526 | A1 | 1/2005 | Bazot et al. |
| 2005/0289650 | A1 | 12/2005 | Kalogridis |
| 2006/0036848 | A1 | 2/2006 | Brown et al. |
| 2006/0200681 | A1 | 9/2006 | Kato et al. |
| 2007/0174469 | A1 | 7/2007 | Andress et al. |
| 2007/0234422 | A1 | 10/2007 | Piesing |
| 2007/0245414 | A1 | 10/2007 | Chan et al. |
| 2007/0283143 | A1 | 12/2007 | Yami et al. |
| 2008/0072048 | A1 | 3/2008 | Brown et al. |
| 2008/0126794 | A1 | 5/2008 | Wang et al. |
| 2008/0306922 | A1 | 12/2008 | Brown et al. |
| 2009/0037728 | A1 | 2/2009 | Kamikura |
| 2009/0064301 | A1 | 3/2009 | Sachdeva et al. |
| 2009/0083537 | A1 | 3/2009 | Larsen et al. |
| 2009/0092099 | A1 | 4/2009 | Gu et al. |
| 2009/0178129 | A1 | 7/2009 | Cross et al. |
| 2011/0202988 | A1 | 8/2011 | Otranen et al. |
| 2011/0202989 | A1 | 8/2011 | Otranen et al. |
| 2011/0239283 | A1 | 9/2011 | Chern |
| 2011/0264913 | A1 | 10/2011 | Nikander et al. |
| 2011/0296513 | A1* | 12/2011 | Kasad ............... G06F 21/35 726/9 |
| 2011/0307947 | A1 | 12/2011 | Kariv et al. |
| 2012/0266228 | A1 | 10/2012 | Dash et al. |
| 2012/0303661 | A1 | 11/2012 | Blohm et al. |
| 2013/0014243 | A1 | 1/2013 | Chen et al. |
| 2013/0046987 | A1 | 2/2013 | Radhakrishnan |
| 2013/0047195 | A1 | 2/2013 | Radhakrishnan |
| 2013/0047213 | A1 | 2/2013 | Radhakrishnan et al. |
| 2013/0047214 | A1 | 2/2013 | Radhakrishnan et al. |
| 2013/0047226 | A1 | 2/2013 | Radhakrishnan et al. |
| 2013/0047266 | A1 | 2/2013 | Radhakrishnan et al. |
| 2013/0054751 | A1 | 2/2013 | Ponsford et al. |
| 2013/0091543 | A1 | 4/2013 | Wade et al. |
| 2013/0166456 | A1 | 6/2013 | Zhang et al. |
| 2013/0179952 | A1 | 7/2013 | O'Donnell et al. |
| 2013/0185567 | A1 | 7/2013 | Salyards |
| 2013/0198519 | A1 | 8/2013 | Marien |
| 2013/0198801 | A1 | 8/2013 | Nishizawa et al. |
| 2013/0219461 | A1 | 8/2013 | Esaki et al. |
| 2013/0276084 | A1 | 10/2013 | Canard et al. |
| 2013/0276088 | A1 | 10/2013 | Bjones et al. |
| 2014/0007205 | A1* | 1/2014 | Oikonomou ........... G06F 21/35 726/6 |
| 2014/0026200 | A1 | 1/2014 | Ekberg et al. |
| 2014/0096215 | A1 | 4/2014 | Hessler |
| 2014/0189823 | A1 | 7/2014 | Mowers et al. |
| 2014/0331297 | A1 | 11/2014 | Innes et al. |
| 2015/0310434 | A1* | 10/2015 | Cheung .................. G06Q 20/12 705/44 |
| 2015/0365439 | A1 | 12/2015 | Liverance et al. |

FOREIGN PATENT DOCUMENTS

| | | |
|---|---|---|
| JP | 2009508261 A | 2/2009 |
| JP | 2009245119 A | 10/2009 |
| JP | 2010287051 A | 12/2010 |
| WO | 2007033087 A1 | 3/2007 |
| WO | 2008091277 A2 | 7/2008 |
| WO | 2011134002 A1 | 11/2011 |

OTHER PUBLICATIONS

Apr. 5, 2019—(WO) International Search Report and Written Opinion—App PCTUS2019014954.
"Smart Cards—Answer to Reset (ATR)" https://www.eftlab.co.uk/index.php/site-map/our-articles/169-demystifying-atr-answer-to-reset Jan. 31, 2018, pp. 1-3.
"Dynamic-Link Libraries" https:/mdsn.microsoft.com/en-us/library/windows/desktop/ms682589(v=vs.85).aspx Feb. 2, 2018, 1 page.
Adam Oliver "Fast Smartcard is Here!" Citrix Blogs https://www.citrix.com/blogs/2018/06/12/fast-smartcard-is-here-2/ Jun. 12, 2018, pp. 1-8.
"LogonUI Property" https://msdn.microsoft.com/en-us/library/aa228374(v=vs.60).aspx Feb. 2, 2018, pp. 1-2.
"What is LogonUI.exe? Is LogonUI.exe spyware or a virus?" https://www.neuber.com/taskmanager/process/logonui.exe.html Feb. 2, 2018, pp. 1-2.
"Registry Value Types" https://msdn.microsoft.com/en-us/library/windows/desktop/ms724884(v=vs.85).aspx Feb. 1, 2018, pp. 1-3.
"SCardGetCardTypeProviderName function" https://msdn.microsoft.com/en-us/library/windows/desktop/aa379655(v=vs.85).aspx Jan. 31, 2018, pp. 1-4.
"SCardListCards functions" https://msdn.microsoft.com/en-us/library/windows/desktop/aa379789(v=vs.85).aspx Jan. 31, 2018, pp. 1-4.
"SCardTransmit function" https://mdsn.microsoft.com/en-us/library/windows/desktop/aa379804(v=v.85).aspx Feb. 2, 2018, pp. 1-5.
"Smart Card Standards" http://www.smartcardbasics.com/smart-card-standards.html Jan. 31, 2018, pp. 1-6.
"SCardGetStatusChange function" https://msdn.microsoft.com/en-us/library/windows/desktop/aa379773(v=vs.85).aspx Jan. 31, 2018, pp. 1-3.
Dec. 5, 2018—(KR) Office Action—App 10-2017-7011978.
Jul. 22, 2019—(KR) Notice of Allowance—App. 10-2017-7011978.
"Access Control Lists" http://msdn.microsoft.com/en-us/library/windows/desktop/aa374872(v=vs.85).aspx, Microsoft 2016, retrieved from website Aug. 30, 2016, p. 1.
"An Introduction to Claims", https://mdsn.microsoft.com/en-us/library/ff359101.aspx, Microsoft 2016, retrieved from website Aug. 30, 2016, pp. 1-11.
"Authentication Mechanism Assurance for ADDS in Windows Server 2008 R2 Step-by-Step Guide", http://technet.microsoft.com/en-us/library/dd378897(v=ws.10).aspx, Microsoft 2016, retrieved from website Aug. 30, 2016, pp. 1-30.
"1.3.2 Kerberos Network Authentication Service (V5) Synopsis," msdn.microsoft.com/en-us/library/cc233863.aspx, printed Apr. 17, 2013, pp. 1-3.

(56) References Cited

OTHER PUBLICATIONS

"Extended Protection for Authentication Overview," msdn.microsoft.com/en-us/library/vstudio/dd767318%28v=vs.90%29.aspx, printed Apr. 17, 2013, pp. 1-3.
"KERB_Certificate_Logon structure," msdn.microsoft.com/en-us/library/bb545680%28v=vs.85%29.aspx, printed Apr. 17, 2013, pp. 1-4.
"Kerberos and SPNEGO," The kSpace, Sep. 23, 2010, thekspace.com/home/component/content/article/54-kerberos-and-spnego.html, printed Apr. 18, 2013, pp. 1-3.
"Kerberos V5 System Administrator's Guide," web.mit.edu/Kerberos/krb5-1.9/krb5-1.9.1/doc/krb5-admin.html#pkinit-client-options, printed Apr. 17, 2013, pp. 1-63.
"LsaCallAuthenticationPackage function," msdn.microsoft.com/en-us/library/aa378261(v=vs.85).aspx, printed Apr. 17, 2013, pp. 1-4.
"Microsoft NTLM," msdn.microsoft.com/en-us/library/window/desktop/aa378749(v=vs.85).aspx, printed Apr. 18, 2013, pp. 1-3.
"Security Requirements for Cryptographic Modules," FIPS PUB 140-2, Information Technology Laboratory, National Institute of Standards and Technology, Issued May 25, 2001, pp. 1-69.
"Strong Authentication with One-Time Passwords in Windows 7 and Windows Server 2008 R2," Published Feb. 7, 2011, Updated Jan. 14, 2012, technet.microsoft.com/en-us/library/gg637807%28v=WS.10%29.aspx, printed Apr. 17, 2013, pp. 1-17.
[MS-KKDCP]: Kerberos Key Distribution Center (KDC) Proxy Protocol, msdn.microsoft.com/en-us/library/hh553774%28v=prot.20%29.aspx, printed Apr. 17, 2013, pp. 1-3.
Altman et al., "Channel Bindings for TLS," Jul. 2010, tools.ietf.org/html/rfc5929, © 2010 IETF Trust, printed Apr. 17, 2013, pp. 1-30.
ASN.1, Reference Card format USA: printed Apr. 17, 2013, pp. 1-2, available at www.oss.com/asn1/resources/reference/ASN.1-Reference-Card-format-USA.pdf.
BitzerMobile—Simplifying Enterprise Mobility; "Secure enterprise workspace on your mobile device," blitzermobile.com, printed Apr. 17, 2013, pp. 1-2.
Dierks and Rescorla, "The Transport Layer Security (TLS) Protocol Version 1.1," Apr. 2006, tools.ietf.org/rfc/rfc4346.txt, © The Internet Society 2006, pp. 1-86.
Dierks and Rescorla, "The Transport Layer Security (TLS) Protocol Version 1.2," Aug. 2008, tools.ietf.org/html/rfc5246, printed Apr. 17, 2013, pp. 1-208.
Dubuisson, "ASN.1: A Powerful Schema Notation for XML and Fast Web Services," ITU, http://www.itu.int/itu-t/asnl/xml/ASN1-XML-FastWebServices.pdf, Apr. 2004, pp. 1-33.
Franks et al., "HTTP Authentication: Basic and Digest Access Authentication," Jun. 1999, www.ietf.org/rfc/rfc2617.txt, © The Internet Society 1999, pp. 1-34.
Gemalto: security to be free; www.gemalto.com; printed May 9, 2013; pp. 1-10.
Hartman and Zhu, "A Generalized Framework for Kerberos Pre-Authentication," Apr. 2011, Request for Comments: 6113, © 2011, pp. 1-49.
Housley, "Cryptographic Message Syntax (CMS)," Jul. 2004, www.ietf.org/rfc/rfc3852.txt, © The Internet Society 2004, pp. 1-56.
International Search Report and Written Opinion of International Application No. PCT/US2014/036312, dated Sep. 5, 2014.
Jaganathan et al., "SPNEGO-based Kerberos and NTLM HTTP Authentication in Microsoft Windows," Jun. 2006, www.ietf.org/rfc/rfc4559.txt, © The Internet Society 2006, pp. 1-8.
Kerberos SSP/AP (Windows), msdn.microsoft.com/en-us/library/windows/desktop/aa377942%28v=vs.85%29.aspx, © 2013 Microsoft, printed Apr. 17, 2013, p. 1.
Kerberos: The Network Authentication Protocol; "What is Kerberos," web.mit.edu/Kerberos/, printed Apr. 29, 2013; pp. 1-3.
McPherson, "The Windows Negotiation Extension and Writing NegoEx SSPs," Microsoft Corporation, msdn.microsoft.com/en-us/library/ff468736.aspx, printed Apr. 17, 2013, pp. 1-23.

Neuman et al., "The Kerberos Network Authentication Service (V5)," Jul. 2005, www.ietf.org/rfc/rfc4120.txt, © The Internet Society 2005, pp. 1-136.
RSA Laboratories, "PKCS #11: Cryptographic Token Interface Standard," www.rsa.com/rsalabs/node.asp?id=2133, printed Apr. 18, 2013, pp. 1-4.
RSA Laboratories, "Public-Key Cryptography Standards (PKCS)," www.rsa.com/rsalabs/node.asp?id=2124, printed Apr. 18, 2013, pp. 1-2.
Zhu and Tung, "Public Key Cryptography for Initial Authentication in Kerberos (PKINIT)," Jun. 2006, tools.ietf.org/html/rfc4556, © The Internet Society 2006, pp. 1-84.
"Knowledge Center Communities Forums Blogs: About StoreFront," Citrix, retrieved Sep. 25, 2015 from <http://support.citrix.com/proddocs/topic/dws-storefront-21/dws-about.html>.
"Knowledge Center Communities Forums Blogs: Access Control Lists," Citrix, retrieved Sep. 26, 2015 from <http://support.citrix.com/proddocs/topic/netscaler-advanced-networking-93-map/ns-nw-acl-intro-wrapper-con.html>.
"Authentication Mechanism Assurance for AD DS in Windows Server 2008 R2 Step-by-Step Guide," Microsoft, retrieved Sep. 29, 2014 from <http://technet.microsoft.com/en-us/library/dd378897%28WS.10%29.aspx>.
"Deploy Remote Access with OTP Authentication," Microsoft, Jul. 16, 2014, retrieved from <http://technet.microsoft.com/en-us/library/hh831379.aspx>.
"Desktop Delivery Controller Administrator's Guide," Citrix Systems, Inc., 2008.
"GINA," Microsoft, 2014, retrieved from <http://msdn.microsoft.com/en-us/library/windows/desktop/aa375457(v=vs.85).aspx>.
"KERB_Certificate_Logon structure," Microsoft, retrieved Sep. 25, 2014 from <http://msdn.microsoft.com/en-us/library/windows/desktop/bb545680(v=vs.85).aspx>.
"KERB_Certificate_S4U_Logon structure," Microsoft, 2014, retrieved from <http://msdn.microsoft.com/en-us/library/windows/desktop/hh920948(v=vs.85).aspx>.
"KERB_Smartcard_CSP_Info structure," Microsoft, 2014, retrieved from <http://msdn.microsoft.com/en-us/library/windows/desktop/bb545682(v=vs.85).aspx>.
"Microsoft NTLM," Microsoft, retrieved Sep. 25, 2014 from <http://msdn.microsoft.com/en-us/library/windows/desktop/aa378749(v=vs.85).aspx>.
"Microsoft Remote Desktop Services (RDS) Explained," Yung Chou, Microsoft, Jan. 13, 2010, retrieved from <http://technet.microsoft.com/en-us/video/remote-services-rds-explained.aspx>.
"Microsoft Virtual Desktop Infrastructure (VDI) Explained," Yung Chou, Jan. 6, 2010, retrieved from <http://blogs.technet.com/b/yungchou/archive/2010/01/06/microsoft-virtual-desktop-infrastructure-vdi-explained.aspx>.
"1.3 Overview," Microsoft, 2014, retrieved from <http://msdn.microsoft.com/en-us/library/hh537180.aspx>.
"OS Virtualization for Windows," Microsoft, 2014, retrieved Sep. 29, 2014 from <http:/www.microsoft.com/en-us/windows/enterprise/products-and-technologies/virtualization/operating-system/default.aspx>.
"PC/SC Workgroup Specifications Overview," PS/SC Workgroup, retrieved Sep. 25, 2014 from <http://www.pcscworkgroup.com/specifications/overview.php>.
"Interoperability Specification for ICCs and Personal Computer Systems: Part 1. Introduction and Architecture Overview," PC/SC Workgroup, Sep. 2005.
"Cryptographic Message Syntax (CMS)," R. Housley, Vigil Security, Sep. 2009.
"Assertions and Protocols for the OASIS Security Assertion Markup Language (SAML) V2.0," OASIS Standard, Mar. 15, 2005.
May 13, 2019—EP Examination Report—App. No. 15778842.3.
"Citrix StoreFront 2.0: Proof of Concept Implementation Guide," Citrix Systems, Inc., 2013.
"Strong Authentication with One-Time Passwords in Windows 7 and Windows Server 2008 R2," Microsoft, Jan. 14, 2012, retrieved from <http://technet.microsoft.com/en-us/library/gg637807(v=ws.10).aspx>.

(56) References Cited

OTHER PUBLICATIONS

"The Cryptography API, or How to Keep a Secret," Robert Coleridge, Aug. 19, 1996, retrieved from <http://msdn.microsoft.com/en-us/library/ms867086.aspx>.
"Winlogon and GINA," Microsoft, 2014, retrieved from <http://msdn.microsoft.com/en-us/library/windows/desktop/aa380543(v=vs.85).aspx>.
"Public Key Cryptography for Initial Authentication in Kerberos (PKINIT)," L. Zhu et al., The Internet Society, Jun. 2006.
"10 reasons your company is more secure with KNOX [infographic]," Samsung KNOX News, Jun. 8, 2015.
"Securing Administrator Access to Internal Windows Servers," Gemalto, last accessed Oct. 4, 2015.
"Access Control Lists," Microsoft, 2015, retrieved from <https://msdn.microsoft.com/en-us/library/windows/desktop/aa374872(v=vs.85).aspx>.
"Authentication," Django REST Framework, retrieved Aug. 26, 2015 from <http://www.django-rest-framework.org/api-guide/authentication/>.
"Authentication Mechanism Assurance for AD DS in Windows Server 2008 R2 Step-by-Step Guide," Microsoft, retrieved Sep. 21, 2015 from <http://technet.microsoft.com/en-us/library/dd378897%28WS.10%29.aspx>.
"Configuring Additional LSA Protection," Microsoft, retrieved Sep. 21, 2015 from <https://technet.microfosft.com/em-us/library/dn408187.aspx>.
"Credential Guard," Microsoft, retrieved Sep. 21, 2015 from <https://technet.microfosft.com/em-us/library/mt483740%28v=vs.85%29.aspx>.
"Credential Processes in Windows Authentication," Microsoft, retrieved Sep. 18, 2015 from <https://technet.microfosft.com/em-us/library/dn751047.aspx>.
"Device Guard overview," Microsoft, retrieved Sep. 21, 2015 from <https://technet.microfosft.com/em-us/library/dn986865%28v=vs.85%29.aspx>.
"Enterprise Certification Authorities," Microsoft, retrieved Aug. 26, 2015 from <https://technet.microfosft.com/em-us/library/Cc771443(d=printer).aspx>.
"FAQ: Citrix Secure Gateway Secure Ticket Authority," Citrix, last modified Oct. 14, 2014, retrieved from <http://support.citrix.com/article/CTX11997>.
"Specifications Overview," FIDO Alliance, 2015.
"Maximize the value of your software," Gemalto, retrieved Sep. 28, 2015 from <http://www.gemalto.com/>.
"What is a Hardware Security Module," Safenet, retrieved Sep. 18, 2015 from <http://safenet-inc.com/data-encryption/hardware-security-modules-hsms/>.
"How to Configure the Management NIC and Inter-Process Communications in a Multi-Homed Environment for Citrix Provisioning Services 6.0 and 6.2," Citrix, retrieved Aug. 27, 2015 from <http://suuport.citrix/article/CTX200196>.
"How to import third-party certification authority (CA) certificates into the Enterprise NTAuth store," Mircosoft, retrieved Sep. 21, 2015 from <http://support.microsoft.com/en-us/kb/295663>.
"Inter-Process communication using WCF," Philippe Leefsma, Cloud and Mobile, Dec. 27, 2013.
"Interprocess Communications," Microsoft, retrieved Aug. 27, 2015 from <http://msdn.microsoft.com/en-us/library/windows/desktop/aa365574(v=vs.85).aspx>.
"Introduction to Windows for Smart Cards," Microsoft, retrieved Aug. 27, 2015 from <http://technet.microsoft.com/en-us/library/Dd277375.aspx>.
"iOS Security: iOS 8.3 or later," Apple, Jun. 2015.
"ISO 7816-4: Interindustry Commands for Interchange," Jacquinot Consulting, Inc., retrieved Aug. 27, 2015 from <http://www.casrdwerk.com/smartcards/smartcard_standard_ISO7816-4_5_basic_organizations.aspx>.
"KERB_Certificate_Logon structure," Microsoft, retrieved Sep. 18, 2015 from <http://msdn.microsoft.com/en-us/library/windows/desktop/bb545680(v=vs.85).aspx>.
"Klist," Microsoft, retrieved Sep. 28, 2015 from <https://technet.microsoft.com/en-us/library/hh134826.aspx>.
"Learn REST: a Tutorial: 1. What is REST?," Dr. M. Elkstein, Aug. 26, 2015 from http://rest.elkstein.org/2008/02/what-is-rest.html>.
"Learn REST: a Tutorial: 14.3. How do I handle authentication in REST?," Dr. M. Elkstein, Aug. 26, 2015 from http://rest.elkstein.org/2008/01/how-do-i-handle-authentication-in-rest.html>.
"Lightweight Directory Access Protocol," Microsoft, retrieved Sep. 28, 2015 from <https://msdn.microsoft.com-en-us/library/aa367008(v-vs.85.aspx>.
"Microsoft NTLM," Microsoft, retrieved Sep. 18, 2015 from <http://msdn.microsoft.com/en-us/library/windows/desktop/aa378749(v=vs.85).aspx>.
"Microsoft SMB Protocol and CIFS Protocol Overview," Mircosoft, retrieved Sep. 28, 2015 from <https://msdn.microsoft.com/en-us/library/windows/desktop/aa365233(v=vs.85)aspx>.
"Mitigating Pass-the-Hash (PtH) Attacks and other Credential Theft Techniques," Microsoft Corporation, 2012.
"Monitoring Citrix StoreFront," eG Innovations Inc., 2014.
"Protected Users Security Group," Mircosoft, retrieved Sep. 21, 2015 from <https://technet.microsoft.com/en-us/library/dn466518.aspx>.
"RADIUS Protocol and Components," Microsoft, retrieved Aug. 26, 2015 from <https://technet.microsoft.com/en-us/library/Cc726017(v=WS.10).aspx>.
"Remote Desktop Session Host (RD Session Host)," Mircrosoft, retrieved Sep. 18, 2015 from <https://technet.microsoft.com/en-us/library/cc742822.aspx>.
"Restrictions around Registering and Installing a Security Package," Microsoft, retrieved Sep. 21, 2015 from <https://msdn.microsoft.com/en-us/library/windows/desktop/dn865014%28v=vs.85%29.aspx>.
"Remote Authentication Dial in User Service (RADIUS)," C. Rigney et al., The Internet Society, Jun. 2000.
"Samsung KNOX 2.0 Upgrade Guide," Samsung Electronics Co., Jan. 2015.
"Samsung KNOX User Guide," Samsung Electronics Co., Jan. 7, 2015.
"Samsung KNOX," Enterprise Mobility Solutions, Samsung Electronics Co., Ltd., Apr. 2013.
"Servers—Unified Computing," Cisco, retrieved Sep. 21, 2015 from <http://www.cisco.com/c/en/us/products/servers-unified-computing/index.html>.
"SmartCard Readers," Gemalto, retrieved Sep. 28, 2015 from <http://www.gemalto.com/readers>.
"Step 3: Plan OTP Certificate Deployment," Microsoft, retrieved Sep. 18, 2015 from <https://technet.microsoft.com/en-us/library/JJ134161.aspx>.
"Strong Authentication with One-Time Passwords in Windows 7 and Windows Server 2008 R2," Microsoft, retrieved Sep. 18, 2015 from <https://technet.microsoft.com/en-us/library/Gg637807%28v=WS.10%29.aspx>.
"What is Apple's new Secure Enclave and why is it important?," Quora, retrieved Aug. 27, 2015 from <http://www.quora.com/What-is-Apple%E2%80%99s-new-Secure-Enclave-and-why-is-it-important>.
"What's New in Active Directory Certificate Services (AD CS) in Windows Server 2008 R2," Microsoft, retrieved Sep. 21, 2015 from <https://technet.microsoft.com/en-us/library/dd448537%28v=ws.10%29.aspx>.
"Windows Interactive Logon Architecture," Microsoft, retrieved Sep. 18, 2015 from <https://technet.microsoft.com/en-us/library/ff404303%28v=ws.10%29.aspx>.
"Windows Trusted Platform Module Management Step-by-Step Guide," Microsoft, retrieved Sep. 18, 2015 from <https://technet.microsoft.com/en-us/library/cc749022(v=ws.10).aspx>.
"Workstation Service," Microsoft, retrieved Sep. 28, 2015 from <https://technet.microsoft.com/en-us/library/cc939966.aspx>.
International Search Report and Written Opinion of International Application No. PCT/US2015/053118, dated Dec. 8, 2015.
"Federated Authentication Service", https://docs.citrix.com/en-us/xenapp-and-xendesktop/7-9/secure/federated-authentication-service.html, Jun. 22, 2016, pp. 1-28.

(56) References Cited

OTHER PUBLICATIONS

"How SmartAccess Works for XenApp and XenDesktop", https://docs.citrix.com/en-us/netscaler-gateway/10-1/ng-xa-xd-integration-edocs-landing/ng-integrate-web-interface-apps-wrapper/ng-smartaccess-wrapper, Feb. 17, 2014, pp. 1-2.
Microsoft Edge Team, "Guard for Microsoft Edge", https://blogs.windows.com/msedgedev/2016/09/27/application-guard-microsoft-edge/, retrieved Aug. 23, 2017, pp. 1-16.
"Introduction to JSON Web Tokens", https://jwt.io/introduction/, retrieved from website Aug. 30, 2016, pp. 1-10.
"Local Security Authority Subsystem Service" https://en.wikipedia.org/wiki/Local_Security_Authority_Subsystem_Service, retrieved from website Aug. 30, 2016, pp. 1-2.
"Microsoft SMB Protocol and CIFS Protocol Overview", https://msdn.microsoft.com/en-us/library/windows/desktop/aa365233(v=vs.85).aspx, retrieved from website Aug. 30, 2016, pp. 1-2.
"Protect your enterprise data using Windows Information Protection (WIP)", https://docs.microsoft.com/en-us/windows/threat-protection/windows-information-protection/protect-enterprises-data-using-wip, retrieved from website Aug. 23, 2017, pp. 1-13.
"Rights Management sharing application user guide", https://docs.microsoft.com/en-us/information-protection/rms-client/sharing-app-user-guide, Jul. 27, 2017, pp. 1-5.
"VMware User Environment Manager" VMware 2015, www.vmware.com, pp. 1-2.
"Web SSO Design", https://technet.microsoft.com/en-us/library/dd807033(v=ws.11).aspx, retrieved from website Aug. 30, 2016, p. 1.
Jul. 26, 2018—(JP) Office Action—App 2017-515810.

\* cited by examiner

DYNAMIC ACCESS CONTROL TO NETWORK RESOURCES USING FEDERATED FULL DOMAIN LOGON

CROSS-REFERENCE TO RELATED APPLICATIONS

This application claims priority to U.S. provisional patent application Ser. No. 62/381,996, filed Aug. 31, 2016, entitled "DYNAMIC ACCESS CONTROL TO NETWORK RESOURCES USING FEDERATED FULL DOMAIN LOGON." This application is also a continuation-in-part of pending U.S. patent application Ser. No. 14/870,447, filed Sep. 30, 2015 and entitled "FEDERATED FULL DOMAIN LOGON," which claims priority to U.S. provisional patent application Ser. No. 62/057,344, filed Sep. 30, 2014, entitled "FAST SMART CARD LOGON AND FEDERATED FULL DOMAIN LOGON." Each of the prior applications is herein incorporated by reference in its entirety.

FIELD

Aspects described herein generally relate to determining, for a client device, a level of access to one or more resources in a remote computing environment.

BACKGROUND

Traditionally, smart card authentication involves numerous interactions between a server (authentication) device and a client device. In remote computing environments, the numerous interactions are greatly slowed down by any increase in latency on connections between the server and the client. Moreover, client devices attempting to logon to a remote computing session might not be given full domain privileges.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Methods and systems for giving a client device access to one or more resources in a remote computing environment are described herein. During authentication, context information for the client device, such as device type, device location, etc., may be determined. A computing device in the system may receive data indicating the context information, such as data indicating that the user is at a particular location and/or is of a particular device type. One or more labels for a session associated with the user of the client device may be determined based on the data indicating the context information. The computing device may generate an authentication certificate comprising one or more labels. Based on the certificate, one or more access groups for the user of the client device may be determined, and the user of the client device may be granted or denied access to one or more resources according to the access group(s).

To overcome limitations in the prior art described above, and to overcome other limitations that will be apparent upon reading and understanding the present specification, aspects described herein are directed towards methods and systems for faster and more efficient logon, such as with a smart card, and for giving a client device full domain access in a remote computing environment.

Fast smart card logon may be used to reduce latency and improve security. For example, the system may reduce the number of operations (e.g., interactions) between a server device used for authentication and the client device. These operations may include fetching a user certificate from the smart card or signing data. Fast smart card logon may also improve security by optionally avoiding PIN (or other credential) transmission over networks, and to enable single sign on from an authentication event (e.g., Secure Sockets Layer (SSL) or Transport Layer Security (TLS) authentication) using a smart card to the actual remote computing environment logon without resorting to PIN caching.

The components used to implement fast smart card logon may also be used to implement a federated full domain logon. A virtual smart card credential, which may be ephemeral, may be issued based on the acceptance of an external authentication event. Example external authentication events include logon at a Security Assertion Markup Language (SAML) Identity Provider, smart card authentication over TLS or SSL, and alternative authentication credentials such as biometrics or one-time password (OTP) without AD password. Moreover, the certificate operation interception components from fast smart card logon may be used to enable interaction with the virtual smart card without fully emulating a smart card at the PC/SC API level. The virtual smart card may be created locally on the remote computing environment or on a separate server that may be highly protected.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
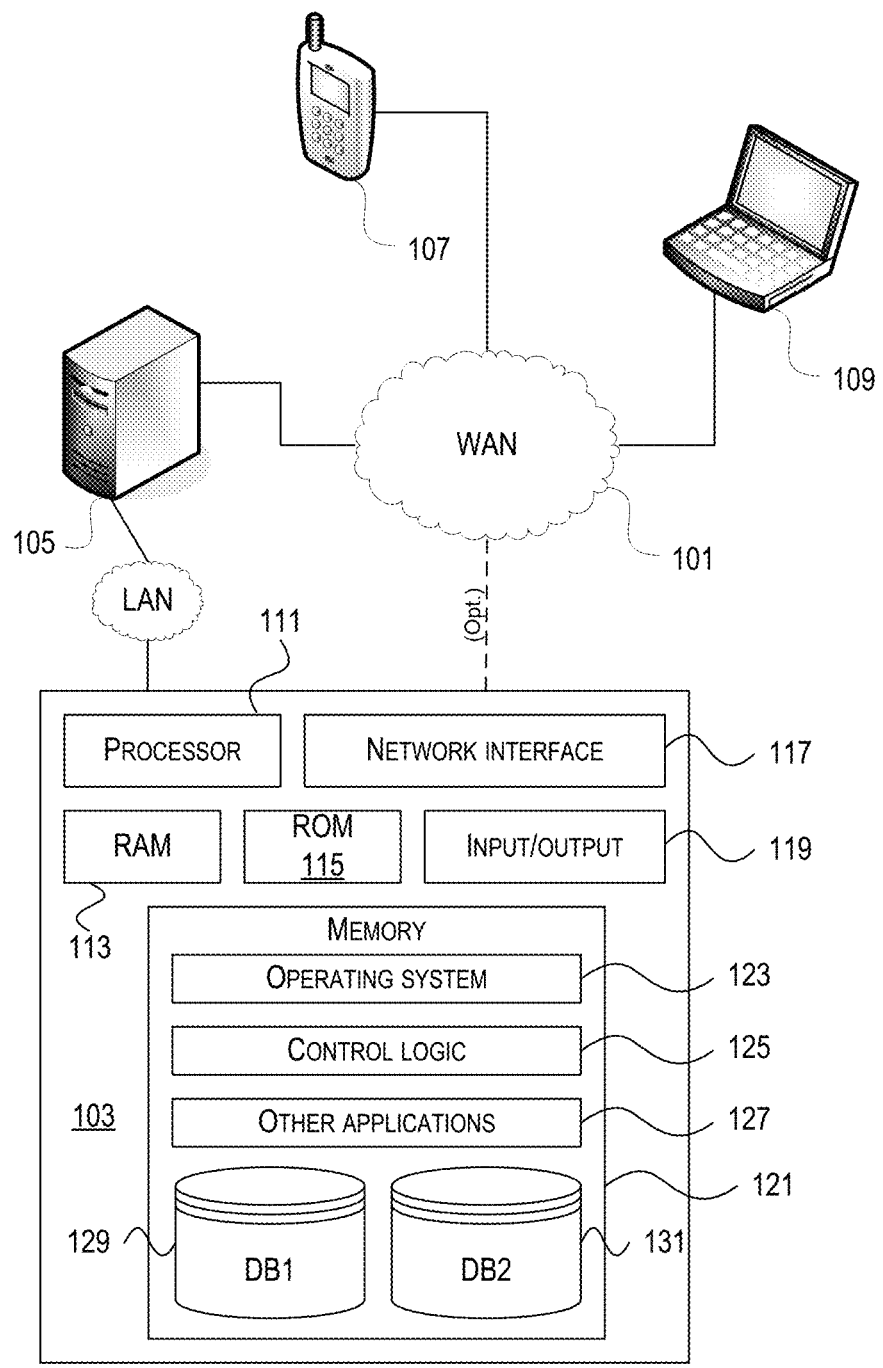
FIG. 1 depicts an illustrative computer system architecture that may be used in accordance with one or more illustrative aspects described herein.

Computer software, hardware, and networks may be utilized in a variety of different system environments, including standalone, networked, remote-access (also known as, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
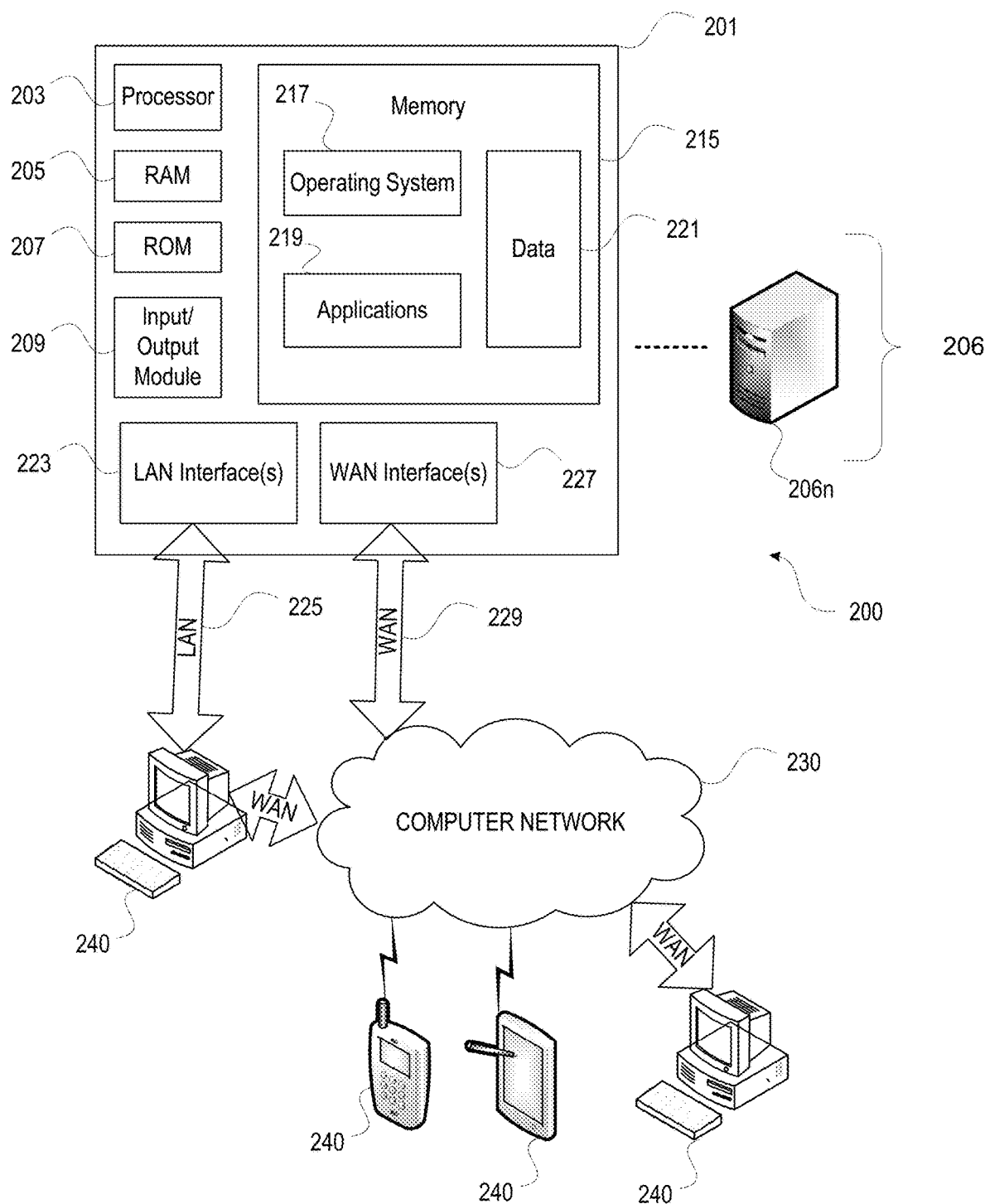
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
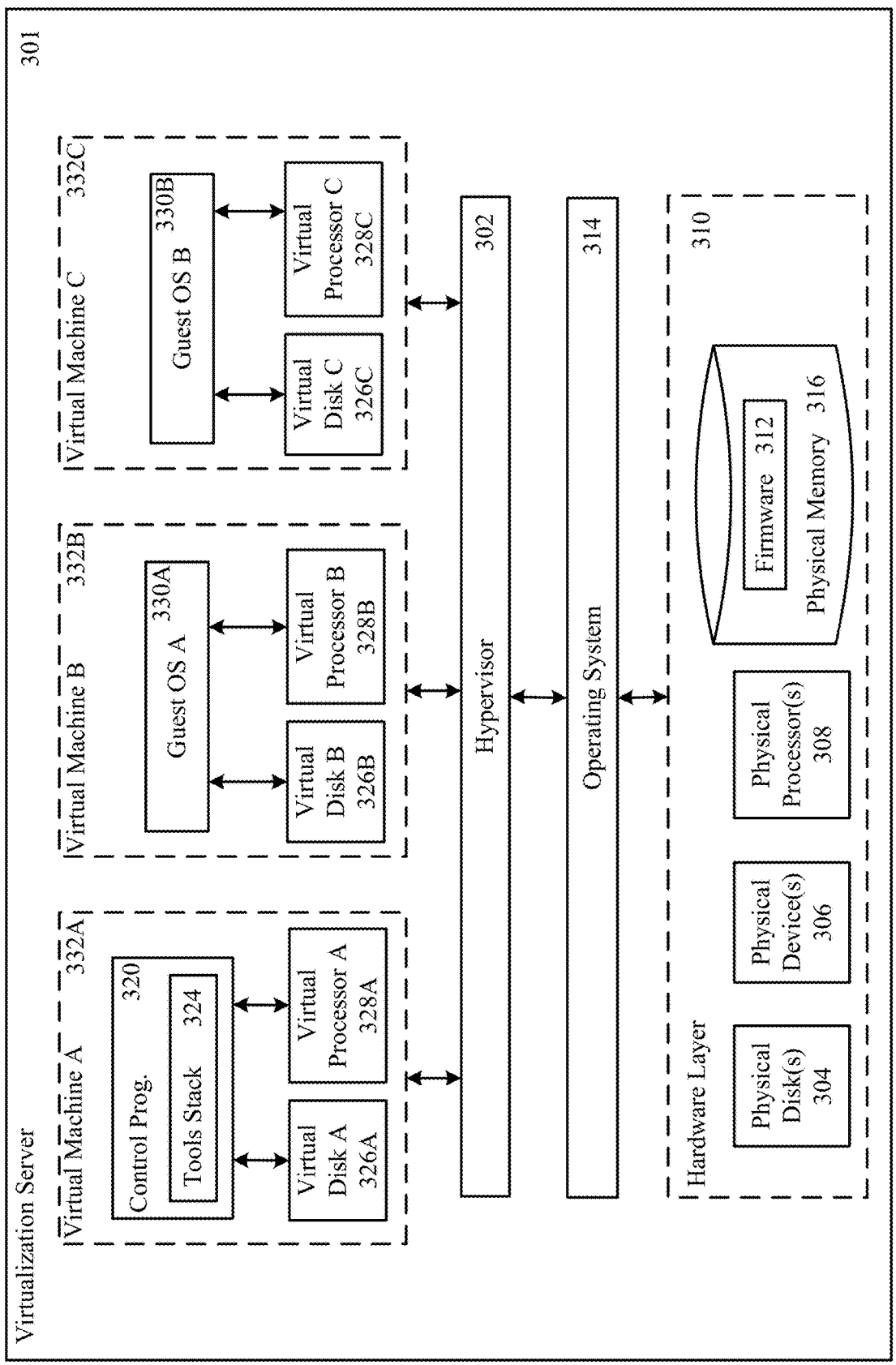
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
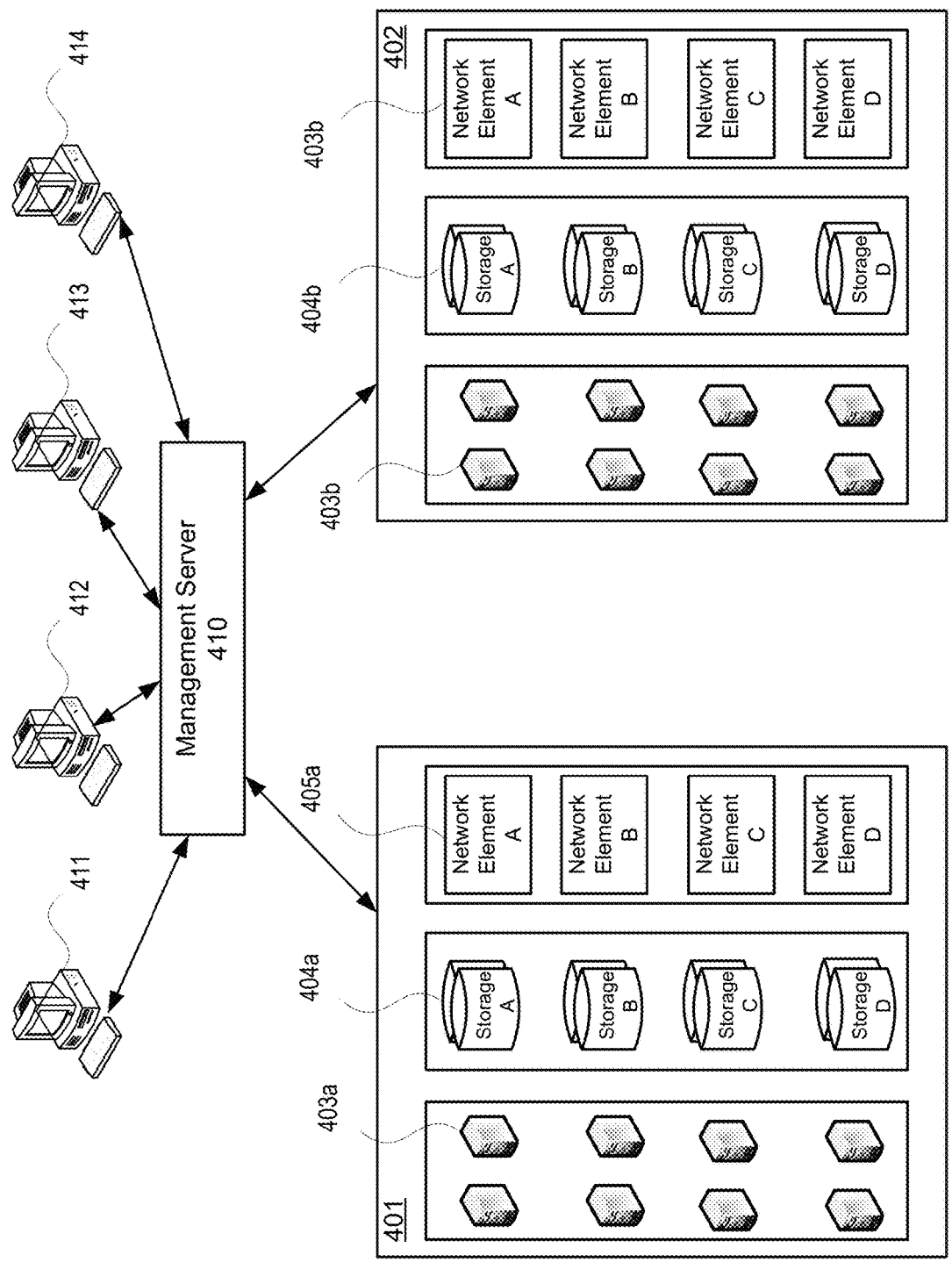
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
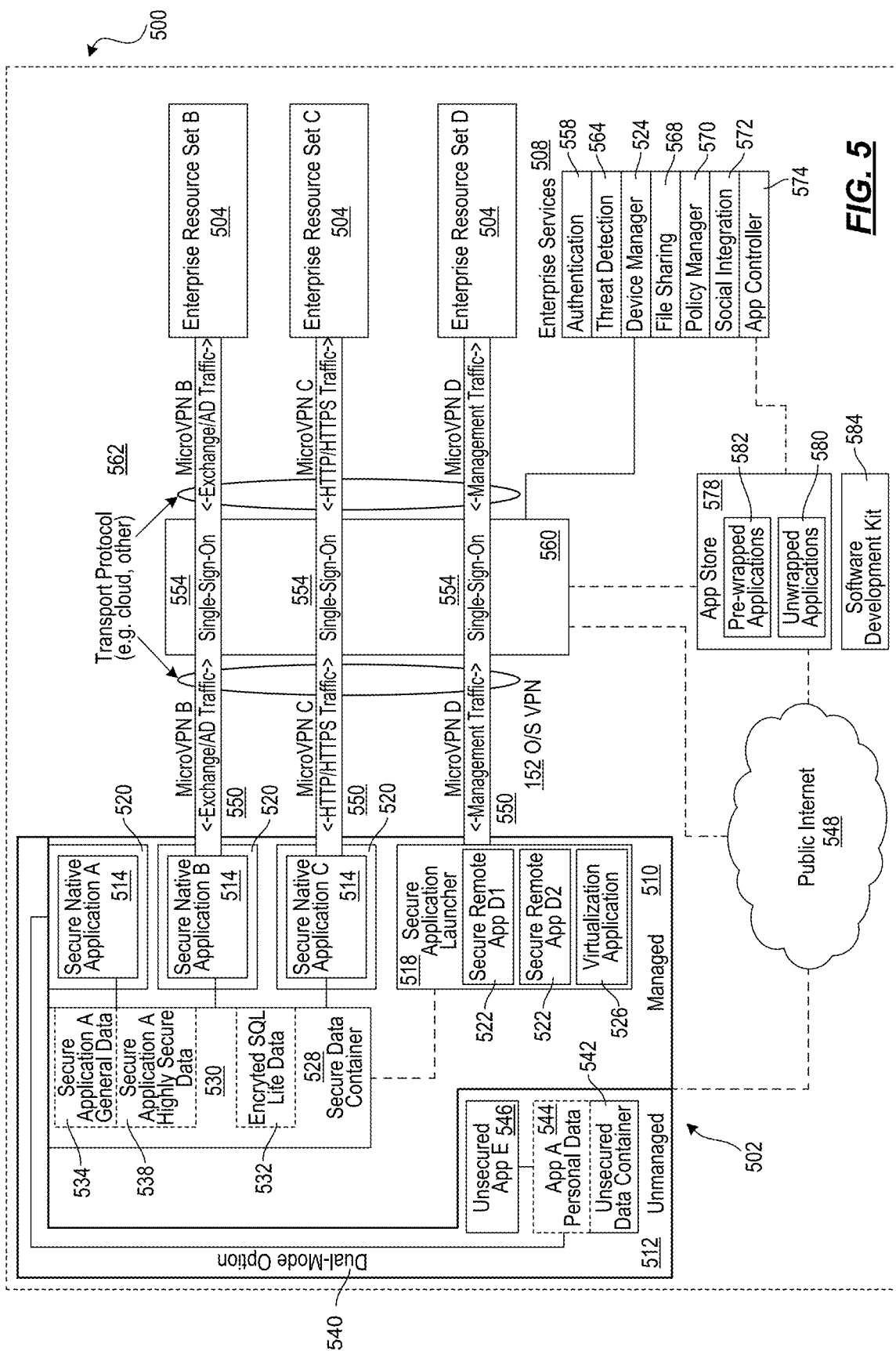
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is not accessible by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application may use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications (e.g., as illustrated by microVPNs 550), particular devices, particular secured areas on the mobile device (e.g., as illustrated by O/S VPN 552), and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
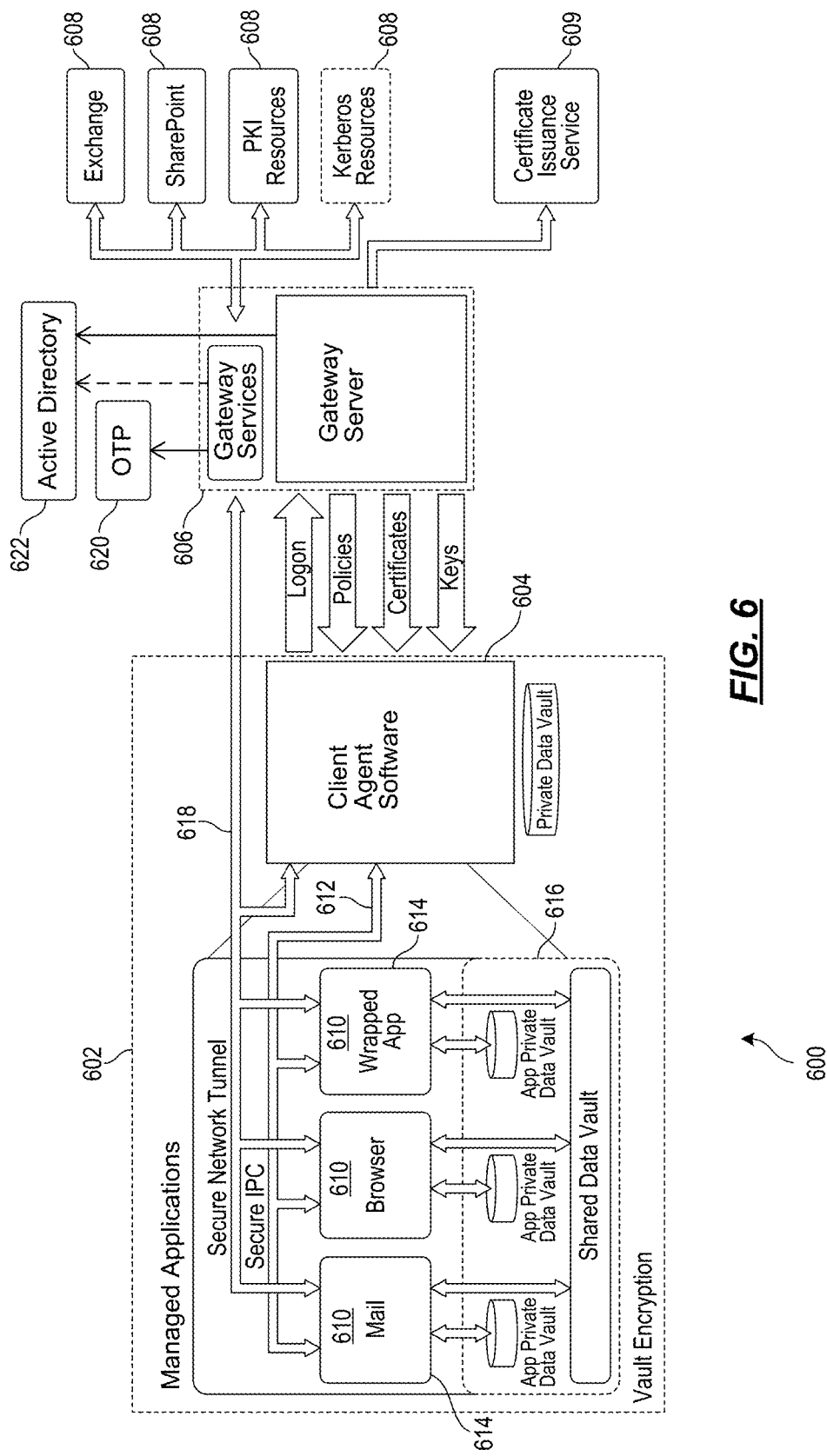
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework

614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases might not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to more sensitive data using strong authentication, and ensure that access to these applications is only permitted after performing appropriate authentication, even if this means a re-authentication is requested from the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector might cause multiple copies of the same encrypted data to yield different cipher text output, preventing both replay and cryptanalytic attacks. This may also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate might never be present in the iOS keychain and might not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is used, when an application reads a certificate for "who am I," when an application uses the certificate to build a secure session token, and when an application uses private keys for digital signing of important data (e.g. transaction log) or for temporary data encryption.

Illustrative Embodiments of Smart Card Login

Fast smart card logon may be used to authenticate a user or client device to a server, such as an interactive server (e.g., a MICROSOFT Virtual Desktop Infrastructure (VDI)/Remote Desktop Services (RDS) server, and the like), using a smart card, while reducing latency and improving security. For example, the system may reduce the number of operations (e.g., interactions) between a server device used for authentication and the client device. These operations may include fetching a user certificate from the smart card or signing data. Accordingly, smart card network chatter that cause PC/SC logons to be slow may be reduced. Fast smart card logon may also improve security by optionally avoiding PIN (or other credential) transmission over networks, and to enable single sign on from an authentication event (e.g., Secure Sockets Layer (SSL) or Transport Layer Security (TLS) authentication) using a smart card to the actual interactive server logon without resorting to PIN caching.

Figure 7:
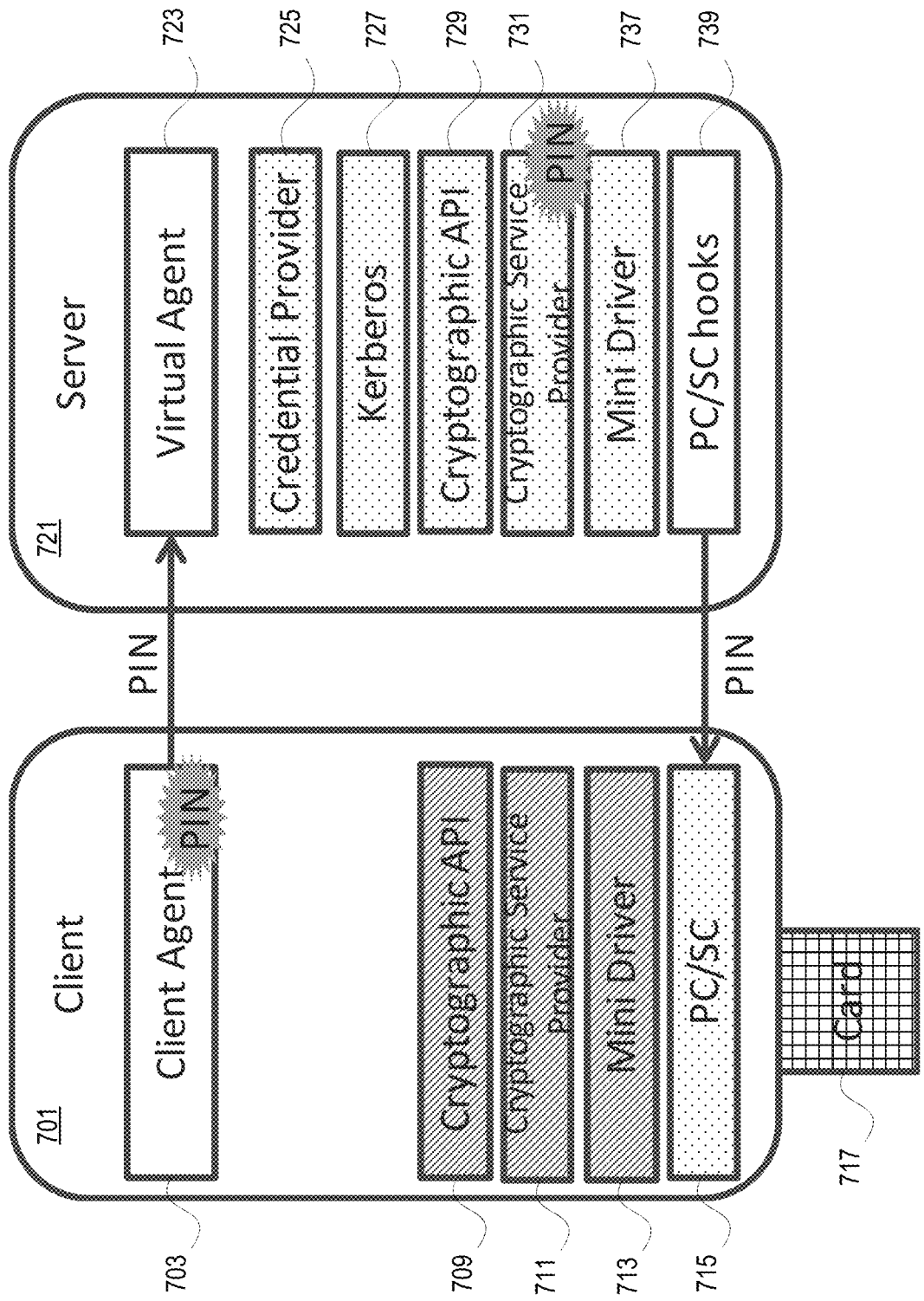
FIG. 7 depicts an illustrative system for smart card logon in accordance with one or more illustrative aspects described herein.

FIG. 7 depicts an illustrative system for smart card logon in accordance with one or more illustrative aspects described herein. As previously discussed, the client device 701 illustrated in FIG. 7 may interact with the server 721 also illustrated in FIG. 7 for authentication and for the server 721 to provide remote application services. For example, the client device 701 may include a client agent 703, such as a virtual machine program or application used to display application output generated by an application remotely executing on the server 721 or other server.

The client device 701 may include a cryptographic application programming interface 709 (CAPI) that enables applications to encrypt or sign data, a cryptographic service provider 711 (CSP), and a mini driver 713. In some embodiments, the CAPI 709, CSP 711, and mini driver 713 might not be used by the client device 701 during smart card logon.

The server 721 may include a virtualization agent (or virtual agent) 723. The server 721 may also include a credential provider 725, Kerberos module 727, CAPI 729, CSP 731, and mini driver 737. The server 721 may use these components to authenticate the client device 701 and/or for the client device 701 to sign data. Each of the client device 701 and the server 721 may also include a low level Personal Computer/Smart Card (PC/SC) layer 715 or 739 used for smart card integration. The smart card 717 may be physically connected to the client device 701, as illustrated in FIG. 7. The client device 701 may additionally or alternatively use a virtual smart card, as will described in further detail below.

In some aspects, the user may be prompted for a personal identification number (PIN) or other credential for authentication. The client agent 703 may capture the PIN, optionally store the PIN, and send the PIN, over a network connection, to the virtual agent 723 at the server 721. The CAPI 729 at the server 721 may comprise third party or public APIs. Moreover, drivers for smart card authentication may be on the server side, which may enable inter-operating system compatibility. The cryptographic service provider 731 on the server side may store (e.g., cache) the PIN received from the client device 701. During the authentication process, the server 721 may send the PIN back to the client device 701 via the PC/SC layer 739 in order to obtain credentials, such as one or more certificate, from the smart card 717 at the client device 701. During the smart card interactions at the PC/SC layer 715 and 739, the client device 701 and server 721 may interact hundreds of times, such as on the order of 500 round-trip requests. A second method for fast smart card login may reduce the number of times that the client device 701 and server 721 interact during smart card authentication, such as one, two, or three interactions, as will now be described.

Figure 8:
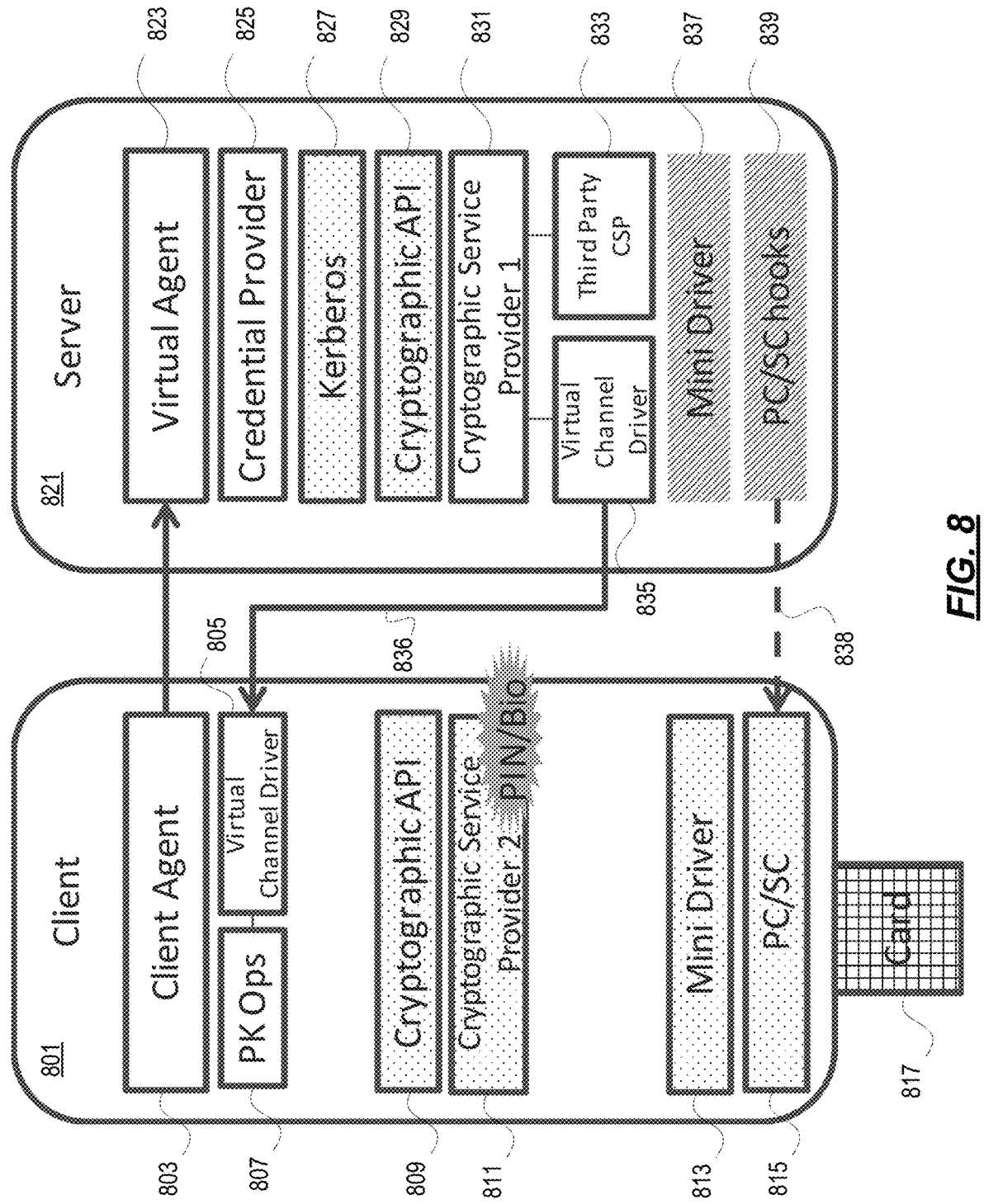
FIG. 8 depicts an illustrative system for fast smart card logon in accordance with one or more illustrative aspects described herein.

FIG. 8 depicts an illustrative system for fast smart card logon in accordance with one or more illustrative aspects described herein. Fast smart card logon may involve interactions between the client device 801 and the server 821 at a higher communication level (e.g., a domain logon with client certificate), rather than the PC/SC level 815 and 839. This may reduce the number of interactions between the client device 801 and the server 821 and/or the amount (e.g., volume) of data exchanged between the client device 801 and server 821.

As previously discussed with respect to FIG. 7, the client device may include a client agent 803, a CAPI 809, a CSP 811 (e.g., CSP 2 illustrated in FIG. 8), a mini driver 813, and the PC/SC 815. However, the client device may use its own CAPI 809, CSP 2 811, and mini driver 813 for smart card authentication, rather than relying on the server's CAPI 829, CSP 831, and mini driver 837. A smart card 817, which may be a biometric smart card (or any other smart card), may also be physically connected to the client device 801. The smart card 817 may store credentials, such as certificates.

The client agent 803 may establish a negotiation session with the virtual agent 823 of the server 821, via a display remoting connection to the virtual agent 823. During the negotiation session, the server 821 (e.g., the virtual agent 823 of the server 821) may determine whether to perform a traditional smart card logon or a fast smart card logon. As noted above, the fast smart card logon may involve fewer interactions between the server 821 and the client device 801. The client device 801 and server 821 may announce their capabilities to one another during the negotiation session.

The virtual agent 823 may also determine whether the client agent 803 provided the virtual agent 823 with automatic logon credentials. During a brokering step, the client device 801 may have authenticated with another (e.g., authentication) server, and the user may have provided a password, PIN, biometrics, or other credentials. The smartcard 817 may have been used during the brokering step, and the smartcard 817 may have been unlocked if the authentication with the first server was successful. The brokering step and smartcard unlock step may occur before the negotiation session between the client agent 803 and the virtual agent 823 or may occur during the negotiation session between the client agent 803 and the virtual agent 823. Accordingly, the virtual agent 823 may determine during the negotiation session that auto logon credentials were provided by the client agent 803. In some aspects, the virtual agent 823 may determine to use fast smart card logon if future PIN (or other credential) prompts at the client might be beneficially blocked, such as if auto logon credentials were provided. Otherwise, the virtual agent 823 may determine to use traditional smart card logon (e.g., smart card authentication via the PC/SC layer).

The server 821 may consider one or more other factors to determine which logon scheme to use. For example, the server 821 may determine to use fast smart card logon if the client device 801 indicates (e.g., during the negotiation session) that the client device 801 prefers to use fast smart card logon (e.g., smart card authentication). The server 821 may also determine whether it is capable of performing fast smart card logon. In some aspects, the server 821 may determine whether to perform fast smart card logon based on the number of user prompts for the PIN. For example, the server 821 may determine to use fast smart card logon if one or fewer user PIN prompts will occur (e.g., once during the brokering step or once during the brokering step and the negotiation step). Any other threshold number of PIN prompts may be used. Otherwise, the server 821 may determine not to use the fast smart card logon scheme.

After the user provides a PIN or other credential (e.g., a biometric), the CSP 811 of the client device 801 may store (e.g., cache) the PIN, biometric, or other credential, or otherwise keep the smart card unlocked for further use by the client device 801. By storing the PIN or biometric at CSP 2 811, the client device 801 may communicate directly with the smart card 817 to obtain security certificates, rather than the CSP 831 of the server 821 communicating with the smart card 817 to obtain certificates, as illustrated in FIG. 7. Accordingly, the PIN or biometric may remain on the client device 801 rather than being transmitted (sometimes multiple times) between the client device 801 and server 821 over a network that may or may not be secured. In alternative embodiments, the client agent 803 may send the PIN or biometric to the server 821. The server 821 may store the PIN or biometric at, for example, the CSP 833, as will be described in further detail below. In the example of biometrics (e.g., a fingerprint), smart card authentication may be significantly sped up (relative to other smart card authentication schemes) due to the large amount of data used for fingerprints or other biometrics.

The client device 801 may also include a Private Key Operation (PKOperation) SDK module 807 configured to process certificate operations, such as with the smart card

817. The functionality of the PKOperation SDK 807 is described in co-pending non-provisional U.S. patent application Ser. No. 13/886,845, which is hereby incorporated by reference in its entirety. In particular, the PKOperation SDK module 807 of the client device 801 may facilitate access to a keystore that stores one or more client certificates with corresponding private keys that may be used to sign for authentication purposes. For example, the client device 801 may authorize access to or have possession of a client certificate representing the user of the client device 801. In some aspects, the certificate may be an enterprise-issued certificate. The certificate may be bound to a physical smart card having a cryptographic module. In other words, the cryptographic secret may be confined to the smart card. The user may authorize the client device 801 to access the smart card protected certificate.

Alternatively, the certificate may be bound to a derived credential (e.g., a virtual smart card), which may use hardware and/or software modules to protect the key. The certificates in the derived credential may be stored at the client device 801 and may be accessed similar to the certificates on a physical smart card 817. The certificates from the derived credential may be stored in a trusted environment at the client device 801.

The client device 801 and/or a removable hardware module of the client device may be authorized by a provisioning process to store the certificate and private key. The user may be requested to enter a PIN or other credential (e.g., a biometric) using the client device 801 to authorize operations involving the client certificate private key. Another external device separate from the client device 801 (e.g., a smartphone) may control the certificate, and the client device 801 may utilize a custom reader interface to access the certificate controlled by the external device.

Turning now to the server 821, the server 821 may include the virtual agent 823 and a CAPI 829, as previously discussed above and with respect to FIG. 7. The server 821 may include a CSP 831, but might not utilize the CSP 831 for smart card authentication. Rather, the client-side CSP 811 might be utilized instead. The server 821 may also include one or more credential providers, including a credential provider 825 (or a credential provider filter) configured to initiate smart card logons. The virtual agent 823 may select the credential provider to use for fast smart card logon, such as the credential provider 825. If Kerberos authentication is utilized, the credential provider 825 may communicate with a trusted third party device 827 (e.g., a Kerberos module), as will be described in further detail in the examples below.

The server 821 may include a cryptographic service provider CSP 831 and/or (optionally) a key storage provider (KSP), which is not illustrated. In other words, the CSP 831 may be replaced by a KSP. A KSP may be used to support alternative smart card algorithms that might not be supported by the CSP 831. Similarly, the CSP 811 on the client device 801 may be replaced by a KSP. The CSPs (and/or KSPs) may be configured to intercept certificate operations. The credential provider 825 may select the CSP to use for fast smart card logon, such as CSP 831. The CSP 831 (and/or a KSP) at the server 821 may communicate with the PKOperation SDK 807 at the client device 801 via a remoting channel 836. For example, a virtual channel 836 between the client device 801 and the server 821 may be established by the virtual channel driver 805 of the client device 801 and the virtual channel driver 835 of the server 821.

Operations using the client device 801, such as a request for a certificate from the smart card 817 or a request to sign data, may be sent from the CSP 831 (and/or a KSP) at the server 821 to the PKOperation SDK 807 at the client device 801 (e.g., via the virtual channel 836). By communicating at a higher level (e.g., via the virtual channel 836 rather than PC/SC tunnel 838), the server and client device pair illustrated in FIG. 8 may communicate fewer times and/or less information to one another than the server and client device pair illustrated in FIG. 7, reducing potential latency.

The server 821 may also comprise a CSP 833, such as a third party CSP, for server-side authentication operations that do not involve communicating with the client device 801 (or the smart card 817). As previously discussed, the server 821 may also include a Mini Driver 837 and PC/SC hooks 839. In some aspects, the Mini Driver 837 and PC/SC 839 might not be used for client device authentication. In other aspects, the PC/SC 839 may communicate with PC/SC 815 at the client device 801 via another virtual channel 838.

General operations for authentication using a smart card 817 via Kerberos will now be described in further detail. The server credential provider 825 may use the KERB_CERTIFICATE_LOGON structure to trigger a logon, such as an Active Directory logon, with a smart card class user certificate. The server credential provider 825 may use the KERB_CERTIFICATE_LOGON structure. The KERB_CERTIFICATE_LOGON structure may comprise the following:

```
Typedef struct _KERB_CERTIFICATE_LOGON {
    KERB_LOGON_SUBMIT_TYPE  MessageType;
    UNICODE_STRING          DomainName;
    UNICODE_STRING          UserName;
    UNICODE_STRING          Pin;
    ULONG                   Flags;
    ULONG                   CspDataLength;  ⎫
    PUCHAR                  CspData;        ⎬ KERB_SMARTCARD_CSP_INFO
                                            ⎭
} KERB_CERTIFICATE_LOGON, *PKERB_CERTIFICATE_LOGON;
```

Furthermore, as described in the KERB_CERTIFICATE_LOGON structure, "CspData" may compromise a pointer to a KERB_SMARTCARD_CSP_INFO structure. The KERB_SMARTCARD_CSP_INFO structure may comprise the following:

```
Typedef struct _KERB_SMARTCARD_CSP_INFO {
    DWORD  dwCspInfoLen;
```

```
    DWORD    MessageType;
    union    { PVOID ContextInformation; ULONG64
SpaceHolderForWow64; };
    DWORD    flags;
    DWORD    KeySpec;
    ULONG    nCardNameOffset;
    ULONG    nReaderNameOffset;
    ULONG    nContainerNameOffset;
                            }  Name of CSP to use for (some/all?)
                            }  PKINIT crypto operations
    ULONG    nCSPNameOffset;
    TCHAR    bBuffer;
} KERB_SMARTCARD_CSP_INFO, *PKERB_SMARTCARD_CSP_INFO;
```

The structure may be generated by the server credential provider 825. In particular, the structure may identify, for example, the name of the CSP 831 and/or a KSP.

As described in further detail in U.S. patent application Ser. No. 13/886,845, which is incorporated herein by reference, Kerberos resource authentication may involve obtaining service tickets from Kerberos KDCs (e.g., Active Directory domain controllers). For example, the Kerberos authentication package in the server 821 may use the Public Key Cryptography for Initial Authentication in Kerberos (PKINIT) protocol, such as is described in Request for Comments (RFC) 4556 to perform the Active Directory logon.

During processing of information by the server credential provider 825, the Kerberos module 827, or another application using the smart card, the CSP 831 and/or KSP at the server 821 side may intercept the relevant certificate operations performed by the credential provider 825 and the Kerberos module 827 and remote those operations to the client device 801 (e.g., the PKOperations SDK 807 at the client device 801). For example, if the CSP 831 and/or KSP detects a certificate request or a data signing operation, the CSP 831 and/or KSP may package authentication data and send a request to the client device 801 for the certificate and/or the signature. Otherwise, operations that do not use client information may generally be performed at the server 821 (e.g., via the third party CSP 833) without involving the client device 801, reducing the amount of data exchanged between the client device 801 and the server 821 and the number of times the client device 801 and the server 821 interact. Exemplary operations that are remoted to the client device 801 include, but are not limited to, a request to list (e.g., enumerate) the certificates on the smart card 817, a request for a certificate, sign operations using the private key of the smart card 817, and decrypt operations using the private key of the smart card 817. Exemplary operations that might not be sent (e.g., remoted) to the client device 801 (e.g., may be performed by the third party CSP 833 or otherwise at the server 821) include, but are not limited to, context and handle management, parameter collection and handling, random number generation, symmetric key generation and derivation, bulk encryption and decryption, hashing data to produce message digests, wrapping a session key, signature verification, and certain other operations.

The CSP 831 and/or KSP may also supply context information, such as PKINIT context information, to the client device 801 with its request for a certificate, for the client 801 to sign or decrypt data, or for any other operation involving the client device 801. Supplying context information is discussed in further detail in U.S. patent application Ser. No. 13/886,845, which is incorporated herein by reference in its entirety. Supplying context information may safeguard against misuse of the remoting channel 836 between the server 821 and the client device 801 (established via the virtual channel drivers 805 and 835).

An exemplary signing operation will now be described. Kerberos module 827 may make calls to CSP 831 during logon to indicate, for example, that the client device's signature is desired. For example, and as described in further detail in U.S. patent application Ser. No. 13/886,845, the Kerberos module 827 may make calls to sign an AuthPack to be signed during PKINIT:

```
CryptCreateHash    }  Computing hash of PKINIT AuthPack
CryptHashData      }  structure as part of generating signature
CryptGetHashParam  }
CryptSignHash      }  Actual signing of AuthPack with private key
```

The smart card 817 private key may be used by the client device 801 to sign the AuthPack structure. The signing may be done using the Cryptographic Message Syntax (CMS) described in RFC 5652. In particular, the AuthPack may be placed in SignedData envelope, as described in RFC 5652. Accordingly, the signing operation may be recognizable at the CSP level, because raw data passed to hash function calls may have well-formed ASN.1 structures as defined in RFC 4556 and 5652, and discussed in further detail in U.S. patent application Ser. No. 13/886,845, the discussion of which is hereby incorporated by reference. In some aspects, the operations remoted to the client device 801 (e.g., signing and decryption) might not indicate the protocol context (e.g., an ASN.1 or other recognizable structure). Accordingly, these operations may be provided without providing proof of the protocol context giving rise to these operations.

As explained above, the client device 801 may receive one or more requests from the server 821 during the authentication process. The processes on the client device 801 may communicate via one or more interprocess communication (IPC) mechanism. Moreover, each process may determine which other process is calling the first process, which may be used to determine whether to prevent excess PIN prompts (or other credential prompts) during authentication. If a process has already unlocked the smart card 817, one or more subsequent PIN prompts may be blocked so that the user does not have to provide the PIN again. However, if a process has not used the smart card 817, the user may be prompted for the PIN. The client agent 803 may be made up of multiple processes, even though it may logically comprise one application (from the user's perspective). One of those processes might be authorized to use the smart card (and the others might not be authorized) because of prior authentication during brokering, and therefore the client device 801 may route these additional smart card operations from the client agent logon step back to the first process to avoid more PIN prompts.

On the other hand, additional PIN prompts may occur in some circumstances. Whether the client device 801 prompts the user again for the user's PIN (or other credential) may depend on which process is calling for the smart card PIN. In some aspects, the user may authorize each application that wants to use the smart card. This may be implemented by the operating system and the CSP, such that the unlocked smart card is not necessarily usable by other processes for what may be a different purpose than the first process which caused a PIN prompt and therefore obtained user authorization. In some cases, the smart card itself may have an internal policy that forces a PIN prompt.

In some aspects, the authentication method previously discussed may be implemented on a CSP (e.g., CSP 831) and/or a KSP. If a CSP or a KSP is used, hash functions might not be used. In general, many of the CSP functions may be delegated to a standard CSP (e.g., the third party CSP 833), except operations using the client device 801, such as CpSignHash and CpDecrypt. In some embodiments, if the Kerberos module 827 also fetches a user certificate to put in an AS-REQ packet, the Kerberos module 827 may call a CryptGetKeyParam to read the user certificate. Accordingly, the CryptGetKeyParam may trigger the CSP 831 to request the user certificate from the client device 801.

After performing the operation remoted to the client device 801 (e.g., one, two, three, or four operations), the Kerberos system 827 may complete its authentication to a domain controller, completing a basic operating system logon.

The server 821 may support smart card removal policies. In some aspects, there may be another virtual channel 838 between the client-side PC/SC 815 and the server-side PC/SC 839. The server 821 can see the smart card layer using this virtual channel 838, and therefore be able to determine when the smart card 817 has been removed. In this example, the credential provider 825 may confirm that the correct smart card reader name is listed in a data field, such as KERB_SMARTCARD_CSP_INFO, so that it matches the information exposed by the PC/SC virtual channel 838. In other aspects, the PC/SC virtual channel 838 might not be used. Instead, the server 821 may determine the status of the smart card 817 using the virtual channel 836 between the server-side CSP 831 and the client-side PK Ops 807. For example, the client device 801 may determine the status of the smart card 817, and the status may be sent by PK Ops 807 to the CSP 831 via the virtual channel 836. The server 821 may generate and store a virtual smart card reader (not illustrated) that emulates the status of the smart card 817. The server 821 may determine the status of the smart card 817 by determining the status of the virtual smart card reader at the server 821. The server 821 may perform various actions after it determines that the smart card has been removed. For example, the server 821 may lock the session to leave it secure if the user moves away from his or her access terminal. This may avoid the user needing to do anything other than to carry their card with them.

Figure 9:
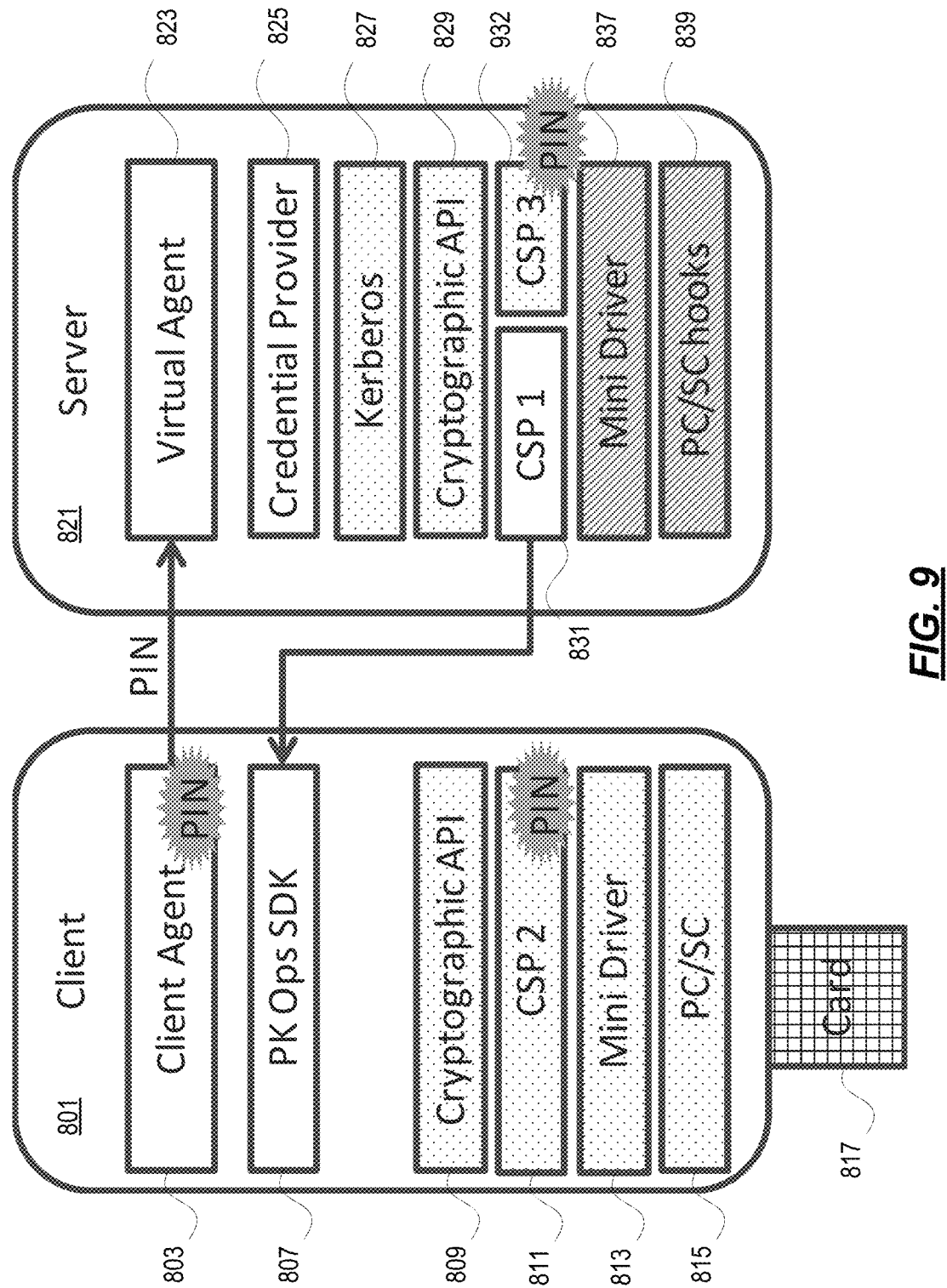
FIG. 9 depicts another illustrative system for fast smart card logon in accordance with one or more illustrative aspects described herein.

FIG. 9 depicts another illustrative system for fast smart card logon in accordance with one or more illustrative aspects described herein. The system illustrated in FIG. 9 may comprise an extension of the system illustrated in FIG. 8 and support ancillary third-party (e.g., vendor) CSP functions. In addition to the components illustrated in FIG. 8, the server 821 in the example of FIG. 9 may include a third-party CSP, CSP 932. In some aspects, the CSP 932 may be the CSP 731 illustrated in FIG. 7. Both CSPs may store the user's PIN or biometric. In this example, the client device 801 may send the PIN (or other credential) to the server 821. The PIN (or other credential) may be protected during transmission by, for example, a key negotiation between the client device 801 and the server 821, such as Diffie-Hellman. The key negotiation may occur inside the PK Ops virtual channel, in addition to any lower level transport security mechanism, such as TLS. Upon receipt of the PIN (or other credential), CSP 932 may store (e.g., cache) the PIN. By storing the PIN, CSP 932 may unlock the smart card 817 for application use after logon (e.g., applications running in an interactive server session and/or for other similar functions). Exemplary applications in a virtual session may include web browsers, productivity software, email clients, and the like. Moreover, CSP 932 might not be directly used during logon, so storage of the PIN at CSP 932 might have little or no effect on logon performance (e.g., speed, latency, security, etc.). Storing the PIN at CSP 932 may be used for single sign on for applications running in the interactive server session. For example, the applications may directly access the PIN from CSP 932 to sign on the user.

In some embodiments, applications running in the interactive server session, such as a web browser, applications utilizing document signing, or other applications, may access smart card credentials for log on. The operations described herein may be used for applications accessing smart card credentials. In these examples, the server-side Kerberos component 827 may be replaced with the application requesting access to the smart card, and the operations for accessing the smart card credentials may be performed as described above. Moreover, the user certificate obtained using the virtual channel 836 may be propagated to a certificate store for the user session, such as a WINDOWS or other OS certificate store. The OS may perform this operation for normal smart card logons, as a background process that uses the PC/SC API. Accordingly, the certificate may be linked to CSP 831, rather than the normal CSP for the card (e.g., CSP 932 illustrated in FIG. 9).

When the server-side Kerberos component 827 is replaced with the application requesting access to the smart card, the CSP 831 (and the PK Ops SDK, and other components) may distinguish between the different applications on the server side if user authorization per application is desired. PIN prompting might not occur automatically because different server-side applications may attempt to use the card, and private key operations may be flowing back to the client-side process that is already authorized. Therefore, the CSP 831 may indicate the PIN prompting policy used by the server 821 so that the private key operations may be performed by the client 801. In some cases, this might happen by exposing the concept of smart card operations supported by the server-side CAPI 829 so that the operations can be mirrored to the CAPI 809 on the client 801.

In some embodiments, the smart card might not yet be unlocked and an interactive PIN prompt may be used. In these embodiments, the PIN prompt may be handled by the server 821 rather than the client 801. Collecting the PIN on the server 821 might be less secure than collecting the PIN on the client 801. However, the server implementation may be easier in this case because the core security system (e.g., LSA on WINDOWS) might not be blocked as it waits for user input as it might otherwise be. The speed benefits of PKOps remoting (rather than PC/SC), as described above, may be present in these embodiments. As a brief example, this mode may be used for unlocking the remote session if it was locked by a removal of the smart card, but the session was not disconnected. When the user reinserts the smart card, the smart card insertion may be signaled (e.g., via PC/SC or the PK Ops virtual channel), and the user may be prompted to enter a PIN to unlock the card.

Figure 10:
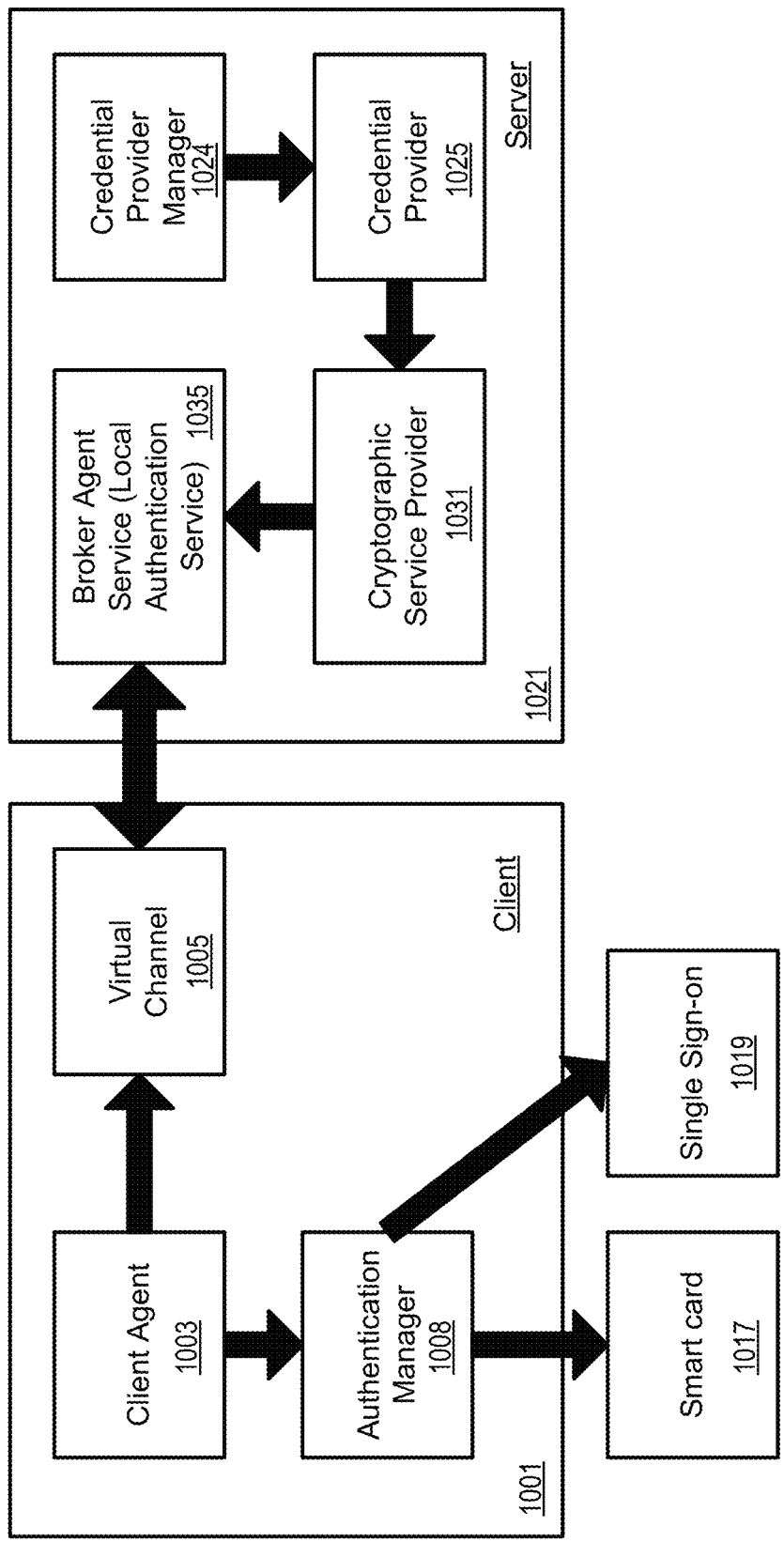
FIG. 10 depicts yet another illustrative system for fast smart card logon in accordance with one or more illustrative aspects described herein.

FIG. 10 depicts yet another illustrative system for fast smart card logon in accordance with one or more illustrative aspects described herein. The client device 1001 may include a client agent 1003, as previously discussed. The client device 1001 may communicate with the server 1021 via one or more virtual channels 1005. The client device 1001 may also include an authentication manager 1008, which may comprise one or more of the client device's CAPI, CSP 2, and/or mini driver modules previously discussed with reference to FIG. 8. The authentication manager 1008 may be a module in the client agent 1003 that implements the PKOperation SDK illustrated in FIG. 7 and FIG. 8 (and previously discussed). Depending on the client device's operating system, the authentication manager 1008 may use an operating system-provided CAPI or may include its own CAPI. The authentication manager 1008 may communicate with a smart card 1017 and/or a single sign-on device 1019, such as a secure PIN caching service and/or device. The authentication manager 1008 may store a PIN or other credential provided by the user during authentication. Fast smart card logon may rely on a new IPC channel for the client device 1001 to communicate with the authentication manager to access new authentication-focused smart card certificate services.

The server 1021 may include a broker agent service 1035, which may interface with the virtual channel 1005 between the client device 1001 and the server 1021. For example, the broker agent service 1035 may comprise the virtual channel driver 835 illustrated in FIG. 8. The broker agent service 1035 may facilitate authentication. The server 1021 may include a Cryptographic Service Provider CSP 1031 and a credential provider 1025 (e.g., a certificate credential provider), as previously discussed with reference to FIG. 8. The server 1021 may also include a credential provider manager 1024, which may comprise the virtual agent 823 previously described. The credential provider manager 1024 may be used to determine whether to use smart card login (e.g., the embodiment illustrated in FIG. 7) or fast smart card login (e.g., the embodiment illustrated in FIG. 8) for authentication.

Authentication steps that may be performed by the components illustrated in FIG. 10 will now be described. First, a virtual channel 1005 between the client device 1001 and the server 1021 may be established. The client device 1001, such as via the client agent 1003, may negotiate with the server 1021, such as via the credential provider manager 1024, to determine the credential provider 1025 to use. In some examples, the server 1021 may have multiple credential providers 1025 and/or otherwise interact with multiple credential providers. Moreover, the client agent 1003 may negotiate with the credential provider manager 1024 to determine whether to use smart card login or fast smart card login. The client agent 1003 may notify the server 1021 that the client device 1001 wishes to authenticate using smart card or other credentials.

If the credential provider manager 1024 on the server 1021 detects that fast smart card logon should be used (e.g., enabled), a credential provider 1025 may be triggered. In other words, the credential provider manager 1024 may notify a particular credential provider 1025 to perform a smart card login procedure. This trigger may notify a domain logon process (e.g., WinLogon.exe) to authenticate using a certificate found in the CSP 1031. The CSP 1031 may direct operations involving the client device 1001, such as certificate retrieval and signing operations, to the client 1001, while performing other cryptographic functions locally on the server 1021. As previously discussed with reference to FIG. 8, the credential provider 1025 may communicate with a Kerberos module for authentication. During the operations between the credential provider 1025 and the Kerberos module, the CSP 1031 may be called to perform certificate operations and/or signing operations (or other operations using information stored at the client device 1001). The CSP 1031 may communicate with the authentication manager 1008 at the client device 1001 via the broker agent service 1035 on the server side and the virtual channel 1005 on the client side in order to obtain the desired client or user information.

After the client device 1001 receives a request for information, user interface interactions, including selecting certificates and requesting PINs, may be handled by the authentication manager service 1008 on the client device 1001. The virtual channel (as previously discussed) may be used rather than the existing smart card virtual channel (e.g., PC/SC) if smart card logon is enabled. In some aspects, the client device 1001 may interactively prompt the user for input (e.g., to select a certificate, to enter a PIN or biometric, etc.) in order to perform the operations requested by the server 1021. For example, the user interaction steps may occur early on during the client agent connection, before the credential provider is triggered.

The following operations or commands may be used to choose between smart card login or fast smart card login:

| Policy Identifier | Description |
| --- | --- |
| POLICY_VIRTUAL_CHANNEL_DISABLED | Administrator has explicitly disabled the fast smartcard auth virtual channel (client or server end) |
| ICAFILE_DISABLE_CTRL_ALT_DEL | Individual client agent files indicate that smartcard logon should be used for connections by setting this to true. |
| POLICY_SMARTCARD_DISABLED | Disabling the old smartcard virtual channel will *not* disable the fast smartcard virtual channel. |
| POLICY_USE_LOCAL_USER_AND_PASSWORD | Disabling PIN pass-through will no longer force the user to enter a smartcard PIN when authenticating to the VDA (that is if they have previously unlocked it using the Authentication Manager) |

Steps in the logon sequence may be controlled by the authentication manager service 1008 on the client device

1001, which may decide whether to prompt the user for information via a graphical user interface (GUI). At start up, the client agent 1003 may load a virtual channel which may proceed to decide whether to enable the fast smartcard virtual channel. Fast smartcard virtual channel may be enabled if POLICY_VIRTUAL_CHANNEL_DISABLED is false, ICAFILE_DISABLE_CTRL_ALT_DEL is true, and Authentication Manager Service IsCertificateLogonEnabled( ) is true. IsCertificateLogonEnabled( ) may be true if POLICY_VIRTUAL_CHANNEL_DISABLED is false and a smartcard device is detected.

The credential provider manager 1024 at the server 1021 may also perform activation steps. For example, the credential provider manager 1024 may attempt a smart card logon if ICAFILE_DISABLE_CTRL_ALT_DEL is true. At this point, the credential provider manager 1024 may attempt to use the fast smart card authentication virtual channel if POLICY_VIRTUAL_CHANNEL_DISABLED is false, the virtual channel has been enabled by the client device 1001, and the credential provider manager 1024 can retrieve the logon certificate via a virtual channel GetCertificate( ) call (e.g., for the client device 1001 to retrieve a certificate). Otherwise, the existing smart card virtual channel (to enable smart card logon, rather than fast smart card logon) may be activated.

Client device components may respond to a GetCertificate( ) call. Assuming that the virtual channel was enabled, GetCertificate( ) requests may be passed from the server 1021 directly to the client device's authentication manager service 1008. The authentication manager service 1008 may return a certificate to the server 1021 after it verifies that POLICY_VIRTUAL_CHANNEL_DISABLED is false, a smart card device is present, and the certificate has an appropriate format (e.g., satisfies a policy for type of certificate). If needed, the authentication manager service 1008 may prompt the user to insert a smart card 1017 or select a certificate if a smart card was not detected and/or if there are multiple certificates available of the appropriate format.

The credential provider 1025 and CSP 1031 at the server 1021 may perform various steps. If the credential provider manager 1024 receives a certificate, it may invoke the credential provider 1025 and send a cryptographically random CSP access ticket to the credential provider 1025. The CSP 1031 may perform an interactive logon using certificate functions provided by the local authentication service of the broker agent service 1035. For example, the local authentication service 1035 may verify that the CSP caller knew the access ticket before using the virtual channel to perform SignHash( ) or other operations.

Client device components may respond to a SignHash( ) operation. Assuming that the virtual channel was enabled, SignHash( ) requests may be passed directly to the authentication manager service 1008 of the client device 1001. The authentication manager service 1008 may sign hashes if POLICY_VIRTUAL_CHANNEL_DISABLED is false, the certificate was the one selected by the user, and a PIN is available from the single sign-on service, or a previous smartcard session exists (e.g., from a prior step when user authenticated to another service), or if the user supplies the correct PIN or other credential used to unlock the smart card 1017, such as a fingerprint or other biometric.

Illustrative Embodiments of Federated Logon

The components used to implement fast smart card logon previously described may also be used to implement a federated full domain (e.g., Active Directory (AD)) logon. After a full domain logon, the session may have full network credentials (e.g., Kerberos ticket granting ticket (TGT) and challenge/response password hash (e.g., NTLM password hash)). For example, users may authenticate to a virtual desktop session, physical PC, or a remote desktop server session as an Active Directory user account by providing a SAML authorization token. As will be discussed in further detail in the examples that follow, a user may authenticate to an external component/service/device, such as an Identity Provider (IdP), using any type of credential and/or authentication protocol that is appropriate. This authentication may be called an external authentication event. Example external authentication events include logon at a Security Assertion Markup Language (SAML) Identity Provider, smart card authentication over TLS or SSL, and alternative authentication credentials such as biometrics or one-time password (OTP) without an AD password.

After the authentication with the IdP, the IdP may issue a confirmation token (e.g., a SAML token) to a named Relying Party (RP) or Service Provider, which may be used to process a service access request from the user. The RP may use a fresh SAML token from the IdP in order to be satisfied of the requesting user's identity, without needing to know all the authentication details or interact with the credentials directly. Instead of a SAML token, other token formats or identity confirmation mechanisms may be used, as long as the credential mapping service (discussed below) may be assured that the IdP has confirmed the user's identity. A virtual smart card credential (also referred to as a short duration logon certificate), may be issued based on the acceptance of the external authentication event (e.g., authentication by the IdP).

The certificate operation interception components from fast smart card logon described above may be used to enable interaction with the virtual smart card without fully emulating a smart card at the PC/SC API level. The virtual smart card may be created at the IdP, locally at the remote computing environment (e.g., the authentication server), and/or on a separate server that may be highly protected, such as a server hosting the credential mapping service.

Various federation scenarios exist. For example, traditional federation of external users may be business to business (e.g., partners in supply chain, joint collaboration, etc.). Consumer to business may include e.g., citizens, retirees, veterans, etc. Cloud services may include enterprise controlled user authentication to access software as a service (SaaS) products and/or data as a service (DaaS) where cloud desktop is used to access enterprise resources. A next generation enterprise security model may include an identity provider (IdP) as a central point for user authentication, for SaaS and on-prem resources, from devices. IdP itself may be on-prem or a cloud service, such as identity as a service (IDaaS).

Figure 11:
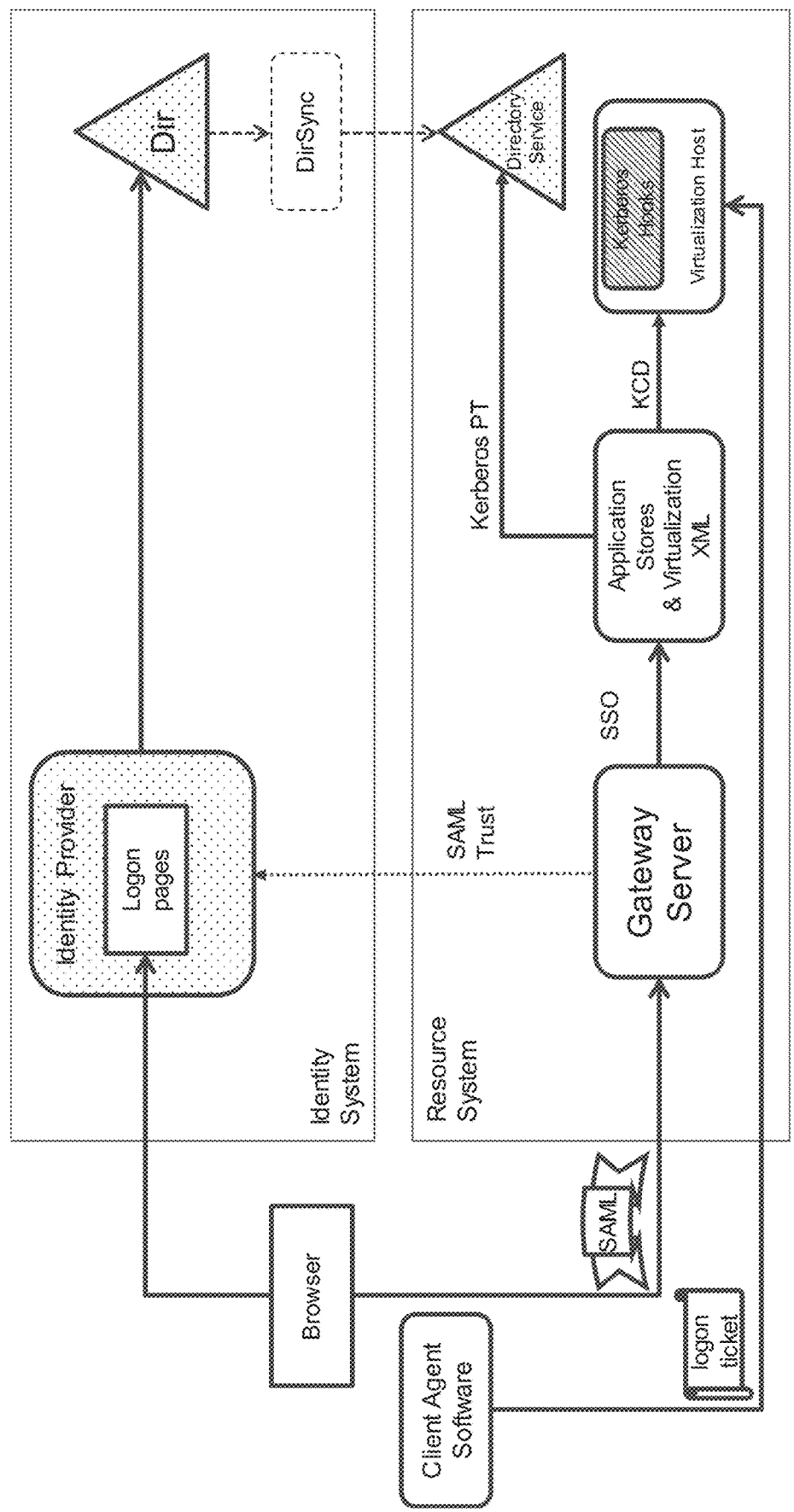
FIG. 11 depicts an illustrative system for federated logon in accordance with one or more illustrative aspects described herein.

FIG. 11 depicts an illustrative system for federated logon in accordance with one or more illustrative aspects described herein. The system illustrated in FIG. 11 might not use a credential mapper, as is used in the exemplary systems illustrated in FIGS. 12A-C.

Figure 12A:
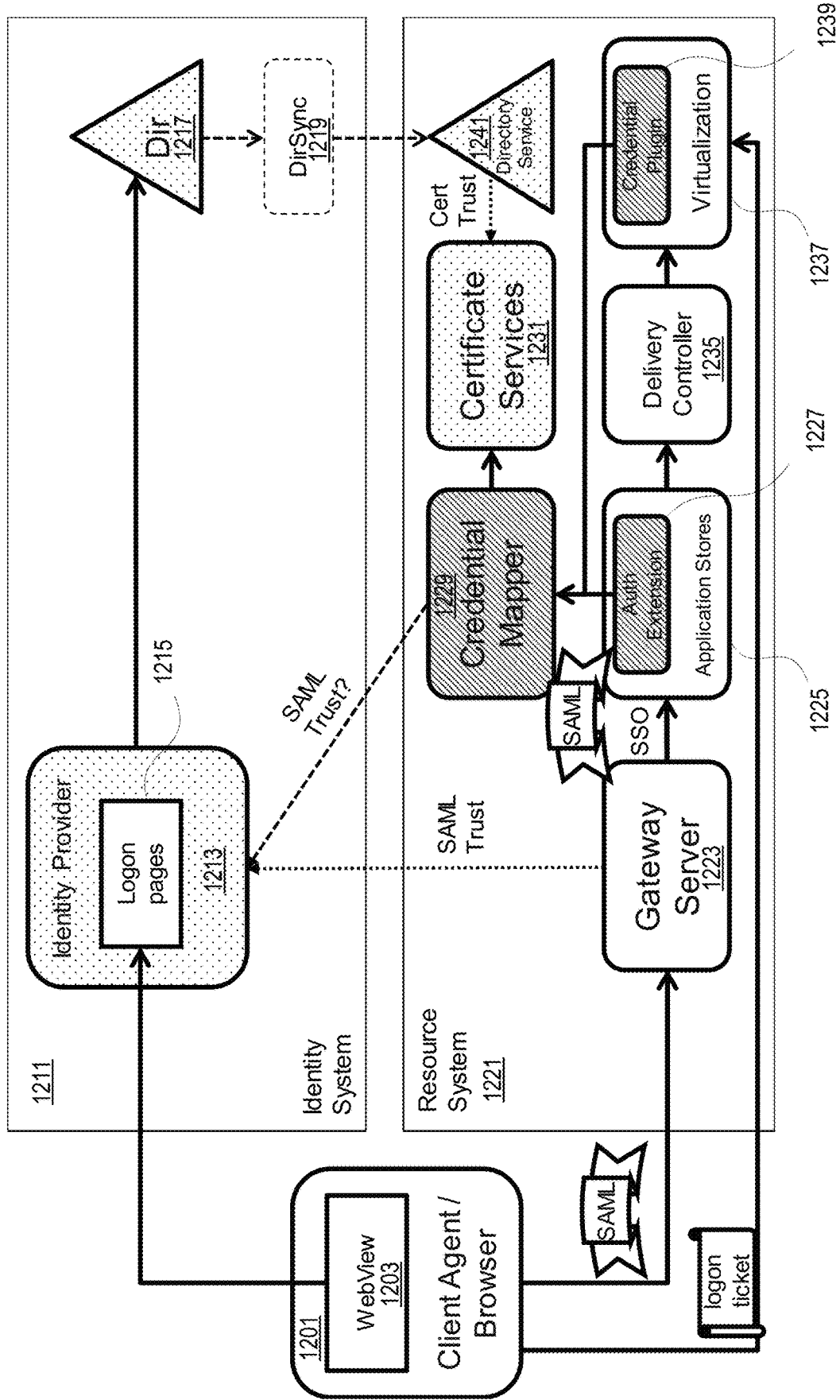
FIG. 12A depicts another illustrative system for federated logon in accordance with one or more illustrative aspects described herein.

FIG. 12A depicts another illustrative system for federated logon in accordance with one or more illustrative aspects described herein. In some aspects, a smart card might not be used in this federated logon case. Instead, a certificate may be used for authentication, and a resource system 1221 (e.g., a customer premises) may think that the certificate is a smart card certificate. The system 1221 may initiate a setup phase. The application store 1225 may comprise a trusted device and be used to request, from a credential mapper 1229, domain (e.g., AD or directory service 1241) logon credentials for a user. The credentials may comprise a short-lived smart card class certificate (e.g., a virtual smart card certificate). The credential mapper 1229 may be trusted by certificate services 1231, such as a third party certificate service (e.g., MICROSOFT certificate services), to request short-lived smart card class certificates for AD users. The credential mapper 1229 may be used to create a virtual smart card for the user. The credential mapper 1229 may request the certificate from the certificate services 1231, and the certificate services 1231 may return, to the credential mapper 1229, a smart card class certificate for the user. The virtual smartcards may be stored (e.g., cached) at the credential mapper 1229.

A custom template may be used to provide control. As well as providing control over the issuance infrastructure (e.g., restricting or identifying the servers that are trusted to request smart card class certificates), a custom template can also cause special markers to be included in the issued certificates which result in a special group membership being inserted into logon tokens and Kerberos tickets. In some aspects, multiple markers may be placed in a certificate, each of which selects its own group membership. This may provide flexibility to map different attributes making up the full circumstances of the authentication and the service provider access request into distinct groups, making it easier to express the desired resource access control policies. These markers may allow, for example, WINDOWS-based infrastructure and services to recognize that users have authenticated to AD by this particular mechanism, rather than using a real smart card or password.

Different templates may be used by the credential mapping service 1229 based on attributes of SAML tokens, or other indications of the true level of authentication assurance. Additional or alternative authentication circumstances may be of interest besides the authentication assurance level. For example, the geographic location of the user or the connection route used for accessing the service provider (e.g., inside versus outside a boundary) may be of interest. The certificate template may be selected based on a mapping from some or all of these available attributes and circumstantial indicators. Additionally or alternatively, custom statements or attributes may be added to the certificates by the credential mapping service 1229, e.g., via the certificate signing request sent by the credential mapper service 1229 to the Certificate Authority. These might not be mapped to security groups, but can be inspected by applications such as web applications that directly use client certificate authentication.

The directory service 1241 may trust certificate services 1231 to issue smart card class certificates for user logon. This trust step may enable the virtual smartcard certificates to be used for, for example, Active Directory logon. A trust fabric may be in place to establish service-to-service identity and secure communications. Optionally, the credential mapper 1229 may cross-check SAML tokens issued by an identity provider (IdP) 1213.

The system may initiate a runtime phase. Webview 1203 in the client agent 1201 may be used to handle IdP logon. The client agent 1201 may send credentials to the IdP 1213 for logon. Webview 1203 may also support standard security assertion markup language (SAML) protocol for SAML logon to the gateway server 1223 or application stores 1225. The gateway server 1223 may be a server or other resource that provides access to enterprise resources and/or cloud resources. During the logon process, the IdP 1213 may send an identity confirmation token (e.g., a SAML token) back to the client agent 1201. The SAML token may be used by the client agent 1201 as proof that it has authenticated with the identity system 1211, which may comprise an external partner of the resource system 1221.

The logon pages 1215, which may comprise HTML pages containing web forms, may be used to collect authentication credentials from the user or potentially from the browser or client agent itself. These credentials can range from username and password forms to sophisticated risk-based authentication systems. The IdP 1213 may use these logon pages 1215 to authenticate legitimate users with any appropriate authentication method or methods.

The directory 1217 may comprise an identity store or account database or other directory that supports the IdP 1215. For example, the directory 1217 may be an instance of Active Directory in another company's network, or use another vendor's LDAP directory product.

DirSync 1219 may comprise a mechanism or set of mechanisms to ensure that there are shadow accounts in directory service 1241 for each legitimate and authorized user in the directory 1217 who should be permitted access to the applications and desktops hosted in the resource system 1221 (which may be exposed via the virtualization server 1237). Examples of a DirSync 1219 mechanism include manual procedures such as emailing or uploading a spreadsheet with a list of authorized user names and other relevant identity or authorization information. Other examples include periodically scheduled or permanently repeating batch jobs that query the directory 1217 for some or all accounts (perhaps in a distinguished portion of the directory) and transmitting them to the directory server 1241. Other examples include monitoring the directory 1217 for changes and transmitting those changes, either as they occur or according to a schedule. Another mechanism is implicit—the existence of a new authorized user in directory 1217 may be implied when a federation token quoting that user identity is presented to the resource system 1221.

In some aspects, proof key binding may be used. A SAML token proof key may be linked to the virtual smart card that is created to allow full domain logon. This proof key (or a related proof key) may then be used by the remote computing environment to actually use the virtual smart card. The client agent 1201 may negotiate the proof key that is bound to the SAML token issued by the IdP 1213.

In some aspects, the SAML token or other trusted logon credential may be mapped to the corresponding AD user password, even if the password is not directly available during the gateway server 1223 or application store 1225 logon process (which will be described in further detail below). For example, the password may be captured by the IdP 1213 during its logon and relayed over a trusted back channel to the gateway server 1223 or the application store 1225. In other aspects, a password vault or password control service may return the password to the gateway server 1223 or the application store 1225. In another example, the credential mapper 1229 may itself control the password for certain user accounts. These passwords might not be user-selected passwords, and accordingly, they could be derived from a master key using per-user salts. In this example, a database or password vault might not be used.

The client agent 1201 may send the SAML token to the gateway server 1223 and/or the application store 1225 when a full domain logon is to be requested. The gateway server 1223 and/or application store 1225 may communicate with the IdP 1213, such as by sending the SAML token (e.g., via a back channel), to verify that the client 1201 is authenticated with the identity system 1211. If the SAML token includes a time, such as a time period of validity, the IdP 1213 may verify that the current time is within the time period of validity. Additionally or alternatively, relying parties (components) may locally validate the SAML token by checking the digital signature it contains using a locally stored (e.g., trusted) copy of the IdP's signing certificate.

The application store 1225, delivery controller 1235, and/or virtualization device 1237 may securely carry custom logon data provided by the application store 1225 to a credential plugin 1239 that may be used to drive a logon process on the virtualization device 1237. The application store may comprise an authentication extension 1227, such as a logon data provider, which may be used to obtain a virtual smart card reference, a matching credential plugin for the virtualization device 1237 to access the virtual smart card, and supporting service infrastructure (e.g., the credential mapper 1229) to implement the virtual smart cards, as described herein.

Once it is verified that the client 1201 is authenticated, the gateway 1223, application store 1225, and/or delivery controller 1235 (e.g., a Desktop Delivery Controller) may authorize the credential mapper 1229 to obtain a time-limited (e.g., temporary) smart card class certificate for AD logon on a designated virtualization machine. In other words, a temporary certificate may be created to emulate a smart card (e.g., one or more certificates in a smart card). Time-limited certificates may be valid for minutes, hours, days, or even shorter or longer. To support the authorization step, the store 1225/controller 1235 may present the original SAML token from the IdP 1213, for its validity to be verified again by the credential mapping service 1229. For example, the credential mapper 1229 may communicate with the IdP 1213 to verify the SAML token. This step can also facilitate transfer of proof key binding from the SAML token to the virtual smart card, or negotiation of a new proof key.

A logon ticket may be issued and go in a remote display protocol (e.g., client agent) file. With the logon ticket approach, the logon ticket sent to the client agent 1201 may also be used to first encrypt the virtual smart card private key held by the credential mapping service 1229. Additionally or alternatively, a proof key held by the client agent 1201 may be linked (e.g., bound) to the short-lived certificate. Optionally, the credential mapper 1229 may be presented with the original IdP authentication token as evidence of a valid logon by the client 1201. The logon ticket may additionally or alternatively be used to encrypt a secure reference to the virtual smart card provided by the credential mapper 1229. In this example, the virtual smart card might only be recovered by the virtualization agent 1237 that is authorized by the delivery controller 1235 to use the virtual smart card. The encrypted virtual smart card reference may be sent from the application store 1225 to the delivery controller 1235 and then to the virtualization agent 1237, while the logon ticket is sent to the client agent 1201. This may allow the virtual smart card to be created before the virtualization agent 1237 is known, or to be used to logon separately to multiple virtualization agents.

The virtualization agent 1237 may present the logon ticket (or the secure virtual smart card reference decrypted using the logon ticket) to the credential mapping service 1229, and use the smart card class certificate to log the client device 1201 on to a directory service 1241, such as MICROSOFT AD. The credential plugin 1239 (e.g., a logon hook) may be very similar or identical to the fast smart card logon approach previously discussed. The credential plugin 1239 may comprise the server-side virtual agent 823, credential provider 825, and/or the CSP 831 described with reference to FIG. 8.

The credential mapper 1229 may interact with the certificate service 1231, which may comprise a certificate authority such as WINDOWS certificate services, to obtain smart card class user authentication certificates with corresponding private keys. That is, the credential mapper 1229 may be used as a registration authority (e.g., MICROSOFT Enrollment Agent) for users. The credential mapper 1229 may have a registration authority certificate to use as an authentication credential when sending requests to certificate services 1231. There may be a bootstrap process to obtain the credential the first time, after which renewal may happen automatically as needed to minimize manual steps.

The smart card class certificates may be trusted by the directory service 1241 (e.g., an AD domain) as interactive logon credentials for the relevant user accounts. In other words, the certificates may be treated as virtual smart cards, e.g., a smart card class user certificate. The certificates may have appropriate key usage for AD logon through, for example, Kerberos with a corresponding private key held in a key store on the credential mapper server 1229. Hardware-based key protection may be used on the private key, such as via a trusted platform (e.g., WINDOWS Trusted Platform Module (TPM)) and/or a hardware security module (HSM). Hardware-based key protection may also be used to beneficially reduce logon latency.

The authentication extension 1227 of the application store 1225 may interact with the credential mapper 1229 during the application store 1225 launch sequence (and optionally during the application store 1225 logon sequence) in order to prepare a virtual smart card for the user. The virtual smart card for a user may be created on demand, e.g., for each launch or reconnect event, or may be reused for a period of time depending on various security policies and performance needs. Virtual smart cards may be pre-created and have lifetimes closer to that used for physical smart cards, particularly if there is hardware protection for the private keys, as described above.

The credential plugin 1239 of the virtualization server 1237 may intercept the relevant operating system calls to use the virtual smart card during logon, in order to redirect certain operations to the credential mapper server 1229 where they will be performed using the cryptographic APIs and providers.

Figure 12B:
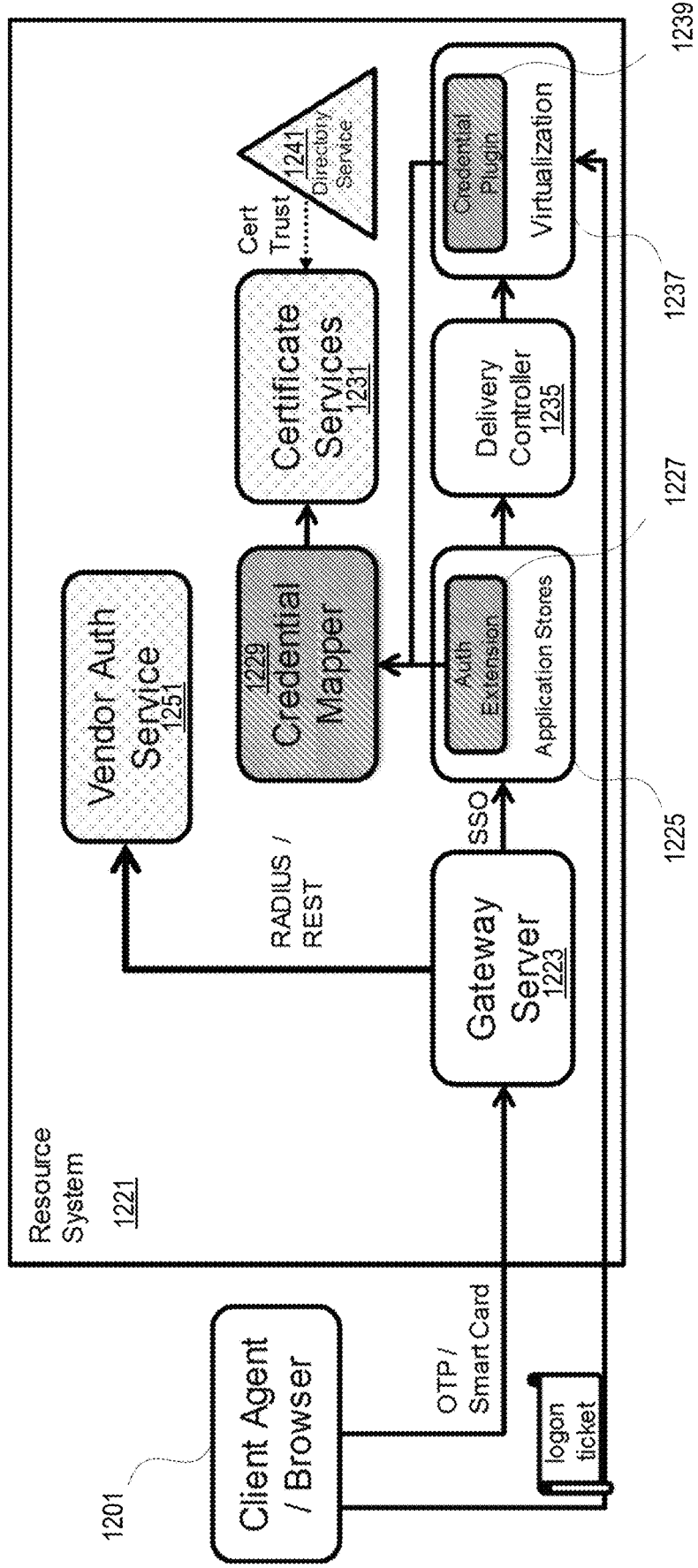
FIG. 12B depicts yet another illustrative system for federated logon in accordance with one or more illustrative aspects described herein.

FIG. 12B depicts yet another illustrative system for federated logon in accordance with one or more illustrative aspects described herein. The authentication system illustrated in FIG. 12B may be similar to the authentication system described with reference to FIG. 12A. However, instead of using an identity confirmation (e.g., SAML token), the client agent 1201 may send a one time password (OTP) or actual smart card credentials to one or more of the components in the resource system 1221, such as the gateway server 1223. The gateway server 1223 may authenticate the client or user with a vendor authentication service 1251, as will be described in further detail below. Moreover, the gateway server 1223 may communicate with the authentication service 1251 using a RADIUS or REST protocol, as will also be described below.

Figure 12C:
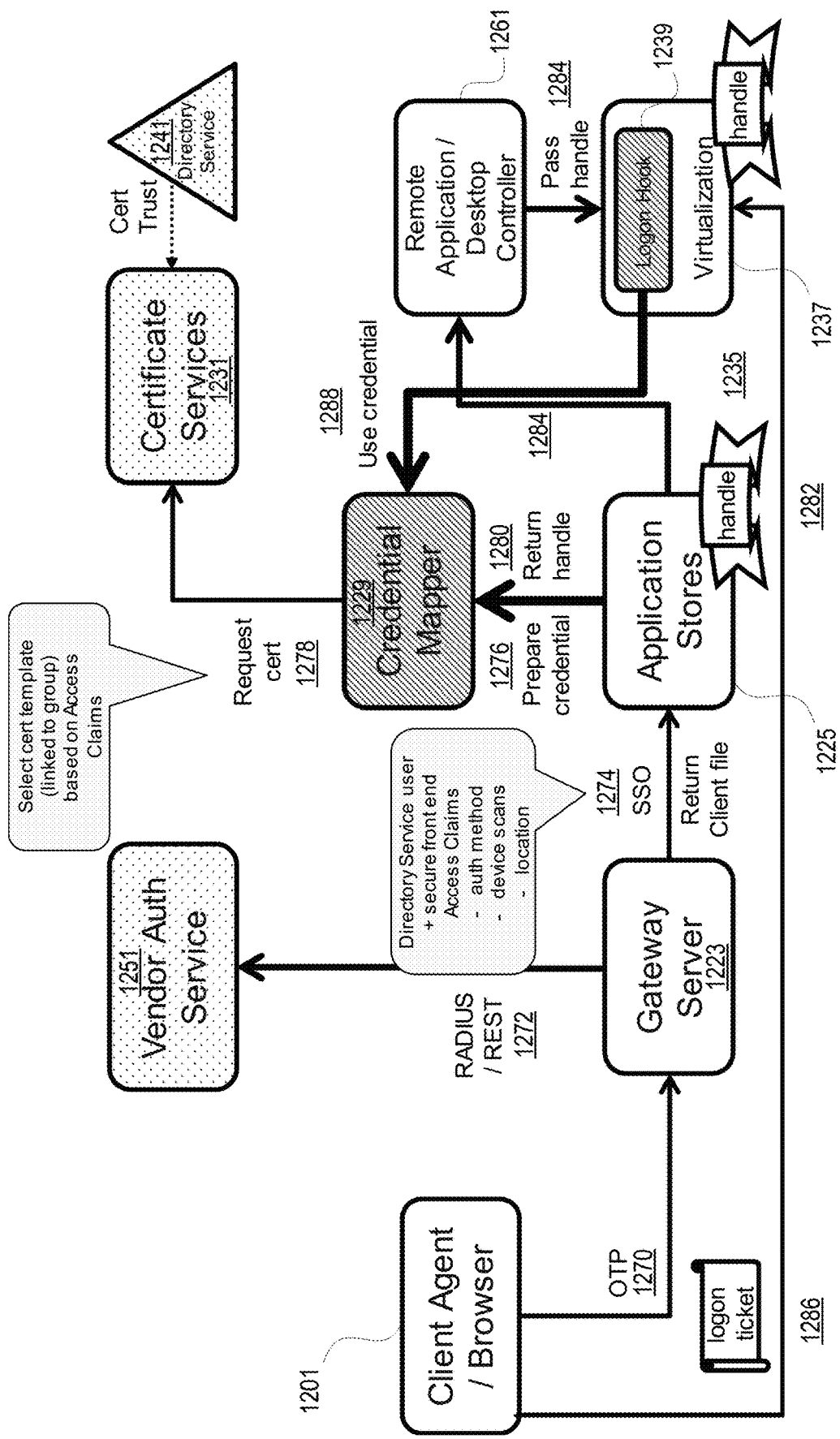
FIG. 12C depicts another illustrative system for federated logon in accordance with one or more illustrative aspects described herein.

FIG. 12C depicts another illustrative system for federated login in accordance with one or more illustrative aspects described herein. The components described with respect to FIG. 12C may be used to create and use a virtual smart card to start a user session (e.g., a virtual desktop session). The AD domains that hold user accounts may have a pre-established trust of the correct form to allow smart card class user certificates issued by a certificate authority (CA) such as certificate services 1231, to be used for full AD domain logon. Initially, several deployment steps may be performed (not illustrated). For example, the system may perform steps (which may be manual steps) to deploy the credential mapper 1229 and to establish trust among the components illustrated in FIG. 12C.

A credential mapper 1229 may comprise a registration authority (e.g., an enrolment agent) to the CA. The credential mapper 1229 may request its own credential, such as a client certificate issued by the CA using a bootstrap certificate template that may use manual approval by an organization's CA administrator (e.g., a security officer). Once the first certificate has been issued, a second certificate template may allow an RA certificate rollover to be handled automatically. A rollover may comprise issuance of a new certificate as the expiration of the current certificate draws near.

The second certificate template may also allow one instance of the credential mapper 1229 to authorize another server to join the group and host another instance of the credential mapper 1229. This may be used for scale out and redundancy, while minimizing the operational burden of setup and ongoing maintenance. This may be beneficial if users of this feature are not experts in operating and maintaining such certificate-based deployments while maintaining high availability.

An example flow will now be described with reference to FIG. 12C. The client agent 1201 (or a browser) may logon to the gateway server 1223. In some aspects, a one-time password (OTP) may be used instead of an AD password. The user may be issued an OTP. Other authentication credentials, such as a SAML token, smart card credentials, challenge/response credentials, Kerberos credentials, biometrics, PINs, and the like, may alternatively be used instead of the OTP. In step 1270, the client agent 1201 (or a browser on the client device) may send the OTP to the gateway server 1223. Because an AD password is not used, the gateway server 1223 might not be able to use the password to sign on (e.g., in a single sign on) to the application store 1225. Instead, in step 1272, the gateway server 1223 may authenticate the user via a vendor authentication service 1251. For example, the gateway server 1223 may use the Remote Authentication Dial-In User Service (RADIUS) network protocol, Lightweight Directory Access Protocol (LDAP), Representational State Transfer (REST) network protocol, or any other type of network protocol to authenticate the user based on the OTP. The gateway server 1223 may send, for example, cleartext user credentials encrypted as part of a transport protocol such as RADIUS, LDAP, or REST. The authentication service 1251 may recover the cleartext credentials and validate them. The authentication service 1251 may report back whether the credentials are valid, and potentially supply extra identity information such as a canonical username and group IDs.

In step 1274, the gateway server 1223 may send the identity of the user (e.g., AD identity) to the application store 1225, via a single sign on protocol. The gateway server 1223 may also send security context information to the application store 1225. Exemplary information sent in step 1274 includes the authentication method, information identifying the scans performed on the client device, and/or the location of the client device. Several steps may be performed during the SSO session initiated by the gateway server 1223.

In step 1276, the application store 1225 may contact the credential mapper 1229 (e.g., a user credential service) to ensure that a matching user certificate and private key is available to enable Windows AD logons. Some or all of the security context information passed by the gateway server 1223 to the application store 1225 may be sent to the credential mapper 1229 for incorporation into the user certificates. The context information may be sent in condensed, expanded, or mapped form. The application store 1225 may control what security context information is passed to the credential mapper 1229. Another piece of information that may be passed may comprise a role label associated with a security group (e.g., a WINDOWS security group). The role label may be chosen based on the raw security context information, and may be a customer security policy decision. Users may be added to security groups.

The application store 1225 may also authenticate to the credential mapper 1229, such as by using Kerberos or a device certificate. If it uses a machine level authentication, the credential mapper 1229 may implement a whitelist of machines trusted to request credential handles which can be used later (e.g., by a different set of trusted machines) for logon (e.g., user impersonation). Alternatively, the application store 1225 may use Kerberos Constrained Delegation (KCD) and Protocol Transition to impersonate the user immediately and perform Kerberos user authentication to the credential mapper 1229. This may allow the whitelist to be managed using standard AD controls for KCD. This may also provide a mechanism to blacklist particular sensitive user accounts, such as administrators, who can be excluded from user impersonation.

In step 1278, the credential mapper 1229 may act as a registration authority (e.g., an enrolment agent) to the certificate services 1231 (CA) based on pre-established authorizations that allow the credential mapper 1229 to request certificates for certain users. Using the role label provided by the application store 1225, the credential mapper 1229 may determine which CA and certificate template combination to use to obtain a certificate for a particular session. Customers can use the Authentication Mechanism Assurance feature of AD and Enterprise Certificate Services (e.g., WINDOWS SERVER 2008) to cause user sessions based on these certificates to belong to particular security groups, such as WINDOWS security groups. This may allow the virtualization session 1237 to be granted or denied access to network resources using standard WINDOWS access control lists (ACLs). The ACLs may list access control entries (ACE) used to identify a trustee and to specify the access rights for the trustee.

The credential mapper 1229 may use its RA certificate provisioned during deployment to prove its service identity to the certificate services 1231. This may be used by the certificate services 1213 to authorize or deny access to the requested certificate template and thus to allow or deny the certificate issuance request 1278. The WINDOWS Enterprise Certificate Services may allow ACLs on certificate template and enrolment agents that allow restricting which entities can issue certificates and for which subjects.

In step 1280, once the credential mapper 1229 has created or located an appropriate user certificate for the session, the credential mapper 1229 may return a secure handle to the application store 1225 that can be used by virtualization machines to later access the certificate credential. The returned handle may be similar to an OAuth token. For example, the handle may comprise a secure random number combined with other information, such as a server identity tag, to later allow network access from another machine. The handle might not be usable purely as a bearer possession token. Rather, the token may be used when presented by a machine that can independently prove its identity (using Kerberos or a machine certificate, for example) and is on a whitelist of authorized machines.

In step 1282, the application store 1225 may cache the credential handle, similar to how the application store 1225 might cache a user password. Depending on its size and other considerations, the handle may be placed verbatim into the SAML auth tokens issued by the application store 1225 authentication service to be cached by the client agent 1201 or other components. Alternatively, the handle may be placed into a credential holder or vault maintained on the application store servers 1225 for access when processing later requests the handle. The application store 1225 logon process may complete at this stage.

In step 1284, a resource launch request may be made after logon by the gateway server 1223 and/or the application store 1225. The credential handle may be recovered from the application store 1225 SAML auth token, either directly or indirectly. As part of the launch processing, the handle may be transported via the desktop controller component 1261 to the machine that will host the user's session (e.g., virtualization session 1237, such as a WINDOWS session), in preparation for a display remoting connection that may be later made. For example, the handle may be passed to the virtualization session 1237 using the remote application or desktop controller 1261. The session may comprise a virtual desktop or a virtual application session, and the host 1237 may be dedicated to one user session at a time or allow multiple independent user sessions (e.g., using remote desktop services). The user session may already exist if this is a reconnection event, or may be about to be created if this is a first time launch event. The session host 1239 may receive the handle and may cache the handle temporarily while awaiting the display remoting connection. The handle may also be encrypted prior to the transmission and caching steps to minimize the risk of disclosing the handle. The key for decrypting the handle may be sent to the client agent 1201 as part of the normal client agent launch file, in the form of a logon ticket.

In step 1286, the client agent's engine may be started using the client agent launch file received from application store 1225. The client agent 1201 may present the logon ticket to the session host 1237 as part of the client agent session negotiation. Although not illustrated, the client agent connection may be proxied via the gateway server 1223, involving a separate authorization ticket.

In step 1288, using the logon ticket to derive the decryption key, the credential handle may be recovered and used to request credential operations be performed by the credential mapper 1229. The operations that are requested may be used to remotely perform a smart card logon, such as operations to get the user certificate itself, to perform one or more sign operations, and/or to perform one or more decrypt operations to unwrap Kerberos session keys. An alternative form of interaction may be to create the ephemeral virtual smart card directly on the virtualization agent 1237 (e.g., just in time). In this example, the CSP may create a key pair and then send a certificate signing request for the public key to the credential mapper 1229, in place of the normal get certificate request. This request may be made using the credential handle and using machine authentication.

The credential mapper 1229 may request a certificate for the user based on role and other security context information, as previously discussed. The certificate may be returned to the virtualization agent 1237, but the remaining virtual smart card operations may be performed locally as the key is present locally.

The credential mapper 1229 may be modified to not create a key pair. Instead, the credential mapper 1229 may remember the relevant information for obtaining the user certificate (e.g., the user identity, role, or other security context information). The credential handle may be a reference to this information rather than a virtual smart card already prepared using that information.

Similar to the fast smart card login case, the CSP may delegate many or most of the operations to another CSP (e.g., a standard CSP) on the virtualization agent 1237. In the full federated logon case, the standard CSP may comprise a CSP that can leverage a TPM or other HSM to provide strong key protection or acceleration features. The key may be kept available for use during the session. The key may also be held in memory long enough to use for logon and then be destroyed. In the foregoing example, cryptographic operations may be distributed across the virtualization agents 1237, reducing the load on the credential mapper 1229.

The session host machine (e.g., virtualization session 1237) may authenticate to the credential mapper 1229 using, for example, Kerberos or a device certificate. The credential mapper 1229 may implement a whitelist of machines that are trusted to use credential handles in this way to achieve user logon (e.g., user impersonation).

Figure 13:
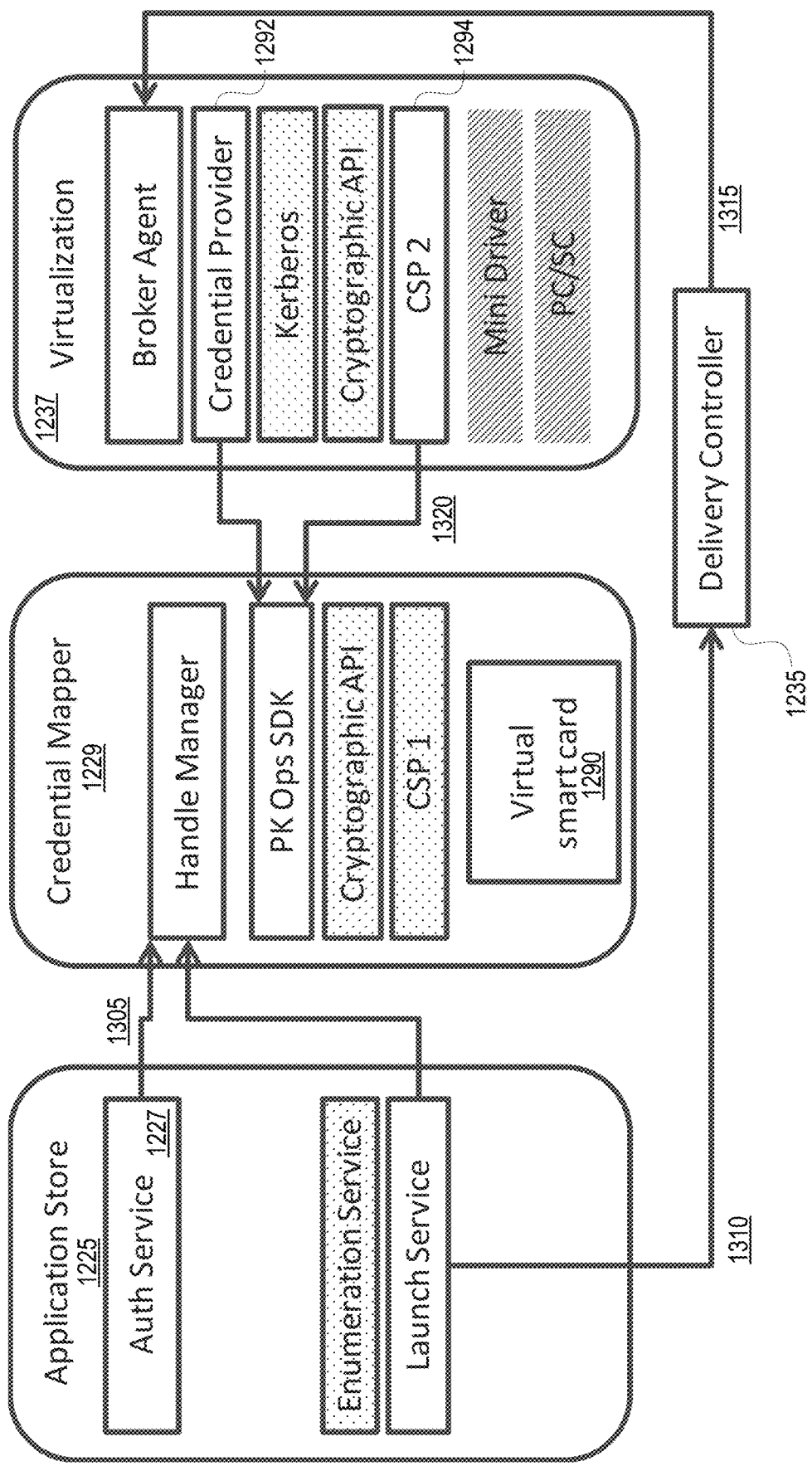
FIG. 13 depicts an illustrative interaction between an application store, a credential mapper, and a virtualization agent in accordance with one or more illustrative aspects described herein.

FIG. 13 depicts an illustrative interaction between an application store 1225, a credential mapper 1229, and a virtualization agent 1237 in accordance with one or more illustrative aspects described herein. In this example, components for fast smart card logon previously discussed may be reused to implement federated full domain logon. For example, the credential mapper 1229 may act like a network virtual smart card, except that the smart card 1290 may be ephemeral and issued based on a SAML token or other trusted identity confirmation, as previously described. Moreover, a one-shot logon ticket (or a proof key, as previously discussed) may be generated by a broker or the credential mapper 1229 to link the remote session launch request to the remote display protocol connection.

There are multiple ways in which proof keys may be used, some of which were discussed above. Another way is that the client agent may have a proof key which is linked to the SAML authentication token during authentication to the IdP. This proof key may also be linked to the virtual smart card certificate, and an interaction between the client agent and the virtualization agent involving this proof key may be performed before the virtual smart card can be used. The virtualization agent may establish whether the client agent has possession of the proof key (e.g., as a precondition for using the virtual smart card). Alternatively, the virtualization agent may mediate an indirect interaction between the client agent and the credential mapper. Mediation may be used to prove possession of the proof key before permitting virtual smart card operations, or could potentially be used to decrypt the private key of the virtual smart card.

The application store 1225 may call the authentication service 1227 (e.g., the logon data provider extension) to obtain custom logon data for one or more launch request. In step 1305, the authentication service 1227 may obtain the logon data from the credential mapper 1229. An initial interaction with credential mapper 1229 may also occur during application store 1225 logon to help minimize delays during launch. The logon data from the credential mapper 1229 may comprise a reference to a virtual smart card 1290 controlled by the credential mapper 1229. The application store 1225 may receive the logon data from the credential mapper 1229.

In step 1310, the application store 1225 may encrypt the logon data and send the encrypted data to the delivery controller 1235. Step 1310 may be performed, for example, during a client logon step. In some aspects, the encrypted logon data sent to the delivery controller 1235 may be unsigned. In step 1315, the delivery controller 1235 may send the encrypted logon data to the virtualization agent 1237. Step 1315 may be performed, for example, during session preparation, much like an encrypted username and password would be passed during a standard launch request. The application store 1225 may place the encryption key or a random value from which it can be derived in a client agent file as the logon ticket.

Virtualization agent 1237 may include a credential plugin 1239 (illustrated in, e.g., FIGS. 12A-C), and the credential plugin 1239 may be pre-registered on the virtualization agent 1237. The credential plugin 1239 may be associated with a particular credential type, and the credential type may be declared by the application store 1225 with the logon data sent to the virtualization agent 1237.

As previously explained, KCD may be used for logon. In the KCD implementation, the custom logon data from the application store 1225 may direct a different virtualization agent 1237 credential plugin to make authenticated contact back to the application store 1225 (or to the credential mapper 1229) presenting a token or ticket that the application store 1225 had issued. The application store 1225 may then use KCD to delegate the user identity to the virtualization agent 1237 just in time. This implementation may avoid building a full Kerberos delegation chain through the XML interface to the delivery controller 1235 and a brokering protocol interface to the virtualization agent 1237. The virtualization agent credential plugin may then invoke an authentication package to convert the network logon token from KCD into a full interactive logon token.

When a connection with the client is made and the logon ticket is presented, the virtualization agent 1237 may perform auto logon processing. For example, the virtualization agent 1237 may signal a credential provider 1292, which may be registered for, for example, workstation sessions. Instead of a credential provider, a credential provider filter may be used, such as in the case of remote desktop sessions. The encrypted logon data received in step 1315 may be decrypted and inspected to determine the credential type. Because the credential type may be a custom credential type, the decrypted data may be passed to the registered credential plugin. The credential plugin may generate appropriate serialized credential structures used by the WINDOWS Logon system (or any other OS logon system). The serialized credentials may be returned from the credential provider 1292 (or filter) for processing.

The credential plugin 1239 may generate a KERB_CERTIFICATE_LOGON structure, as previously described. The KERB_CERTIFICATE_LOGON structure may indicate to the operating system that a smart card domain logon is to be performed. As previously explained, the data structure may include a reference to the driver (e.g., CSP, such as CSP 1294, or KSP) that is to be used for the interactions with the smart card. In step 1320, CSP 1294 may then redirect the relevant operations to the credential mapper 1229 where the virtual smart card resides.

Authorization for the virtualization agent 1237 to use a particular virtual smart card may be two-fold. First, it may be confirmed that the virtualization agent 1237 is on a whitelist of hosts that are trusted by the credential mapper 1229. Second, it may be confirmed that the virtualization agent 1237 has received the reference from the delivery controller 1235 during session preparation. Because of the nature of the resource launch interactions between the application store 1225 and the delivery controller 1235, the application store 1225 (and therefore the credential mapper 1229) might not know the virtualization host 1237 identity that will be chosen by the delivery controller 1235 when it obtains the virtual smart card reference. Accordingly, the virtual smart card reference may be selected to be usable by any trusted virtualization host. Any trusted virtualization agent host can use the credential reference to create a virtual smart card locally.

Figure 14:
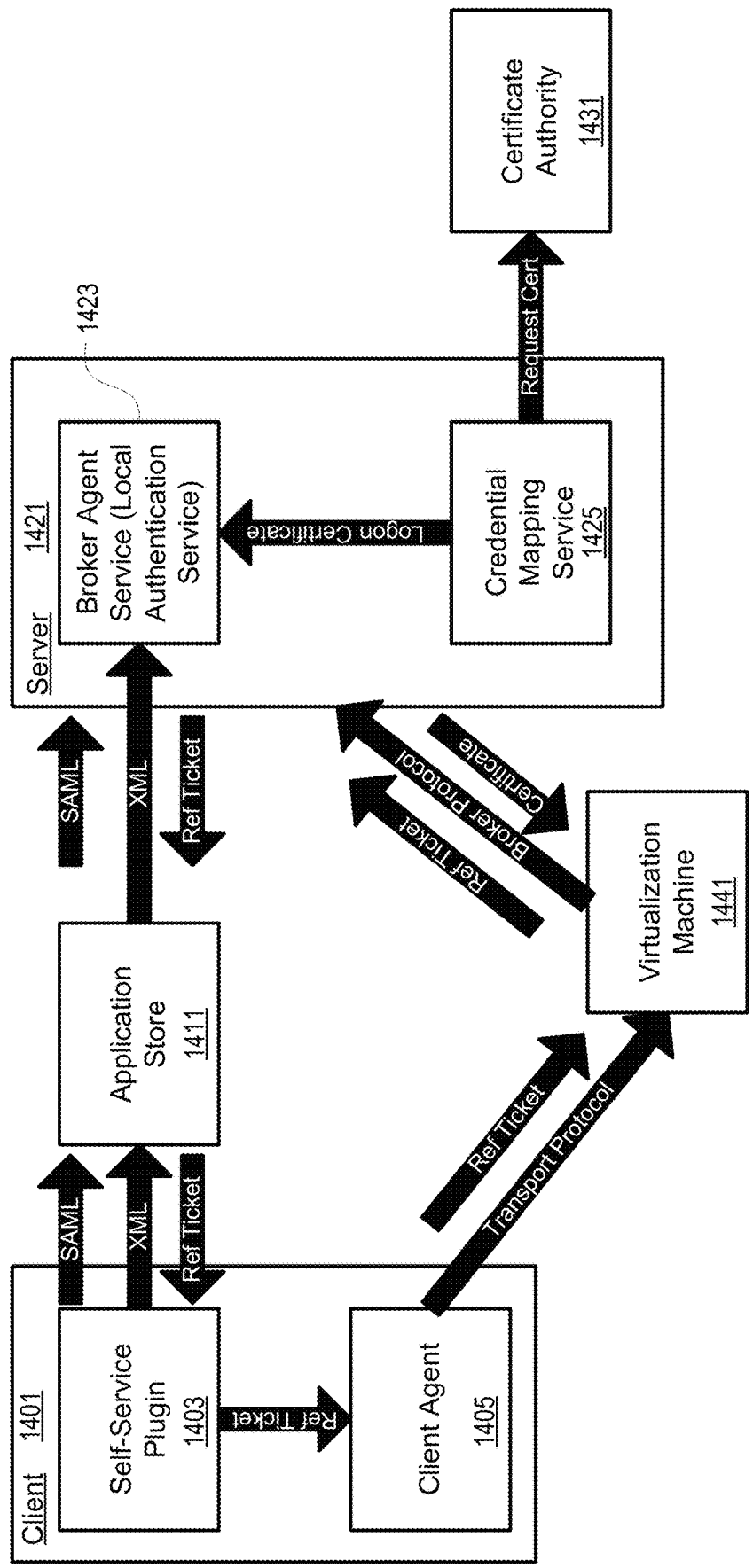
FIG. 14 depicts yet another illustrative system for federated logon in accordance with one or more illustrative aspects described herein.

FIG. 14 depicts yet another illustrative system for federated logon in accordance with one or more illustrative aspects described herein. From the perspective of a virtualization deployment, the steps performed by the components illustrated in FIG. 14 (and also FIGS. 12A-C previously discussed) may be similar in model to traditional ticket logon models, such as a reference ticket via SAML.

As previously discussed, the client device 1401 may receive a SAML authentication token from an identity provider. In order to have full domain access, the client device 1401 may send the SAML token to the application store 1411 for authentication. The application store 1411 may send the SAML token (e.g., rather than the user's clear-text password) to the broker agent service 1423 and/or a delivery controller at the server 1421, which may be used to request a reference ticket. The SAML token may be the same as the SAML token sent by the client 1401, or it may have been modified by a third party IdP. If the server 1421 determines that the SAML token is acceptable (e.g., by the delivery controller verifying the SAML token with the credential mapping service 1425), the server 1421 may create the user's ticket (which may be temporary) and also return a reference ticket that references or identifies the created ticket. For example, the credential mapping service 1425 may generate and send a PKCS10 request to a certificate authority (CA) 1431 and obtain a certificate from CA 1431 at this stage. The ticket may be stored at the server 1421, such as at the credential mapping service 1425. The server 1421 may send the reference ticket to the application store 1411, and the application store 1411 may send the reference ticket to the client 1401, via the self-service plugin 1403. On the other hand, if the SAML assertion is rejected by the credential mapping service 1425, an "Access Denied" error code may instead be returned to the application store 1411.

The client device 1401 may redeem the reference ticket for full domain logon. For example, the client agent 1405 may receive the reference ticket from the self-service plugin, optionally store the reference ticket, and send the reference ticket to the virtualization machine 1441 using a transport (e.g., remoting) protocol. The virtualization machine 1441 may send the reference ticket to the server 1421, such as a delivery controller (e.g., DDC) at the server 1421 (not illustrated). The ticket may be sent by a broker protocol, such as a CITRIX Connection Brokering Protocol (CBP). The virtualization machine 1441 might not know whether the reference ticket represents a SAML assertion login until after it sends it to the broker. The response from the broker may either be a cleartext password, or a new response structure containing a public key PKCS7 authentication certificate chain.

After receiving the reference ticket, the delivery controller may determine (based on information included in the reference ticket) that the ticket is used for a credential mapping service 1425 authentication process, rather than a clear-text password authentication process. Accordingly, rather than returning a clear-text password to the virtualization machine 1441, the delivery controller may return the logon certificate previously generated and/or stored by the credential mapping service 1425.

As previously discussed with reference to FIGS. 12A-C, the components at the server 1421 may verify that the reference ticket is correct and timely (e.g., to be redeemed within a particular time period). When the broker receives a valid reference ticket that represents a SAML assertion, it may act as a proxy between the virtualization machine 1441 and the credential mapping service 1425.

Once the certificate is provided, the client 1401 may be given access to private key signing operations over the broker protocol. The virtualization machine 1441 may log the user in using AD smart card authentication. The first communication packet may be a request for the public PKCS7 certificate chain. Subsequent requests from the virtualization machine may be for private key signature operations.

Various security policies may be used. The credential mapping service 1425 may be granted privileged access to the certificate authority 1431 (e.g., MICROSOFT Certificate Authority). The certificate authority 1431 may issue certificates for users. In addition to any restrictions placed on the credential mapping service 1425 by the certificate authority 1431, classes of security policies may be configured by the credential mapping service administrator. First, which users can log in may be controlled. An access control list (ACL) may specify who can and cannot be allowed to authenticate using the credential mapping service 1425. For example, it may be decided that no members of a Domain Administrators group will be allowed access this way. Second, which virtualization machines may redeem tickets may be restricted. At the broker's request, tickets may be redeemable by named virtualization machines (e.g., Kerberos domain account or Trust Area RID). The credential mapping service 1425 may be able to restrict the list of virtualization machines. For example, it may be determined that one virtualization machine catalogue should be allowed to authenticate using the mechanism described herein.

Third, certificate validity periods may be used. Certificates may be available for use for a short time period, such as a number of minutes. This may be controllable via the certificate authority 1431. If longer-lived certificates are desirable, a revocation system may be triggered or implemented, e.g., by user logoff. Alternatively, longer-lived network virtual smart cards may be utilized. The network virtual smart cards may be protected to a higher security level, for example by using a Hardware Security Module or Trusted Platform Module (TPM) to encrypt the virtual smart card private keys. Alternatively, each private key may be linked to a persistent proof key held by a specific client agent. The virtual smart cards might not be revoked on logoff, but could be stored persistently by the credential mapping service 1425. Accordingly, the virtual smart cards stored at the credential mapping service 1425 may be reused over longer periods of time (e.g., for the duration of a session, and not just for domain logon) because they are stored at the credential mapping service 1425 (rather than a specific virtualization host), which may provide stronger protection of the virtual smart cards and other performance benefits.

Fourth, certificate caching and revalidation may be controlled. Certificates may be used both for initial authentication and subsequent desktop unlock operations. By default, certificates may be cached for a time period, but an administrator may wish to configure a policy whereby a new certificate is generated by submitting a new SAML token. Fifth, SAML assertion verification may be implemented.

Standard controls over verifying SAML tokens may be provided. SAML tokens that assert a Windows UPN may be allowed initially, which might require special configuration of third party IdPs.

Various other security controls may be configured for components described herein. For example, the administrator, such as a directory service (e.g., AD) administrator, for each user domain may manually configure trust of the relevant CA. For example, the administrator may import certificates, such as root or subordinate root certificates, into a protected data store, such as a MICROSOFT NTAuth Certificates store in AD. Importing these certificates may indicate that the relevant CA is trusted to issue certificates of a smart card or domain controller type. Importation of certificates may be performed automatically when WINDOWS certificate services is deployed as an Enterprise CA.

The CA administrator may also import or create, for example, three certificate templates. The first template may be used to bootstrap initial trust in a data center server, which may provide virtualization components and services. The second template may be used to allow automated certificate renewal of data center server credentials and issuance of credentials for new data center servers that join the cluster. The third template may be used to issue smart card logon certificates for users. The CA may have access controls that determine which data center servers can use the templates.

Another security control may comprise manual approval by the CA administrator to bootstrap trust for the credential request from the data center server. Yet another security control may comprise the data center server itself implementing a set of security controls to identify the application store servers that are authorized to request the creation of virtual smartcards, and the virtualization machines that are authorized to use virtual smartcards for logon. It may also have controls to identify or limit the set of users who can be impersonated in this way.

Illustrative Embodiments of a Credential Mapping Service

Embodiments of the credential mapping service previously discussed may be implemented in various ways. One goal is a system where users can be easily and quickly logged on to an Active Directory user account using certificates.

In one aspect, the remote service described herein may be located in the client agent on the client device. In these aspects, the client agent may directly use the user's smart card to perform the authentication step. This may use a new virtual channel, as previously discussed.

In another aspect, the remote service may comprise a credential mapping service, as previously discussed. This service may be used for issuing and storing smart card certificates on-the-fly using a certificate authority, such as the Enterprise MICROSOFT Certificate Authority. Alternatively, the certificates may be pre-created. The credential mapping service in combination with the Certificate Authority may be used for enforcing various aspects of authentication policy.

Figure 15:
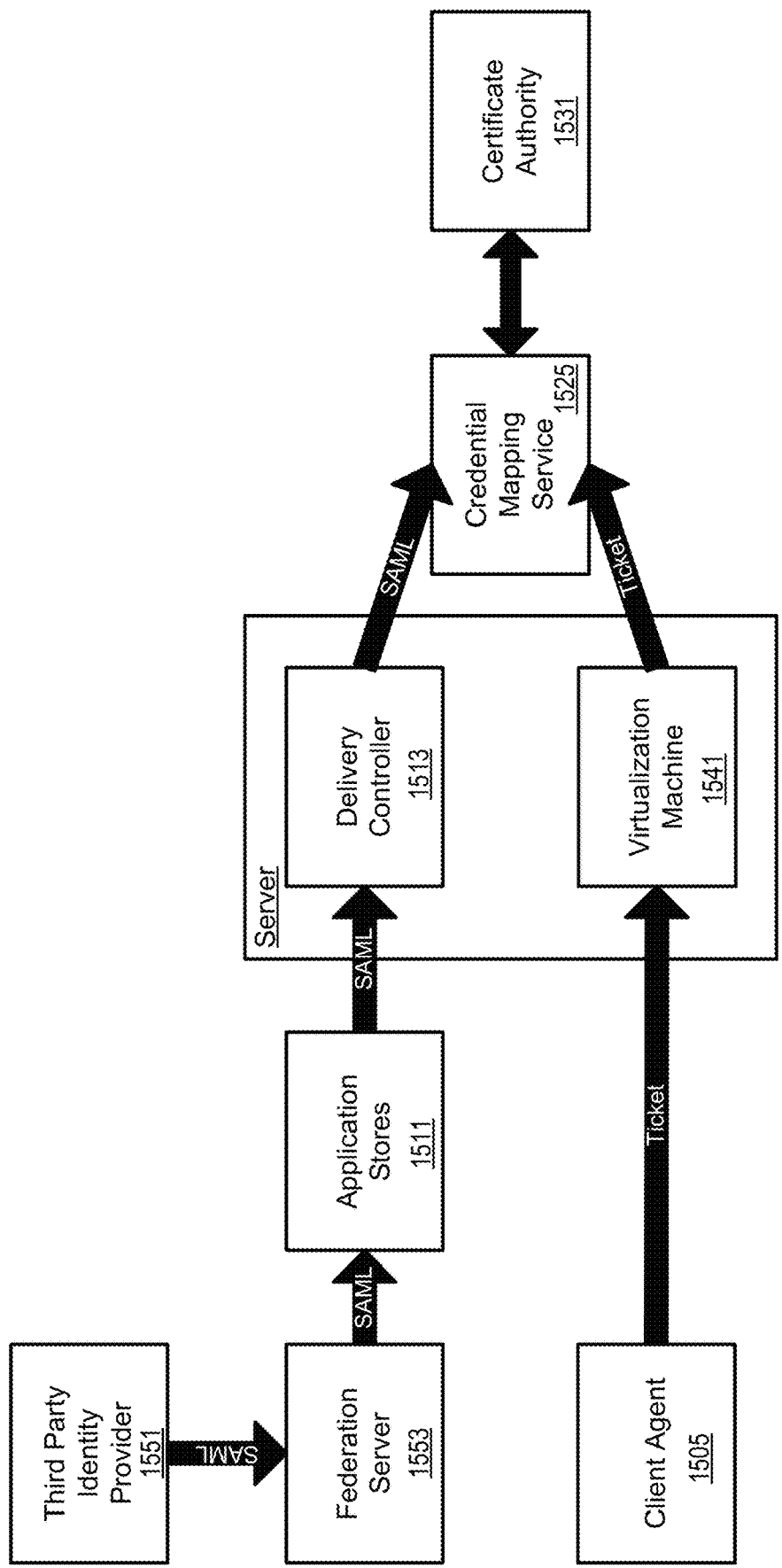
FIG. 15 depicts an illustrative system for providing a credential mapping service in accordance with one or more illustrative aspects described herein.

FIG. 15 depicts an illustrative system for providing a credential mapping service in accordance with one or more illustrative aspects described herein. A third party IdP 1551 may send an identity confirmation token (e.g., a SAML token) to a federation server 1553. The federation server 1553 may send the token to the application store 1511, which may forward the token to a delivery controller 1513. The credential mapping service 1525 may accept SAML tokens from specifically enrolled delivery controllers 1513 over a protected connection. If the authentication is allowed by the configured policy, it may return a one-time usage secure random ticket which may be passed to the client agent 1505. The client agent 1505 may present the ticket to a virtualization machine 1541, and when the virtualization machine encounters the ticket, it may present it to the credential mapping service 1525 (e.g., over a trusted connection). This may allow the logon system access to a remote cryptographic operation protocol server running in the credential mapping service 1525. The credential mapping service 1525 may generate a private key and enroll a temporary smartcard certificate for the user identified by the SAML token to perform the cryptographic aspects of authentication. In some aspects, the generated private key may be wrapped using a key derived from or related to the secure random ticket.

When explicit authentication into an Active Directory account is desired, a separate high-privileged service may be installed. This service may be configured by a domain administrator. Domain administrator (or equivalent) credentials may be used to configure the domain's certificate authority 1531 for use by credential mapping service 1525. This might be done once, and may be done automatically from an Administrator's console.

When configuring the credential mapping service 1525, a certificate authority 1531 may be selected from a list of all CAs available in the domain. Domain administrator (or equivalent) credentials may be used to authorize the credential mapping service 1525 to access the selected CA 1531. The domain administrator (or equivalent) may acknowledge the authorization of the credential mapping service 1525 using the selected CA's administration console. For security reasons, the operations described herein may be done for each credential mapping service.

The credential mapping service 1525 may have three basic lists for runtime configuration: a list of machines able to request that credentials be mapped, a list of user accounts that can be mapped (e.g. a group), and a list of machines able to perform AD logons based on mapped credentials. Accordingly, the security decision may have the following form: application store A may map a SAML assertion B onto an active directory account C. The logon may then take place on virtualization server D.

Various benefits are available based on the concepts disclosed herein. First, a few operations, such as "get certificate from smartcard" and "perform private key" operations, may utilize round-trip communications between the server and the smart card (e.g., on the client device). Accordingly, the logon process may be noticeably faster. Furthermore, smartcard logon may be successful even if no compatible smartcard drivers are installed on the server.

Another benefit is that one time passwords may provide access to a real active directory account. Anonymous logons may also be temporarily mapped to full AD accounts. Third-party authentication solutions can be easily mapped into the virtualization machine.

For the fast smart card logon feature, there may be integration with the WINDOWS PKINIT Logon System. A credential provider package may be installed on to server machines that are to interoperate with this authentication system. This may comprise an extension to credential providers already included in some systems. The new functionality of this package may be to instruct WINDOWS to log in with PKINIT using a CSP. The CSP may ultimately communicate with a remote process which provides the actual logon certificate and performs associated private key operations. A virtual channel may act as a conduit between the CSP and the existing authentication manager program running on the client. Three transactions (or operations) include "get smartcard user certificate," "perform private key signature," and "decrypt with private key". The authentication manager may use the local smartcard directly to satisfy PKOps requests, which may log the user into the virtualization machine. As the authentication manager may already have unlocked the smart card to log into the application store, this may also provide SSO functionality.

In some additional aspects, rather than passing the PKOps requests to the client via the virtual channel, the requests may be directed to a credential mapping service (CMS). The CMS Server may authorize logon and perform PKOps. A trusted service installed on a separate server may service PKOps requests from the CSP to log in the appropriate user after it has performed authorization checks. As it has a separate secure communication path with the delivery controller, the CMS may authorize logon requests that it is expecting. A "single use ticket" presented by the CSP may be one mechanism to achieve this. The CMS may automatically enroll smartcard certificates. To perform user logons, the CMS internally may automatically generate smart card certificate requests and have them issued by the MICROSOFT certificate authority or a third-party CA. The PKOps requests from the CSP may be serviced based on these certificates. The CMS may additionally protect the private keys for the certificates using encryption with a key wrapping key derived from the single use ticket, or using a Hardware Security Module or a Trusted Platform Module, or other similar means.

General security requirements may exist. Private keys may be protected and used to sign PKINIT requests. Whenever servicing a PKOps private key signing request, the server may ensure that it is actually performing a Kerberos logon by inspecting that the data it is signing is an ASN-1 structure corresponding to the appropriate Kerberos protocol data. An attempt to perform private key operations on other data structures may be rejected. For the decrypt operation, the decrypted data may be inspected before being returned to the server to ensure it has an expected ASN-1 structure corresponding to the Kerberos protocol operation. Private keys might not be generated or stored on virtualization machines. The PKOps protocol may ensure that private keys do not need to be present on the machine that users are logging in to. Private keys may reside in the smart card on the client machine, or in the CMS server which can be isolated.

In some embodiments, a user may reconnect to a remote session (e.g., a remote application or desktop session). The reconnection may use a different authentication method and/or a different security context as the original launch. Upon reconnection, the claims could be updated to reflect the new authentication method, assurance level, and/or other security context information, such as location and device. This update may be performed in addition to reflecting the information into Kerberos tickets (where security groups membership is tracked), and into the session certificate itself, which could be used for TLS client authentication and then inspected by other servers), as described above. In some aspects, a new certificate may be generated for each launch or reconnect, rather than using the certificate pre-creation or caching model described above.

As with a launch, a normal (e.g., WINDOWS or other OS) authentication process may occur for the reconnect, as previously described. At the OS level, this authentication (e.g., re-authentication of the currently logged on session user) may be used to confirm that the session may be unlocked because the correct user is present. After confirmed that the user is the correct user, the existing session may be made accessible so that the user can see and use the user's applications. However, the virtualization agent (which may be orchestrating this activity during the reconnect operation) may arrange that the Kerberos ticket information for the session (based on the original authentication to launch the session) be discarded and replaced with the new Kerberos tickets that were obtained during the re-authentication. Existing APIs in the OS may be used to discard and replace Kerberos tickets in this way. For example, the WINDOWS command klist.exe may be used. The updated information may also be propagated to certain parts of the OS that work in special ways, such as services which manages file share access.

Alternatively, the original session certificate may be replaced with the new certificate. The session certificate may comprise the logon certificate previously discussed, but with a lifetime that is long enough for use during the session and propagated into the OS certificate store so that it is accessible to the applications. To clean up any application level TLS connection state that was based on a previous certificate, the browser may be, for example, restarted to correctly pick up the new certificate. Alternatively, an attribute authority model may be used. For example, the session certificate might not contain the actual security context information, but rather a pointer (e.g., with suitable session reference) to a service that knows the information, such as the credential mapper service, as previously described. A website that uses TLS client authentication may query this attribute service to learn the true information.

Enterprises may wish to protect their data while improving user productivity by allowing access to network resources from a variety of devices and scenarios, such as including a mix of corporate managed and unmanaged devices, connecting from internal and external locations, etc. Enterprises may comply with regulations and/or certain security requirements that may restrict data or task access based on context, such as the device type or class, device status, user location, method of authentication, or other factors.

Because data may reside in content management systems, file servers, databases, etc. (which may be accessed over a corporate network), tracking context information to enforce one or more policies can be tricky. For example, when using desktop and/or application virtualization, it may be difficult to capture and convey this context information because access from applications running in the virtualization session may be performed using standard network protocols such as Hypertext Transfer Protocol (HTTP), HTTP Secure (HTTPS), Server Message Block (SMB) protocol/Common Internet File System (CIFS), or something similar. Authorization for access can be achieved by combining user identity information derived from network authentication with access control definitions, such as access control lists (ACLs), which may be configured at the resource. However, the identity information provided by network authentication may be static, which may represent predefined group memberships or other attributes that might change infrequently.

For example, in an active directory environment, Kerberos may convey the user identity along with the user's security group memberships, and potentially additional attributes, such as claims. Claims may be derived from static attributes on the user account. An exception may be device claims that are based on a device level Kerberos authentication that is performed along with user-level Kerberos authentication as a compound action. However, when the application is running in a virtualized environment, the device identity may be that of the user session host machine and not the actual device being physically used, which may be the one that matters for authorization decisions.

In some environments, HTTPS protocols may be used for access with authentication performed by SSL/TLS using client certificates. Other network protocols using client certificate authentication are possible too. This may be used in environments where smart cards are issued for user authentication. In these examples, resource authorization may be performed using user identity information gleaned from the client certificate and potentially from attribute authorities, such as directories or databases, which may be static in nature.

In other cases, web single-sign-on (SSO) or identity provider products may be used as intermediaries to perform user authentication, gather and process identity information and other attributes, and/or issue authorization statements to resource servers. The resource servers may be external or internal to the corporate network. Authorization information may be provided to the identity provider directly and reflected in claims from that identity provider, or by the identity provider itself evaluating conditional access policies in order to deny access, force additional authentication measures, and/or potentially take other actions.

Without fundamentally changing the access methodologies already in widespread use, enterprises may wish to be able to include dynamic context information in the resource authorization process. In existing systems, enterprises may rely on careful network address assignment to infer physical location of users within corporate premises, or to identify access made directly via a remote access gateway, such as a VPN. Authentication methods for remote access may be limited to those required for the highest level of data access that is supported, making the user experience less convenient and thereby reducing user productivity. In some cases, access from certain types or classes of device may be prohibited because the most stringent mode of authentication might not be supported. Various limitations may make these existing systems unsatisfactory.

Aspects described herein include using federated domain logon technology to enable enterprise resource servers to enforce access control policies based on dynamic context information regarding the circumstances of each access request. Examples of context information include, but are not limited to, device type or class, device status, user location, and/or method of authentication, as will be described in further detail below. Static context information may also be used together with the federated domain logon technology.

Dynamic context information obtained by an access gateway may be converted into labels embedded in an authentication certificate used for virtual application and/or desktop session logon and for certificate-based authentication performed in the application and/or desktop session. An active directory (e.g., WINDOWS Active Directory) mechanism may associate one or more of the certificate labels with one or more security groups. The association may provide dynamic membership control when accessing local resources on the session host and/or when using Kerberos, for example, for network resource authentication. Context information, such as dynamic context information, may be added (e.g., embedded) into one or more of the labels. For example, if a client certificate is used for user authentication (e.g., in HTTPS), an IP address (which may map to an ISP and thus be used to determine a location, such as country), IP address range, physical location of the user device (e.g., as determined using GPS, cellular, Wi-Fi, other location services), the device type (e.g., operating system type), ownership of the device, status of the device (e.g., whether OS, security patches, etc. are up to date, whether the device and OS has performed a hardware secured boot), information derived from sensors in the user device, or other context information may be included in the label.

Group membership information may be updated on each reconnect to the application and/or desktop session because the context may have changed. Virtualized application sessions connected to a virtual desktop session may be disconnected if the application context is not also changed to match and/or is incompatible with the desktop context after the reconnect.

Context changes that occur while the application or desktop session is connected may be signaled to the session. The signaling may cause a reevaluation of the access labels and/or an update of the context information, which may occur during reconnect. The signal may be generated by, for example, the session access client on the end point device, by the gateway that mediated the launch or reconnect action, by the gateway that is supporting the session access communication (if different), and/or by an external source that communicates with the session broker.

Problems associated with current systems may be solved by one or more aspects described herein, including by enabling dynamic security context information, such as device identity (e.g., real device identity), device type, device status, and/or location. The dynamic context information may be captured at certain entry points and converted into one or more labels. The system may securely convey/transfer one or more of the labels using resource authentication protocols, such as Kerberos and SSL/TLS client authentication, and/or by extension Web SSO/identity provider mediated authentication. In some aspects, use of dynamic context information and/or labels may build on the federated domain logon system described above, such as by using the fact that a new authentication certificate can be issued for each user session logon or reconnect event. This may allow the latest set of labels to be reflected in Kerberos and certificate authentication events triggered by applications running in that session.

With Kerberos, the labels may be represented as membership of, e.g., specially created security groups whose membership is dynamically controlled using, for example, an Active Directory feature such as Authentication Mechanism Assurance (AMA). Another AD feature that may be used is Kerberos claims, whose values may be taken from specified AD user account attributes. If one or more of the key entry point servers (or another server, such as the federated authentication service server, which may be given visibility of the labels and values) is granted permission to write account attributes that are designated for this purpose, then the attribute values may be included in the Kerberos tickets. This may be used if, for example, one user session at a time exists, or user logons can be controlled to avoid conflicts over the attribute values that are wanted at any one particular logon time. The claim values may then be used in access control expressions encoded in, for example, WINDOWS ACLs defined at resource servers. With some AD topologies that involve multiple AD domains or AD forests, some additional access control decisions can be made in AD where requests from one domain are filtered on reaching the forest or domain containing a resource.

With SSL/TLS, the labels (and/or an additional set of arbitrary attributes) may be expressed as properties in the client certificate itself, for example, as custom certificate issuance policy statements signed by the issuing certificate authority. With Web SSO/identity provider mediation, the labels may be learned by the identity provider using, for example, Kerberos or SSL/TLS authentication and then reflected as claims in the web SSO token, which may be based on SAML, JavaScript Object Notation (JSON) Web Token (JWT), or a similar format. In each case, the labels and/or attributes may be determined by an entry point component, such as a gateway server, an application store, an identity provider, and/or an attestation service that may be involved in user and/or device authentication, inspection, or status attestation. Additionally, user and/or device authentication may reference information or analytics data about past behavior and actions that may be used to make risk-based or other data analytic forms of status determination.

In some aspects, a reconnect to an application or desktop virtualization session may result in a different context. A new authentication certificate may be generated with the appropriate set of labels, which may be used for the active directory (e.g., WINDOWS AD) authentication step that is used to unlock the virtualized session. The system may remove (e.g., flush), from the session, Kerberos tickets and/or SSL/TLS sessions based on previous context information. As described above, the system may clear existing Kerberos tickets from the session table so that the re-authentication used to unlock the session may repopulate the session table with a fresh TGT. Other service tickets may then be obtained as needed using the new TGT containing the new set of labels. Certain operating system sub-systems, such as the WINDOWS Workstation service which mediates access to SMB or CIFS protocol network file servers, may use special treatment to ensure that any cached identity information held in those sub-systems is also flushed during reconnect. For example, access to file-based resources may be mediated by one or more file system filter drivers that are aware of labels and implement additional layers of access checks and/or control redirection of virtualized resource access requests to physical resource servers over data channels that can inspect and apply access policies based on the labels.

The Kerberos ticket cache can be directly cleared using the WINDOWS API LsaCallAuthenticationPackage specifying KERB_PURGE_TKT_CACHE_REQUEST. Context information held by an OS sub-system (e.g., Workstation service) and/or by the network file server may be cleared by forcing a disconnect of one or more network share connections for that session. A disconnect may occur while an application running in the session is actively using a file on a network share. The OS may close the network connection, causing the application to see failures on any further I/O requests it makes with open handles. The WINDOWS API WNetCancelConnection2, for example, has a force flag, which may be used to that effect. In some aspects, a virtualization mechanism, such as a file system filter driver, may be inserted between the application and the OS to help mediate, so that the network file server is promptly made aware of the new security context but in-flight application access to resources is not impeded if access is still allowed. In-flight access may be interrupted if access is prohibited. Because of the risks for potential data corruption that could occur with that action, it may be made configurable on a per-app or per-process level.

The situation is similar for applications, such as web browsers, that support using authentication certificates with SSL/TLS. The problem is two-fold: browsers may hold on to SSL/TLS session state for a long time, and many web servers and applications may create web sessions that last minutes or hours, or potentially longer. Therefore, it might not be enough just to force a browser to clear its SSL/TLS session state (which would be referencing the previous in-session authentication certificate with now stale context labels), even when a browser exposes a mechanism to do so, since the web server or application may be caching authorization information as well. For these situations, one or more options may be selected from the following: (1) have the virtualization agent shut down the browser, potentially losing any unsaved data or incomplete transactions associated with active web sessions, or (2) use a published browser to access these web resources, and have the virtualization agent disconnect the published browser if the session context on reconnect is not compatible with the context captured by the published browser session. A variation of option (2) may be to use a secure browser mechanism that adapts the published browser to render its web content as a tab in the virtualized desktop or app session browser, rather than appearing as a separate browser application window to the user. In this way, the browser tab might not need to be closed, but the secure browser session could be signaled to disconnect from the tab or be locked to indicate it is still available (but not currently accessible). The signal to the secure browser session may be sent by the virtualization agent or by another component, such as the application store and/or gateway, to minimize the possibility of malware interfering with the operation of the virtualization agent.

Rather than force the closure (e.g., complete closure) of the browser, the system may close particular tabs or windows that are associated with certain resources. Because some browsers may use a process segmentation approach internally to separate the activity for each tab, this may allow the process or processes for a particular tab to be ended. This may cause the SSL/TLS session state for that resource server to also be discarded, while minimizing disruption to the user who may have other unrelated tabs open that do not need to be affected.

The published browser or secure browser session may be launched in such a way that it receives the current context information from the virtual desktop session. For example, the in-session authentication certificate containing that context information could be used to support the published browser session OS logon, and be propagated into that session for the browser to use. The published browser (or other resource access application) may alternatively be launched with a different context, such as a different set of labels or a subset of the labels for the virtual desktop session. This may be advantageous if some of the context information is not material to access decisions for the resources to be accessed using this particular application. This may also allow the published browser or other resource access application to remain connected when only an unrelated set of the context labels have changed in the virtual desktop session.

The technique of disconnecting published apps that are incompatible with the virtual desktop context on reconnect could be applied also to the case of applications that might not cope with being disconnected from network file servers or databases or other types of resource server, or that might not cope with being forcibly closed.

In some aspects, a mechanism may be offered to provide maximum flexibility for allowing specific applications to re-adjust their operation based on the new context at reconnect. The virtualization agent may implement a signaling mechanism that advises applications that are aware of the mechanism, or invokes scripts that could be written by customers, application vendors, and/or third parties, that a reconnect is in progress. The current and new contexts may be made available so the event handlers can evaluate whether action is needed, and of what form. The handlers may be able to delay the completion of reconnect (e.g., session unlock) until the apps have adjusted to the new context, or prevent the completion of reconnect if the new context changes are not implemented (e.g., are not fully implemented). The previous two examples of reconnect adjustments might be implemented by handlers that are invoked by this generic low-level signaling mechanism. Thus, if new types of reconnect behavior are needed for particular applications, the handlers can be written or updated and deployed without needing an update of the entire virtualization agent. Third party User Environment Manager applications, such as AppSense, RES and others, may be able to register as reconnect handlers also, and use their capabilities to modify application behavior in various ways, whether by reconfiguring the application settings or dynamically hooking internal mechanisms inside the applications to control whether certain features or operations are accessible.

In some aspects, the system may call out to a service to convert context information to labels. In some aspects, if specific context information is needed later, the information may be placed into an attribute store.

Figure 16:
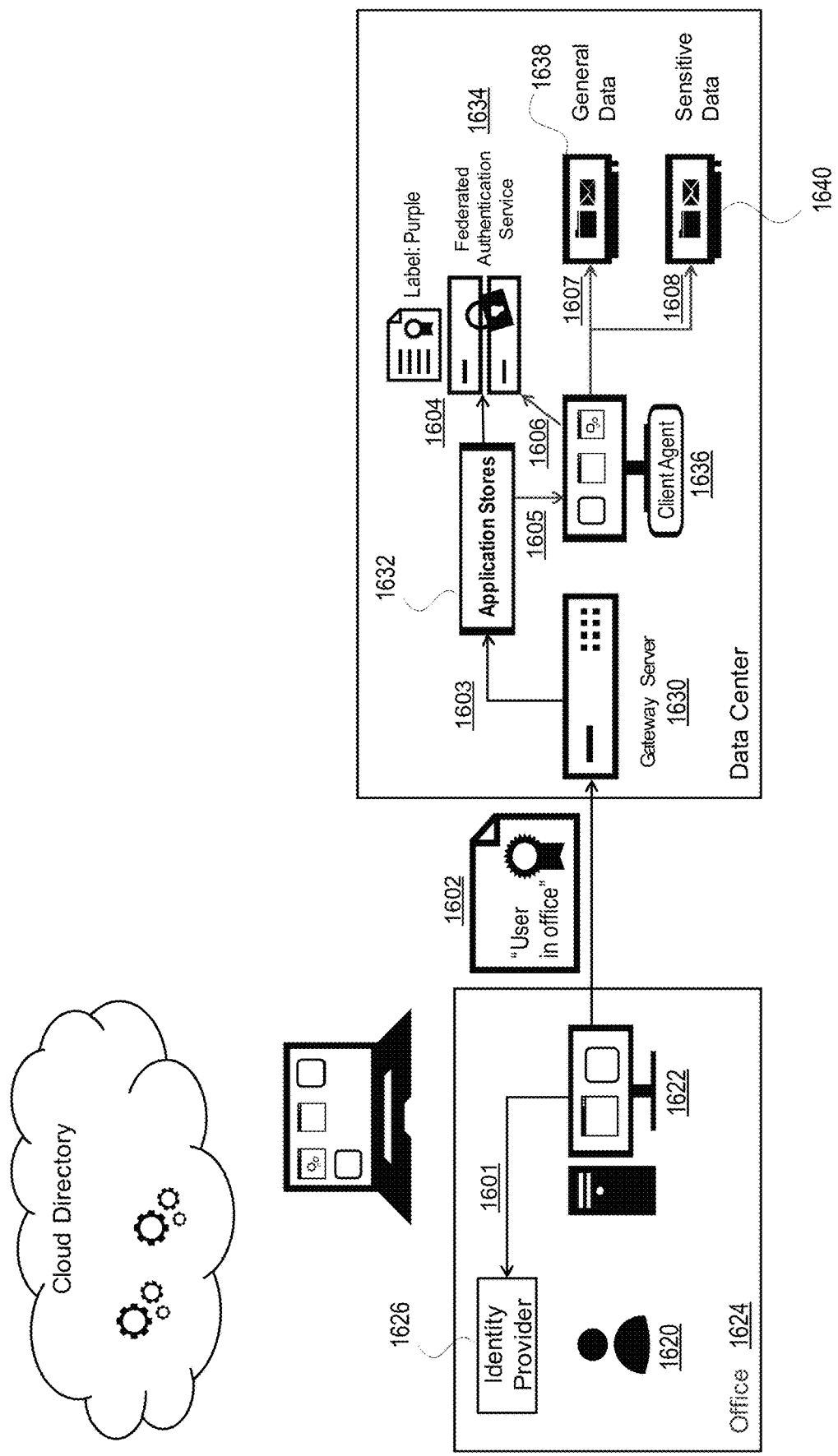
FIG. 16 depicts an illustrative system and method for dynamic access control using federated logon in accordance with one or more illustrative aspects described herein.

FIG. 16 depicts an illustrative system and method for dynamic access control using federated logon in accordance with one or more illustrative aspects described herein. For example, a user 1620 may access applications from a device 1622 (e.g., a workstation) at a particular location 1624 (e.g., in a company office or otherwise approved corporate location). Context may be reflected in group membership using AMA, which can be used to grant access to sensitive data. For example, the sensitive data may be protected using an AD security group controlled by the certificate label "Purple." Other examples of labels include orange, blue, other colors, non-color labels, etc. A logon certificate may be available in-session for PKI protected resource access.

In step 1601, a user 1620 may authenticate to an identity provider 1626 by suitable means, e.g., Kerberos authentication, such as from a corporate domain joined device in the office. The user 1620 may authenticate to the identity provider 1626 in response to a determination that the user 1620 is at a particular location (e.g., in a corporate office) and/or is connected to a particular network, such as via the corporate domain (e.g., in the office). A federated identity provider may comprise a cloud directory (e.g., AZURE Active Directory) that supports alternative authentication methods, such as biometrics. Alternatively, the user 1620 may authenticate directly to the gateway server 1630 or to the application stores 1632 in a way that allows a determination that the user 1620 is at a particular location (e.g., in the office).

In step 1602, the identity provider may issue a token (e.g., a federation token, such as a SAML token) to the gateway server 1630, with a claim that indicates the user is in a corporate office using a corporate managed device. The token may additionally or alternatively indicate, for example, a physical location of the client device 1622, a network location/connection path of the client device 1622, an authentication mechanism and/or credential type used by the client device 1622, an authentication strength of the authentication used by the client device 1622, a device type of the client device 1622, a device status of the client device 1622, a device ownership or management scope of the client device 1622, a risk score of the client device 1622 or user 1620 (e.g., based on external factors, past behavior, etc.), and/or other information. The gateway server 1630 may alternatively establish some of this information for itself, for example, based on the IP address of the client device 1622, or by using an end point analysis scan that checks for a device certificate that might be available to managed devices. In some aspects, the gateway server 1630 may receive, from the identity provider, the indication that the user is in the corporate office and confirm the location of the device 1622 based on, for example, the IP address of the client device 1622 or using an end point analysis scan.

In step 1603, the gateway server 1630 may assert the user identity and other context information to the application stores 1632, such as by using a smart access mechanism. The context information may indicate that the user 1620 is connecting from a client device 1622 that is at a particular location (e.g., in the office). The context information may additionally or alternatively indicate whether the client device 1622 is a corporate managed device. The context information may indicate other attributes about the client device 1622 or the user 1620 that may be ascertained in step 1601, and may include an indication of the nature of the authentication mechanism or protocol used in step 1601.

In step 1604, the application stores 1632 may use rules (e.g., customer-defined rules) to determine (e.g., assign) one or more labels to the user session, based on, for example, the context information supplied by the gateway server 1630 (e.g., location of the client device 1622, whether the client device 1622 is a corporate managed device, etc.). The application stores 1632 may then assert the user identity and the labels to the federated authentication service 1634, which may generate (e.g., issue) an authentication certificate (e.g., an authentication certificate associated with a smart card) with that information. For example, the user session may be assigned a purple label, which may indicate that the user is in the office, is part of a particular group of devices, and/or can access certain resources, such as sensitive data. Alternatively, the determination and/or assertion of the user identity and labels may be made by the identity provider 1626 and/or the gateway server 1630. This may happen indirectly, e.g., by the identity provider 1626 and/or the gateway server 1630 generating a signed claims statement, such as a SAML token, that is conveyed to the federated authentication service 1634. The signed claims statement may be the SAML token provided in step 1602, which is conveyed to the application stores 1632 by the gateway server 1630 as evidence associated with the logon event. The signed claims statement may be conveyed by the application stores 1632 to the federated authentication service 1634 in step 1604. The signed claims statement may alternatively be freshly generated by the identity provider 1626 and/or the gateway service 1630 and conveyed by some other interaction, e.g., a federated logon interaction such as SAML or OpenID Connect, involving the client device 1622.

In step 1605, the application stores 1632 may launch the virtual application or desktop session using the federated authentication service mechanism, as previously discussed. The application stores 1632 may convey, to the client agent 1636 on the virtual application or desktop session host, a reference to the authentication certificate, which may have been obtained from the federated authentication service 1634 in step 1604. The reference may comprise a user ticket, which may be temporary, and the reference may be encrypted.

In step 1606, the host 1636 for the virtual application or desktop session may contact the federated authentication service 1634 to request (e.g., access) the certificate (e.g., a smart card certificate) and to perform private key operations as part of the active directory (e.g., WINDOWS Active Directory) logon process. The operating system session may receive, from the active directory logon process, a Kerberos TGT, which may list the security groups to which the user is assigned, including the group(s) that are related to the issuance policy label(s). The TGT may also contain Kerberos claims, as previously explained. The logon certificate may also be stored at (e.g., copied to) the user's certificate store so it is available to applications that are aware of client certificates, such as for use in accessing PKI protected resources or performing PKI-based operations (e.g., applying a digital signature to a document).

In step 1607, applications in the user session can access various resources or data repositories 1638, such as file shares, mailboxes, database servers, or other general data, using either Kerberos or SSL/TLS authentication, or any other authentication method that can be based on a user certificate.

In step 1608, sensitive data repositories 1640 may allow user access based on membership in a privileged security group (e.g., WINDOWS security group) linked to one of the certificate labels, or by using PKI authentication and directly inspecting the client certificate for the appropriate label.

Figure 17:
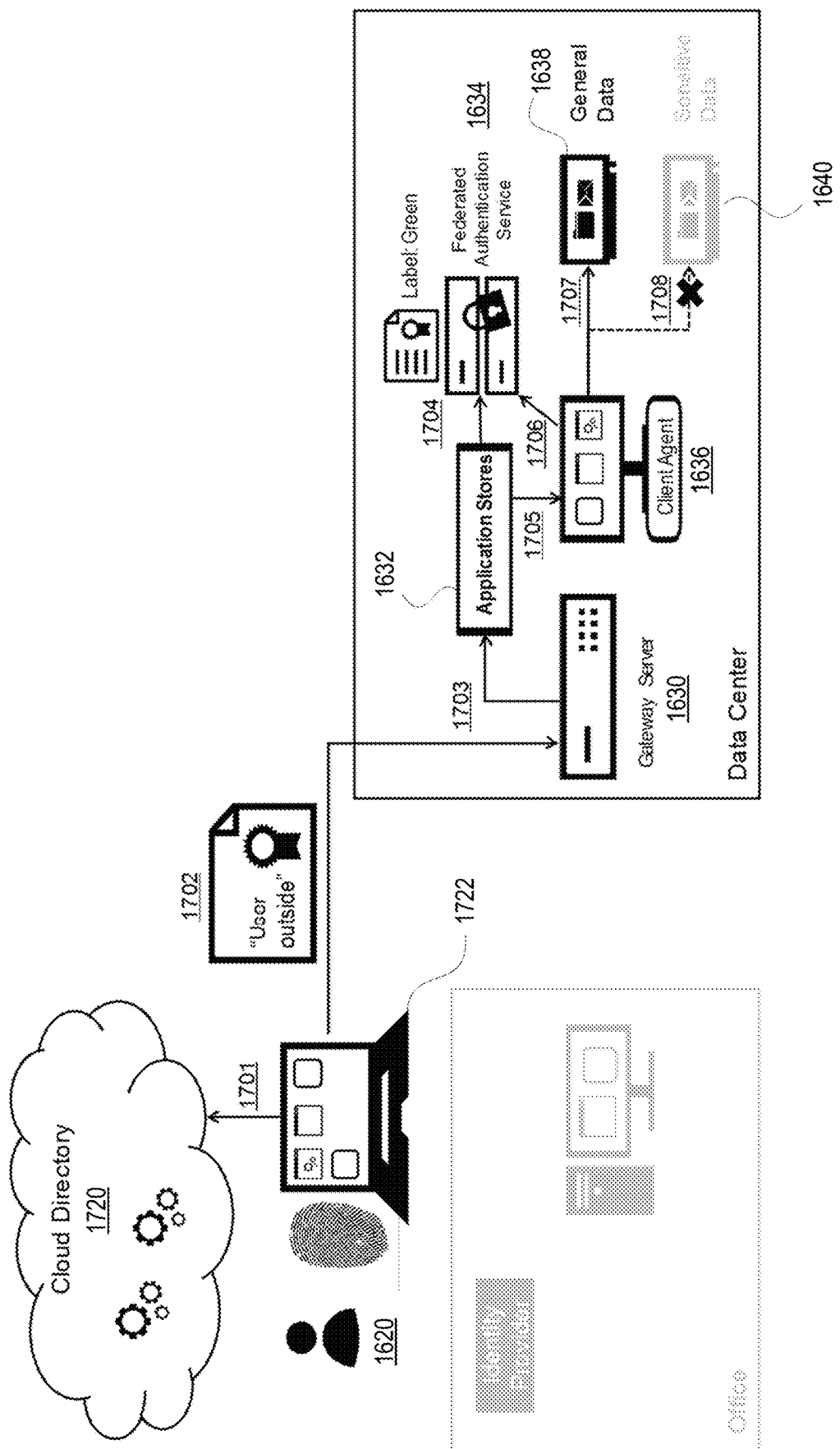
FIG. 17 depicts an illustrative system and method for dynamic access control using federated logon in accordance with one or more illustrative aspects described herein.

FIG. 17 depicts an illustrative system and method for dynamic access control using federated logon in accordance with one or more illustrative aspects described herein. For example, a user may access applications from a user device using biometric authentication, such as facial recognition, fingerprint sensing, voice recognition, etc. Context information may be reflected in a different group membership, which can be used to change data access. A logon certificate may be available in-session for PKI protected resource access. As another example, a user may reconnect via the Internet to the virtual application or desktop session started in the use case illustrated in FIG. 16, but from a different class of device (e.g., an unmanaged device and/or a mobile device) and/or a different location (e.g., outside of an office). The user session context may be dynamically modified to continue to allow access to general data, but not to the sensitive data.

The steps illustrated in FIG. 17 may be similar or the same as the steps illustrated in FIG. 16, with some exceptions. In some aspects, the user 1620 may request a reconnection to a previous session (e.g., a previous virtual application or desktop session) using the same device as illustrated in FIG. 16 (e.g., a device 1622) or a different device. For example, the user 1620 may attempt to reconnect using a different device 1722 (e.g., a mobile device). Additionally or alternatively, the user 1620 may attempt to reconnect to the previous session from the same location as illustrated in FIG. 16 (e.g., in an office) or a different location. For example, the user 1620 may attempt to reconnect from a different location (e.g., outside of the office). In step 1701, a user 1620 may authenticate via a cloud directory 1720, such as in response to the request to reconnect. In response to the user authenticating via the cloud directory 1720, in step 1702, the cloud directory 1720 may issue a federation token (e.g., SAML token) to the gateway server 1630, with a claim that indicates the user is outside a corporate office and/or using a device 1722 that is not managed. As previously described, the gateway server 1630 and/or the application stores 1632 may alternatively establish some of this information for itself, for example, based on the IP address of the client device 1722, or by using an end point analysis scan that checks for a device certificate that might be available to unmanaged devices.

In step 1703, the gateway server 1630 may assert the user identity and other context information to the application stores 1632, such as by using a smart access mechanism.

In step 1704, the application stores 1632 may use customer-defined rules to assign one or more labels to the user session, based on the context information supplied by the gateway server 1630. The application stores 1632 may then assert the user identity and the labels to the federated authentication service 1634, which may issue a smart card authentication certificate with that information. For example, the user session may be assigned a green label, which may indicate that the user is outside of the office, is part of a particular group of devices, and/or cannot access certain resources, such as sensitive data. Alternatively, the determination and/or assertion of the user identity and labels may be made by the cloud directory 1720 and/or the gateway server 1630. This may happen indirectly, e.g., by the cloud directory 1720 and/or the gateway server 1630 generating a signed claims statement, such as a SAML token, that is conveyed to the federated authentication service 1634. The signed claims statement may be the SAML token provided in step 1702, which is conveyed to the application stores 1632 by the gateway service 1630 as evidence associated with the logon event. The signed claims statement may be conveyed by the application stores 1632 to the federated authentication service 1634 in step 1704. The signed claims statement may alternatively be freshly generated by the cloud directory 1720 and/or the gateway server 1630 and conveyed by some other interaction, e.g., a federated logon interaction such as SAML or OpenID Connect, involving the client device 1722.

In step 1705, the application stores 1632 may launch the virtual application or desktop session using the federated authentication service mechanism, as previously discussed.

In step 1706, before the reconnect process completes, the host 1636 for the virtual application or desktop session may determine that the Kerberos tickets and smart card authentication sessions based on particular labels (e.g., a purple label) are removed (e.g., flushed) from the session, and/or that applications which might not be able to cope with dynamic changes are disconnected or closed. In step 1707, applications in the user session can access various general data repositories 1638, such as file shares, mailboxes, database servers, and the like, using either Kerberos or SSL/TLS authentication, or any other authentication method that can be based on a user certificate.

However, in step 1708, sensitive data repositories 1640 may become inaccessible to the virtual application or data session because existing network connections (e.g., connections to sensitive data, browser tabs for accessing sensitive data, etc.) might be torn down. The connections may be re-established using the new Kerberos TGT or smart card authentication certificate, which may reflect the labels in the certificate used to unlock the session.

Figure 18:
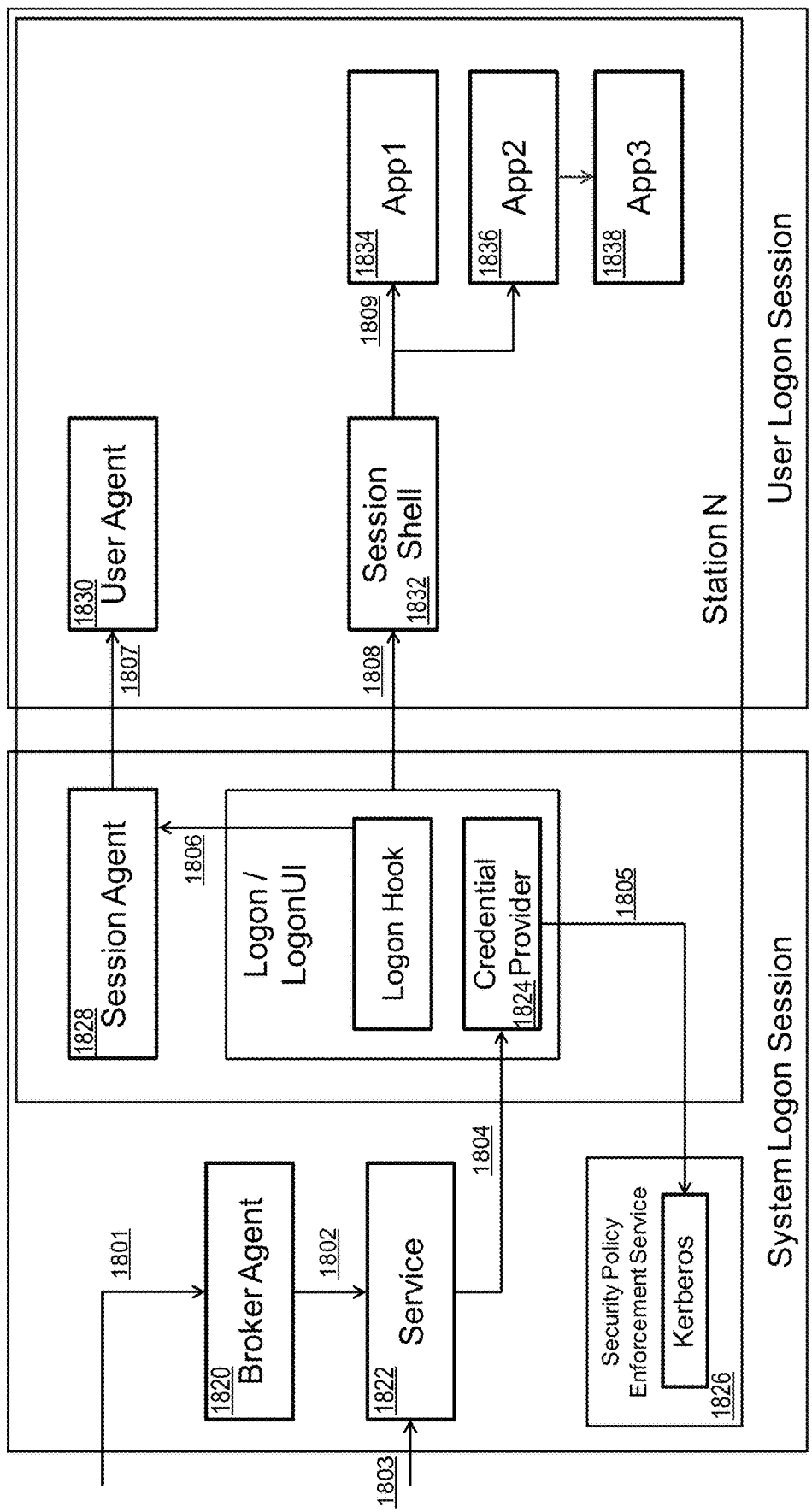
FIG. 18 depicts an illustrative system and method for dynamic access control using federated logon in accordance with one or more illustrative aspects described herein.

FIG. 18 depicts an illustrative system and method for dynamic access control using federated logon in accordance with one or more illustrative aspects described herein. The steps illustrated in FIG. 18 may be for the situation where the session is being started (e.g., logon, rather than reconnect).

In step 1801, the virtual application or desktop session broker may notify the broker agent 1820 on the machine where the user session will be started to prepare for that session to be created. For federated authentication service-based logons, a custom package of logon data may be supplied. The custom logon data may reference the authentication certificate on the federated authentication service, associated with a logon ticket that may be provided to the end point device.

In step 1802, the broker agent 1820 may inform a client agent control service 1822 to expect a connection. On some implementations, this may trigger the client agent port to be opened, e.g., temporarily, to allow a connection.

In step 1803, the end point device may connect to the client agent listener port and supply various pieces of connection information, including the logon ticket which may be used to reference the custom logon data from step 1801.

In step 1804, the client agent control service 1822 may determine that an automatic logon is to take place, e.g., rather than expecting the user to manually authenticate, such as by typing a password. It may notify the appropriate credential provider 1824 to drive the logon using the custom logon data from step 1801. The credential provider 1824 may alternatively be a custom logon data extension that is specific to the virtualization session agent.

In step 1805, the federated authentication service credential provider 1824 may interact with the federated authentication service server (not shown) to obtain the user certificate and then pass it to the Kerberos authentication system 1826, along with other information that enables the Kerberos system 1826 to indirectly interact with the federated authentication service server to use the certificate as part of an active directory logon protocol. This may cause the Kerberos system 1826 to obtain a TGT for the user, if authentication is successful. The TGT may be stored in the security policy enforcement service (e.g., Local Security Authority Subsystem Service (LSASS)) credential table for the newly created user logon session. The TGT may include a list of one or more (e.g., all) of the security groups for the session, as determined by the active directory. This may include any special groups that are associated with labels in the federated authentication service certificate, or claims that are associated with designated account attributes.

In step 1806, the logon event may be signalled to a privileged client agent session management process 1828. This process may perform various privileged actions if required, such as (1) starting, stopping, and/or restarting system services that may have or may use references to user session context information, (2) configuring privileged components, such as file system filter drivers or system services, based on the user session context information, (3) starting and/or signalling trusted agents running in the user session based on the context information, etc.

In step 1807, the client agent session management process 1828 may start an unprivileged client agent user agent process 1830 in the user logon session. This may happen before any normal application is started. This process can perform various unprivileged actions if desired. For example, the federated authentication service logon certificate can be copied into the user's certificate store, for access by normal applications.

In step 1808, the logon system may complete the interactive logon processing by starting the user shell, which may be, for example, the session shell 1832.

In step 1809, from the user shell, more applications (e.g., app1 1834, app2 1836, app3 1838, etc.) may be started either automatically or manually. Applications can start other applications and so on. For example, app2 1836 may start app3 1838. Applications may have the ability to use Kerberos for resource authentication by calling the Kerberos system, or by calling other services that call the Kerberos system directly or indirectly, which may use the TGT to fetch service tickets as required. Each service ticket may get a copy of the security groups from the TGT. Applications can also use the federated authentication service logon certificate in the user's certificate store.

Figure 19:
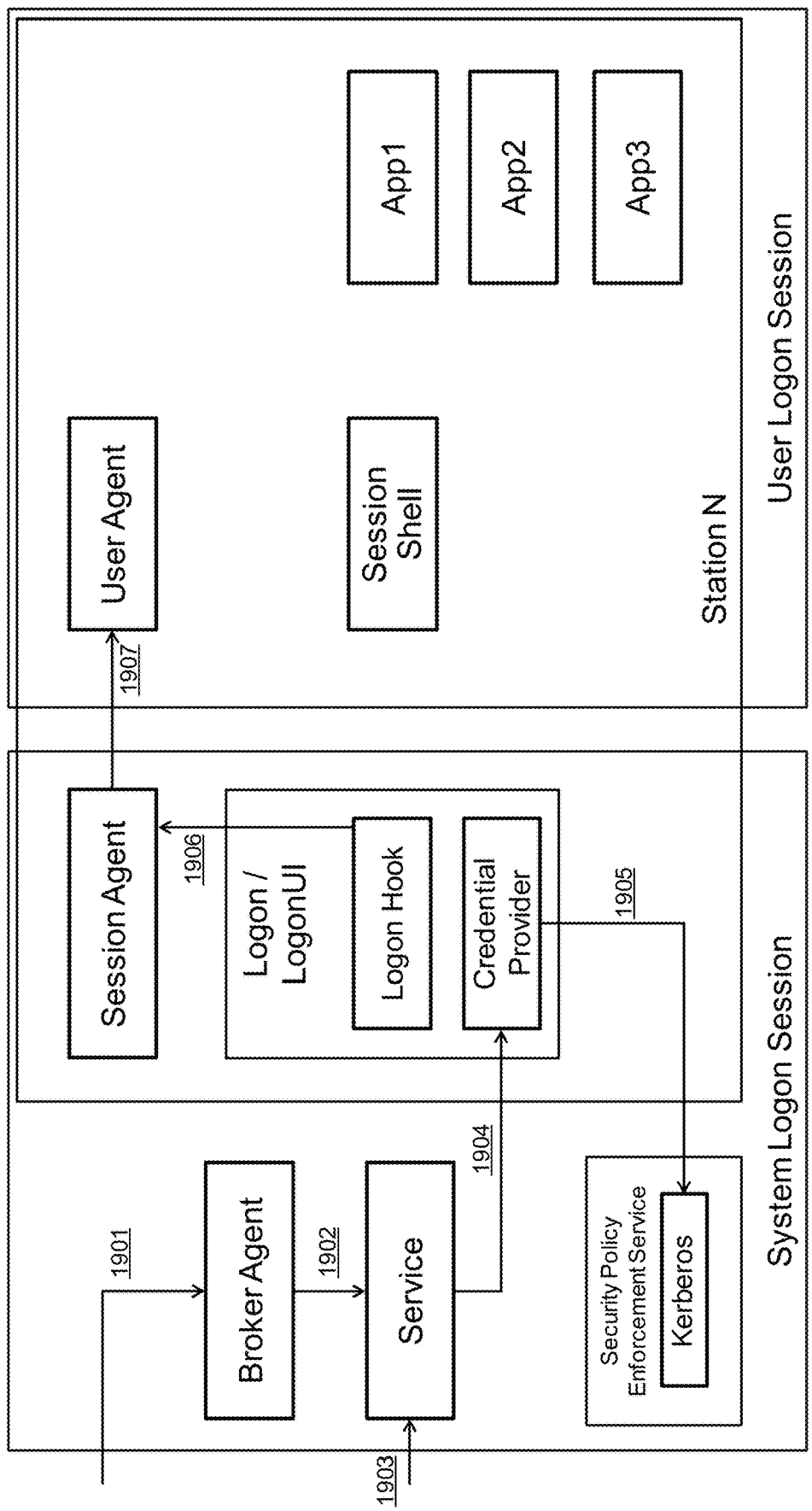
FIG. 19 depicts an illustrative system and method for dynamic access control using federated logon in accordance with one or more illustrative aspects described herein.

FIG. 19 depicts an illustrative system and method for dynamic access control using federated logon in accordance with one or more illustrative aspects described herein. For example, the steps illustrated in FIG. 19 may occur during a reconnect in the current product, when using federated authentication service. Some of the steps have been omitted. Steps 1901, 1902, 1903, 1904, and 1905 may be the same as or similar to steps 1801, 1802, 1803, 1804, and 1805, respectively (as previously described), except that in step 1905 the existing TGT and service tickets might not be replaced. Whether they are replaced may depend on whether the OS determines they are getting close to expiry. For example, the OS may determine that the current time is within a threshold time of the expiration time. Steps 1906 and 1907 may occur to allow for the possibility of actions that are to be triggered on reconnect. For example, a new federated authentication service logon certificate may be copied to the certificate store to replace the previous one. When the session is unlocked, the user shell and running applications may become visible and accessible again.

Figure 20:
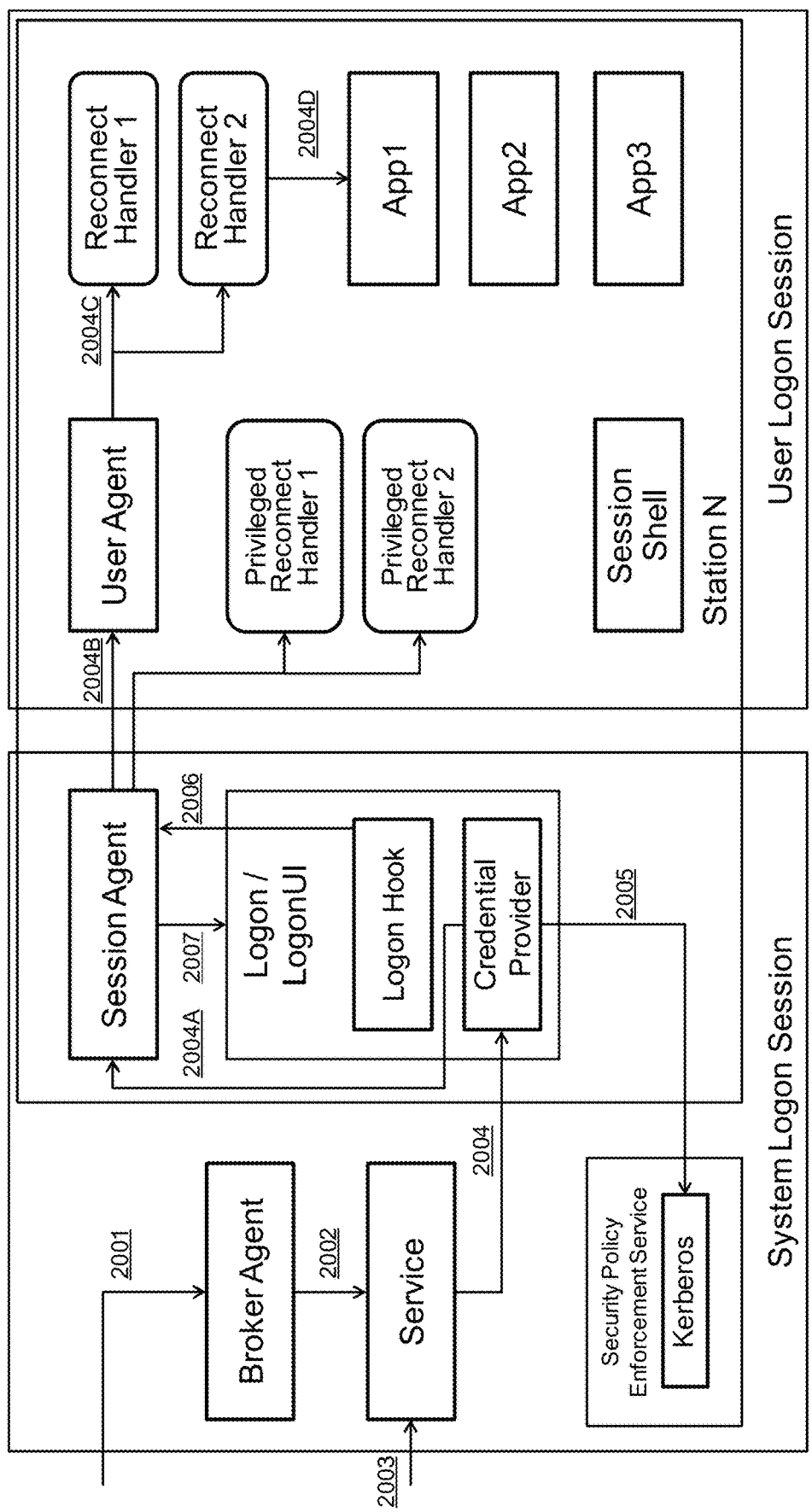
FIG. 20 depicts an illustrative system and method for dynamic access control using federated logon in accordance with one or more illustrative aspects described herein.

FIG. 20 depicts an illustrative system and method for dynamic access control using federated logon in accordance with one or more illustrative aspects described herein. For example, one or more of the steps illustrated in FIG. 20 may occur during a reconnect scenario.

Steps 2001, 2002, 2003, and 2004 may be the same as or similar to steps 1801, 1802, 1803, and 1804, respectively (as previously described), except that steps 2004A, 2004B, 2004C, and/or 2004D may be invoked as part of the completion of step 2004. This may be to allow reconnect handlers (e.g., reconnect handler 1 and reconnect handler 2) to prepare for the reconnection that has been started, while the user logon session is still in the state it was in at the time of disconnect. Also in step 2004, the credential provider may be able to interpret the custom logon data and to interact with the federated authentication service server, which may allow it to learn about the new set of labels (and thus inform the reconnect handlers) before they have been applied. The reconnect handlers may tear down, remove, or disable connections, sessions, or other artifacts that relate to the previous context and labels. These connections may include connections associated with access to other application or desktop virtualization sessions, and/or connections to network resources, such as SMB file servers, etc. If the new labels or other context information is unchanged (and/or is still compatible with the previous set of labels and information), the reconnect handlers may choose to take no action, or otherwise avoid or adjust actions that would cause user-visible disruption when disruption is unnecessary to remain compliant with policies. Similarly, privileged reconnect handlers may perform privileged actions based on the new labels or other context information, such as (1) starting, stopping, and/or restarting system services that may have or may use references to user session context information, (2) reconfiguring privileged components, such as file system filter drivers or system services, based on the user session context information, (3) signalling trusted agents running in the user session based on the new context information, etc.

One or more of those reconnect handlers (e.g., the reconnect handler 2) may flush the Kerberos ticket table for the user logon session. The table may be completely flushed or partially flushed by discarding selected tickets, as needed to remain compliant with policies while minimizing disruption to user activity. Other handlers may tear down SMB network connections. Other handlers may run customer scripts or helper apps that signal or reconfigure applications in some way in response to the new labels and other context information. The applications may be controllable in some ways, such as via an API that can be called. Custom code may be run during a reconnect event. For example, browser tabs may be closed, certain applications may be closed, applications may be notified of a change in context, custom script that may affect an application's behaviour may be run, etc. Some of the reconnect handlers may be started or performed directly by the session agent or other management process in order to run with system privileges, for instance to interact with other system services or trusted session agents. Others may be started by the client agent user agent in order to run with ordinary user privileges and with easier access to the applications, the user profile, and so forth.

Step 2005 may be the same as or similar to step 1805, as previously described. The new TGT may be placed into the session table. Step 2006 may be used to signal that the authentication event has occurred and the new TGT is available. This signal may be generated before a logon service (e.g., WinLogon) unlocks the session to allow access to the applications. The client session management process may invoke steps 2004B to 2004D again, allowing the reconnect handlers to react to the new context information before the session is unlocked. The reconnect handlers may reconstruct, resume, or create connections, sessions, or artefacts that relate to the new context and labels, or may make preparations for connections, sessions, or artefacts to be reconstructed, resumed, or created at a later point in time, such as on demand when an application or service initiates or resumes a task or performs or requests an operation that uses it. The reconstruction, resumption, or creation may happen in such a way as to be associated with one or more of the new context or labels. When one or more (e.g., all) reconnect handlers have completed their processes, the client agent session management process may signal the logon service at step 2007. The logon service may then complete the reconnect processing by unlocking the user logon session so the applications are visible and accessible to the user. If a reconnect handler is not able to complete the operations it wants to perform, the reconnect handler may signal to the client agent session management process that session unlock is not permitted (e.g., to be compliant with corporate policies). The session management process may similarly signal the logon service at step 2007 that session unlock is not permitted, preventing the completion of the reconnect process.

Many of the above concepts have applicability to the scenario where resource access is being mediated by a web reverse proxy or access gateway such as a gateway server. The gateway service may be enhanced to use federated authentication service certificates for performing PKINIT to obtain Kerberos tickets in a user session. The gateway server could be further enhanced to support using federated authentication service certificates for client authentication on SSL/TLS connections made to back-end resources. By virtue of having the dynamic context information on which access policies should be gated, the gateway server can map the context information to labels that are placed in the certificate, and then use that certificate for access functions as described.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   authenticating, via an identity provider, a user of a client device, wherein the authenticating is based on a determination that the user is at a first location;
   receiving, by a computing device and from the identity provider, a token indicating that the user is at the first location;
   determining, by the computing device and based on the token indicating that the user is at the first location, one or more labels for a session associated with the user of the client device, wherein each label of the one or more labels is associated with a corresponding security group;
   generating, by the computing device, an authentication certificate comprising the one or more labels;
   determining, by the computing device and based on the authentication certificate, one or more access groups for the user of the client device; and
   based on one or more of the one or more access groups for the user of the client device or the one or more labels, granting the user of the client device access to first data and second data.

2. The method of claim 1, wherein the token indicates context information associated with the client device.

3. The method of claim 1, wherein the first data comprises general data, and wherein the second data comprises sensitive data.

4. The method of claim 1, further comprising:
   disconnecting the user of the client device from the session;
   after disconnecting the user of the client device from the session, receiving a request to reconnect the user to the session and authenticating the user;
   receiving, by the computing device, a second token indicating that the user is at a second location different from the first location; and
   based on the second token indicating that the user is at the second location different from the first location, granting the user access to the first data and denying the user access to the second data.

5. The method of claim 4, wherein receiving the request to reconnect the user to the session comprises receiving, from a second client device associated with the user, the request to reconnect the user to the session, and wherein the second token indicates context information associated with the second client device.

6. The method of claim 4, wherein authenticating the user comprises authenticating the user via a cloud directory.

7. The method of claim 4, wherein granting the user access to the first data and denying the user access to the second data comprises:
   determining, by the computing device and based on the second token indicating that the user is at the second location, one or more new labels for the session;
   generating, by the computing device, a second authentication certificate comprising the one or more new labels for the session;
   determining, by the computing device and based on the second authentication certificate, one or more new access groups for the user; and
   based on one or more of the one or more new access groups for the user or the one or more new labels, granting the user of the client device access to the first data and denying the user access to the second data.

8. The method of claim 7, further comprising:
   removing, by the computing device, the authentication certificate comprising the one or more labels.

9. The method of claim 4, wherein the user is granted access to data via a browser, and wherein denying the user access to the second data comprises one or more of:
   closing one or more of a tab or a window of the browser associated with the second data, or
   reconfiguring a tab of the browser to prevent access to the second data.

10. The method of claim 1, wherein the authentication certificate is associated with a smart card.

11. An apparatus comprising:
    a processor; and
    memory storing computer-executable instructions that, when executed by the processor, cause the apparatus to:
       receive, from an identity provider, a token indicating that a user of a client device is at a first location, wherein the receiving is based on an authentication of the user of the client device, and wherein the authentication is based on a determination that the user is at the first location;
       determine, based on the token indicating that the user is at the first location, one or more labels for a session associated with the user of the client device, wherein each label of the one or more labels is associated with a corresponding security group;
       generate an authentication certificate comprising the one or more labels;
       determine, based on the authentication certificate, one or more access groups for the user of the client device; and
       based on one or more of the one or more access groups for the user of the client device or the one or more labels, grant the user of the client device access to first data and second data.

12. The apparatus of claim 11, wherein the first data comprises general data, and wherein the second data comprises sensitive data.

13. The apparatus of claim 11, wherein the memory stores additional computer-executable instructions that, when executed by the processor, cause the apparatus to:
    disconnect the user of the client device from the session;
    after disconnecting the user of the client device from the session, receive a request to reconnect the user to the session and authenticating the user;
    receive a second token indicating that the user is at a second location different from the first location; and
    based on the second token indicating that the user is at the second location different from the first location, grant the user access to the first data and denying the user access to the second data.

14. The apparatus of claim 13, wherein the computer-executable instructions, when executed by the processor, cause the apparatus to receive the request to reconnect the user to the session by receiving, from a second client device associated with the user, the request to reconnect the user to the session, and wherein the second token indicates context information associated with the second client device.

15. The apparatus of claim 13, wherein the computer-executable instructions, when executed by the processor, cause the apparatus to authenticate the user by authenticating the user via a cloud directory.

16. The apparatus of claim 13, wherein the additional computer-executable instructions, when executed by the processor, cause the apparatus to grant the user access to the first data and deny the user access to the second data by:
- determining, based on the second token indicating that the user is at the second location, one or more new labels for the session;
- generating a second authentication certificate comprising the one or more new labels for the session;
- determining, based on the second authentication certificate, one or more new access groups for the user; and
- based on one or more of the one or more new access groups for the user or the one or more new labels, granting the user of the client device access to the first data and denying the user access to the second data.

17. The apparatus of claim 16, wherein the memory stores additional computer-executable instructions that, when executed by the processor, cause the apparatus to:
- remove the authentication certificate comprising the one or more labels.

18. The apparatus of claim 13, wherein the user is granted access to data via a browser, and wherein denying the user access to the second data comprises one or more of:
- closing one or more of a tab or a window of the browser associated with the second data, or
- reconfiguring a tab of the browser to prevent access to the second data.

19. The apparatus of claim 13, wherein the authentication certificate is associated with a smart card.

20. A system comprising:
a computing device; and
an identity provider comprising:
- a processor; and
- memory storing computer-executable instructions that, when executed by the processor of the identity provider, cause the identity provider to:
  - authenticate a user of a client device, wherein the authenticating is based on a determination that the user is at a first location; and
  - send, to the computing device, a token indicating that the user is at the first location,
wherein the computing device comprises:
- a processor; and
- memory storing computer-executable instructions that, when executed by the processor of the computing device, cause the computing device to:
  - receive, from the identity provider, a token indicating that the user is at the first location;
  - determine, based on the token indicating that the user is at the first location, one or more labels for a session associated with the user of the client device, wherein each label of the one or more labels is associated with a corresponding security group;
  - generate an authentication certificate comprising the one or more labels;
  - determine, based on the authentication certificate, one or more access groups for the user of the client device; and
  - based on one or more of the one or more access groups for the user of the client device or the one or more labels, grant the user of the client device access to first data and second data.

* * * * *